United States Patent
Hu et al.

(10) Patent No.: US 12,375,589 B2
(45) Date of Patent: Jul. 29, 2025

(54) PACKET FORWARDING METHOD, DEVICE, AND SYSTEM

(71) Applicant: Huawei Technologies Co., Ltd., Shenzhen (CN)

(72) Inventors: Zhibo Hu, Beijing (CN); Junda Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 264 days.

(21) Appl. No.: 18/067,475

(22) Filed: Dec. 16, 2022

(65) Prior Publication Data

US 2023/0122099 A1 Apr. 20, 2023

Related U.S. Application Data

(63) Continuation of application No. PCT/CN2021/101015, filed on Jun. 18, 2021.

(30) Foreign Application Priority Data

Jun. 18, 2020 (CN) .......................... 202010557405.0
Sep. 4, 2020 (CN) .......................... 202010923722.X

(51) Int. Cl.
   *H04L 47/43* (2022.01)
   *H04L 45/00* (2022.01)
   *H04L 69/22* (2022.01)

(52) U.S. Cl.
   CPC .............. *H04L 69/22* (2013.01); *H04L 45/00* (2013.01); *H04L 47/43* (2022.05)

(58) Field of Classification Search
   None
   See application file for complete search history.

(56) References Cited

U.S. PATENT DOCUMENTS

2023/0126801 A1* 4/2023 Peng .................. H04L 45/17
                                                    709/238
2023/0188463 A1* 6/2023 Cheng .................. H04L 45/74
                                                    709/238

OTHER PUBLICATIONS

"Cheng et al. "Compressed SRv6 Segment List Encoding in SRH", draft-filsfilscheng-spring-srv6-srh-comp-sl-enc-01, May 19, 2020" (Year: 2020).*
Yao liu er al:"BGP Extensions for Unified SID in TE Policy draft-liu-idr-segment-routing-te-policy-complement-03." Nov. 12, 2020. total 23 pages.

(Continued)

*Primary Examiner* — Jenkey Van
(74) *Attorney, Agent, or Firm* — Slater Matsil, LLP

(57) ABSTRACT

Embodiments of this application provide a packet forwarding method. In the method, a first network device generates a first packet, where the first packet includes a segment list corresponding to a forwarding path of the first packet, the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length. The first network device sends the first packet based on the segment list.

20 Claims, 23 Drawing Sheets

(56) References Cited

OTHER PUBLICATIONS

Z. Li, C. Li et al:"Compressed SRv6 Network Programming draft-li-spring-compressed-srv6-np-02." Aug. 28, 2020, SPRING Working Group, total 24 pages.
W. Cheng et al:"Compressed SRv6 Segment List Encoding in SRH draft-filsfilscheng-spring-srv6-srh-comp-sl-enc-01." Nov. 20, 2020, SPRING, total 12 pages.

* cited by examiner

| locator | function | argument/padding (optional) |
|---------|----------|------------------------------|

FIG. 1

PACKET FORWARDING METHOD, DEVICE, AND SYSTEM

CROSS-REFERENCE TO RELATED APPLICATIONS

This application is a continuation of International Application No. PCT/CN2021/101015, filed on Jun. 18, 2021, which claims priority to Chinese Patent Application No. 202010923722.X, filed on Sep. 4, 2020 and Chinese Patent Application No. 202010557405.0, filed on Jun. 18, 2020. All of the aforementioned applications are hereby incorporated by reference in their entireties.

TECHNICAL FIELD

This application relates to the communications field, and in particular, to a packet forwarding method, a device, and a system in a segment routing (SR) network.

BACKGROUND

SR is a protocol designed based on a source routing concept to forward a data packet on a network. The SR supports specifying explicitly a forwarding path of the data packet on a source node. When being deployed on an internet protocol version 6 (IPv6) data plane, the SR is referred to as IPv6 segment routing (SRv6). The SRv6 extends a segment routing header (SRH) based on the IPv6.

The SRH includes a segment list, also referred to as a segment identifier list (SID list). The SID list includes a plurality of sequentially arranged segment identifiers (SIDs), which respectively represent a plurality of segments, and each segment is an instruction or an instruction set for processing a packet. The SRH is encapsulated in the packet, and a processing process in which an SR network processes the packet is carried in the segment identifier list of the SRH. A length of each SID on the SRv6 network is 128 bits. In this case, each time one SID is added to the SID list, a length of the SRH increases by 128 bits, and a length of the packet also increases by 128 bits. A large quantity of network resources, for example, bandwidth, are occupied in a forwarding process because the length of the packet increases. For example, when the packet processing process includes 100 segments, the SRH needs to include 100 SIDs. A length of the SID list is up to 1600 bytes, and a lengthy SID list reduces packet transmission efficiency on the SR network. In addition, a lengthy SRH increases packet processing difficulty. For example, a length of a packet window read by a network device at one time is limited, for example, 128 bytes. If the length of the SRH is 1600 bytes, which is far greater than the length of the packet window read at one time, and an entire SRH read process needs to be completed after a plurality of read operations. This increases the packet processing difficulty.

SUMMARY

A packet forwarding method and device and a system are provided, to resolve a technical problem that network transmission efficiency and processing efficiency are reduced due to a lengthy segment identifier list.

According to a first aspect, a packet forwarding method is provided. The method includes: A first network device generates a packet, where the packet includes a segment list corresponding to a forwarding path of the packet, the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length. The first network device sends the packet based on the segment list.

The method may be executed by an ingress device of a packet forwarding path. In the segment list corresponding to the forwarding path, a compressed segment identifier whose length is the first length may be referred to as the first-type compressed segment identifier, a compressed segment identifier whose length is the second length may be referred to as the second-type compressed segment identifier, and the first length is less than the second length. According to the method, compressed segment identifiers with different lengths are orchestrated in the segment list in a mixed manner. This can further shorten a length of the segment list, and improve network efficiency.

In a possible implementation, the first length is X times a unit length, the second length is Y times the unit length, and both X and Y are integers. In other words, both the first length and the second length are integer multiples of the unit length.

In a possible implementation, the unit length is equal to the first length. In other words, the second length is an integer multiple of the first length.

In a possible implementation, the unit length is ($N^{th}$ power of 2) bits, where N is an integer greater than or equal to 3 and less than 7. For example, the unit length may be 8 bits, 16 bits, or 32 bits.

In a possible implementation, the first length is 16 bits, and the second length is 32 bits.

When the first length and the second length meet the foregoing relationship, a forwarding mechanism of an SRv6 network can be better compatible, and network deployment can be simplified.

In a possible implementation, the second-type compressed segment identifier includes a global link compressed segment identifier, and the global link compressed segment identifier indicates a specific network device on the forwarding path to forward the packet through a specific link. The second-type compressed segment identifier with a relatively long length may be used for a global END.X, namely, a global link compressed segment identifier. Therefore, during network planning, the global link compressed segment identifier can be separately planned. For example, a length of the global link compressed segment identifier is planned as 32 bits, and a length of a global node compressed segment identifier is planned as 16 bits, so that the length of the global node compressed segment identifier is further shortened. This further shortens the length of the entire segment list.

In a possible implementation, the global link compressed segment identifier includes a node part and a link part, where the node part is used to identify a node, the link part is used to identify a link, a length of the node part is the same as the first length, and a length of the link part is the same as the first length. The node part may be a global node compressed segment identifier, and the link part may be a local link compressed segment identifier. In other words, the global link compressed segment identifier includes the global node compressed segment identifier and the local link compressed segment identifier. Therefore, a logical association between the identifiers is added to facilitate network planning.

In a possible implementation, the compressed segment identifier further includes a third-type compressed segment identifier, a length of the third-type compressed segment identifier is a third length, the third length is greater than the first length, and the third length is less than the second length. In other words, the compressed segment identifier has two or more length types.

In a possible implementation, the segment list includes an element whose length is 128 bits, and the element includes the first-type compressed segment identifier and the second-type compressed segment identifier. In other words, the first-type compressed segment identifier and the second-type compressed segment identifier may be included in a same element.

In a possible implementation, the segment list further includes at least one of the following identifiers: an internet protocol version 6 segment routing SRv6 segment identifier whose length is 128 bits, a multiprotocol label switching MPS label, and an internet protocol version 4 IPv4 address. The method is also applicable to an SRv6 network with hybrid paths. For example, the segment list may further include an SID with 128 bits, an MPIS label, or an IPv4 address.

In a possible implementation, the compressed segment identifier includes a first compressed segment identifier, and the first compressed segment identifier indicates whether a following identifier of the first compressed segment identifier in the segment list is the compressed segment identifier. The first compressed segment identifier belongs to the first-type compressed segment identifier, or the first compressed segment identifier belongs to the second-type compressed segment identifier. The compressed segment identifier may carry continue of compression information. The continue of compression information indicates that the following identifier of the current compressed segment identifier in the segment list is still the compressed segment identifier.

In a possible implementation, a function field of the first compressed segment identifier indicates whether the following identifier is the compressed segment identifier, or one or more bits in the first compressed segment identifier indicate whether the following identifier is the compressed segment identifier. Optionally, the continue of compression information may be carried in the function field of the compressed segment identifier. For example, when the function field of the compressed segment identifier corresponds to a specific type of feature (flavor), it indicates that the compressed segment identifier carries the continue of compression information. Optionally, one or more bits may also be divided from the compressed segment identifier, to carry the continue of compression information.

In a possible implementation, a packet header of the packet includes a first pointer and a second pointer, where a value of the first pointer indicates a location of one of the plurality of compressed segment identifiers in the element whose length is 128 bits, and a value of the second pointer indicates a location of the element in the segment list. Alternatively, a packet header of the packet includes a first pointer, where a value of the first pointer indicates a location of one of the plurality of compressed segment identifiers in the segment list. The segment list including the compressed segment identifiers may use a two-dimensional pointer or a one-dimensional pointer.

In a possible implementation, the value of the first pointer is M, where M is a value obtained by dividing 128 bits by the unit length, or M is a value obtained by dividing a sum of lengths of all elements in the segment list by the unit length, and the length of the element is 128 bits. At the ingress device of the forwarding path, the value of the first pointer is set to an initial value. When the segment list uses the two-dimensional pointer, the initial value of the first pointer is the value obtained by dividing 128 bits by the unit length. When the segment list uses the one-dimensional pointer, the initial value of the first pointer is the value obtained by dividing the sum of the lengths of all the elements in the segment list by the unit length.

In a possible implementation, the method further includes: The first network device determines the forwarding path. The first network device generates the segment list corresponding to the forwarding path.

In a possible implementation, the method further includes: The first network device receives the segment list from a controller in a network.

The forwarding path may be generated by the ingress device of the forwarding path, or may be generated by the controller in the network.

In a possible implementation, a prefix of a segment identifier corresponding to the first-type compressed segment identifier is the same as a prefix of a segment identifier corresponding to the second-type compressed segment identifier. The first-type compressed segment identifier and the second-type compressed segment identifier are located in a same SRv6 compressed subpath.

According to a second aspect, a packet forwarding method is provided. The method includes: A first network device receives a first packet, where the first packet includes a segment list corresponding to a forwarding path of the first packet, the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length. The first network device determines that content of a destination address field in a packet header of the first packet matches a local segment identifier. In response to determining that the content of the destination address field matches the local segment identifier, the first network device determines to-be-copied content in the segment list based on an indication of the local segment identifier. The first network device copies the to-be-copied content to the destination address field, to generate a second packet. The first network device sends the second packet.

The method may be executed by another network device other than an ingress device on a packet forwarding path. In the segment list corresponding to the forwarding path, a compressed segment identifier whose length is the first length may be referred to as the first-type compressed segment identifier, a compressed segment identifier whose length is the second length may be referred to as the second-type compressed segment identifier, and the first length is less than the second length. In the method, the network device determines the to-be-copied content in the segment list based on the indication of the local segment identifier, to adapt to compressed segment identifiers with different lengths orchestrated in the segment list in a mixed manner.

In a possible implementation, that the first network device determines to-be-copied content in the segment list based on an indication of the local segment identifier includes: The first network device determines a location of the to-be-copied content in the segment list based on a length indicated by the local segment identifier. The first network device determines the to-be-copied content based on the location of the to-be-copied content in the segment list. The network device determines the location of the to-be-copied content in the segment list based on the length indicated by the local segment identifier, so that when the compressed segment identifiers with different lengths are orchestrated in the segment list in a mixed manner, the location of the to-be-copied content in the segment list can still be determined.

In a possible implementation, the packet header of the first packet includes a first pointer and a second pointer. That the first network device determines a location of the to-be-copied content in the segment list based on a length indicated by the local segment identifier includes: The first network device determines a value of the first pointer based on the length indicated by the local segment identifier. The first network device determines, based on the value of the first pointer, a location of the to-be-copied content in an element whose length is 128 bits, where the element is included in the segment list. The first network device determines a location of the element in the segment list based on a value of the second pointer. When the segment list uses a two-dimensional pointer, the first network device determines a value of the first pointer based on the length indicated by the local segment identifier.

In a possible implementation, the packet header of the first packet includes a first pointer. That the first network device determines a location of the to-be-copied content in the segment list based on a length indicated by the local segment identifier includes: The first network device determines a value of the first pointer based on the length indicated by the local segment identifier. The first network device determines the location of the to-be-copied content in the segment list based on the value of the first pointer. When the segment list uses a one-dimensional pointer, the first network device determines a value of the first pointer based on the length indicated by the local segment identifier.

In a possible implementation, the length indicated by the local segment identifier is an integer multiple of the length of the first-type compressed segment identifier, and that the first network device determines a value of the first pointer based on the length indicated by the local segment identifier includes: The first network device reads an original value of the first pointer in the packet header of the first packet. The first network device subtracts an update value from the original value of the first pointer, to obtain the value of the first pointer, where the update value is equal to a multiple value obtained by dividing the length indicated by the local segment identifier by the length of the first-type compressed segment identifier. For example, if the length indicated by the local segment identifier may be the length of the first-type compressed segment identifier, the update value is 1. Alternatively, if the length indicated by the local segment identifier may be the length of the second-type compressed segment identifier, the update value is 2.

In a possible implementation, the length indicated by the local segment identifier is a length of a first compressed segment identifier, the first compressed segment identifier is included in the destination address field in the packet header of the first packet, and the first compressed segment identifier is a compressed segment identifier corresponding to the local segment identifier. In other words, the length indicated by the local segment identifier is a length of the compressed segment identifier that is in the segment list and that corresponds to the local segment identifier.

In a possible implementation, a packet header of the second packet includes a value of the first pointer.

In a possible implementation, the local segment identifier indicates whether the to-be-copied content includes the compressed segment identifier. When the to-be-copied content includes the compressed segment identifier, that the first network device copies the to-be-copied content to the destination address field, to generate a second packet includes: After the first network device copies the to-be-copied content to a field that is in the destination address field and that includes a prefix, a length of the to-be-copied content is the same as the length of the second-type compressed segment identifier. When the to-be-copied content does not include the compressed segment identifier, that the first network device copies the to-be-copied content to the destination address field, to generate a second packet includes: The first network device copies the to-be-copied content to the destination address field, where a length of the to-be-copied content is 128 bits. The local segment identifier may carry continue of compression information. The continue of compression information indicates that a following identifier that is in the segment list and that is of an identifier corresponding to the local segment identifier in the segment list is still a compressed segment identifier, in other words, whether the to-be-copied content includes the compressed segment identifier. When the to-be-copied content includes the compressed segment identifier, the length of the to-be-copied content is determined based on a length of a compressed segment identifier with a relatively long length, that is, the length of the to-be-copied content is the same as the length of the second-type compressed segment identifier. When the to-be-copied content does not include the compressed segment identifier, that is, the to-be-copied content is an SID whose length is 128 bits, the length of the to-be-copied content is 128 bits.

In a possible implementation, before that the first network device copies the to-be-copied content to the destination address field, to generate a second packet, the method further includes: The first network device determines whether the to-be-copied content includes the compressed segment identifier. When the first network device determines that the to-be-copied content includes the compressed segment identifier, that the first network device copies the to-be-copied content to the destination address field, to generate a second packet includes: After the first network device copies the to-be-copied content to a field that is in the destination address field and that includes a prefix, a length of the to-be-copied content is the same as the length of the second-type compressed segment identifier. When the first network device determines that the to-be-copied content does not include the compressed segment identifier, that the first network device copies the to-be-copied content to the destination address field, to generate a second packet includes: The first network device copies the to-be-copied content to the destination address field, where a length of the to-be-copied content is 128 bits. When a current identifier is a last subelement in the element, the first network device parses partial content of a next element in the segment list, in other words, the first network device parses the to-be-copied content. When the to-be-copied content includes the compressed segment identifier, the length of the to-be-copied content is determined based on a length of a compressed segment identifier with a relatively long length, that is, the length of the to-be-copied content is the same as the length of the second-type compressed segment identifier.

When the to-be-copied content does not include the compressed segment identifier, that is, the to-be-copied content is an SID whose length is 128, the length of the to-be-copied content is 128 bits.

In a possible implementation, the to-be-copied content includes a first identifier, and the length of the to-be-copied content is greater than or equal to a length of the first identifier, where the first identifier corresponds to a next-hop network device of the first network device on the forwarding path, or the first identifier corresponds to a link of a next-hop network device. In other words, the first identifier is a following identifier that is in the segment list and that is of an identifier corresponding to the local segment identifier in the segment list. If the length of the to-be-copied content may be the same as the length of the second-type compressed segment identifier, the length of the to-be-copied content is greater than or equal to the length of the first identifier. For example, when the first identifier belongs to the first-type compressed segment identifier, the length of the to-be-copied content is greater than the length of the first identifier.

According to a third aspect, a segment list sending method is provided. The method includes: A first network device determines a forwarding path of a packet. The first network device generates a first segment list corresponding to the forwarding path, where the first segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length.

The method may be executed by an ingress device of a packet forwarding path or a controller in a network. In the segment list corresponding to the forwarding path, a compressed segment identifier whose length is the first length may be referred to as the first-type compressed segment identifier, a compressed segment identifier whose length is the second length may be referred to as the second-type compressed segment identifier, and the first length is less than the second length. According to the method, compressed segment identifiers with different lengths are orchestrated in the segment list in a mixed manner. This can further shorten a length of the segment list, and improve network efficiency.

In a possible implementation, that the first network device generates a first segment list corresponding to the forwarding path includes: The first network device obtains a second segment list corresponding to the forwarding path, where the second segment list includes a plurality of sequentially arranged segment identifiers, and a length of each of the plurality of segment identifiers is 128 bits. The first network device generates the first segment list based on the second segment list.

In a possible implementation, each of the plurality of segment identifiers has a same prefix, and that the first network device generates the first segment list based on the second segment list includes: The first network device separately deletes the prefix of each of the plurality of segment identifiers, to generate each of the plurality of compressed segment identifiers, where each of the plurality of compressed segment identifiers respectively includes a node identifier of each of the plurality of segment identifiers, and the plurality of compressed segment identifiers include the first-type compressed segment identifier and the second-type compressed segment identifier.

In a possible implementation, that the first network device generates a first segment list corresponding to the forwarding path includes: The first network device obtains the plurality of compressed segment identifiers based on the plurality of segment identifiers, where a length of each of the plurality of segment identifiers is 128 bits. The first network device generates the first segment list based on the plurality of compressed segment identifiers.

In a possible implementation, each of the plurality of segment identifiers has a same prefix, and that the first network device obtains the plurality of compressed segment identifiers based on the plurality of segment identifiers includes: The first network device separately deletes the prefix of each of the plurality of segment identifiers, to generate each of the plurality of compressed segment identifiers, where each of the plurality of compressed segment identifiers respectively includes a node identifier of each of the plurality of segment identifiers, and the plurality of compressed segment identifiers include the first-type compressed segment identifier and the second-type compressed segment identifier.

In a possible implementation, the prefix indicates a subnet to which a network device or a link corresponding to each segment identifier belongs, and the node identifier indicates, in the subnet, the network device or the link corresponding to each segment identifier.

As described above, to obtain the segment list including the compressed segment identifiers, the segment list including the segment identifiers may be first obtained, the segment identifiers in the segment list including the segment identifiers are then compressed, and the segment identifiers in the segment list are replaced with the corresponding compressed segment identifiers, to obtain the segment list including the compressed segment identifiers. Alternatively, the segment identifiers may be first compressed to obtain corresponding compressed segment identifiers, and the segment list including the compressed segment identifiers are then obtained based on the compressed segment identifiers.

In a possible implementation, the first network device is a controller in a network, and the method further includes: The first network device sends the first segment list to an ingress device of the forwarding path.

In a possible implementation, the first network device is an ingress device of the forwarding path, and the method further includes: The first network device generates a packet including the first segment list, and the first network device sends the packet including the first segment list.

According to a fourth aspect, this application provides a network device, to perform the method in any one of the first aspect or the possible implementations of the first aspect. Specifically, the network device includes a unit configured to perform the method in any one of the first aspect or the possible implementations of the first aspect.

According to a fifth aspect, this application provides a network device, to perform the method in any one of the second aspect or the possible implementations of the second aspect. Specifically, the network device includes a unit configured to perform the method in any one of the second aspect or the possible implementations of the second aspect.

According to a sixth aspect, this application provides a network device, to perform the method in any one of the third aspect or the possible implementations of the third aspect. Specifically, the network device includes a unit configured to perform the method in any one of the third aspect or the possible implementations of the third aspect.

According to a seventh aspect, this application provides a network device. The network device includes: a processor, a communication interface, and a memory. The communication interface may be a transceiver. The memory may be configured to store program code, and the processor is configured to invoke the program code in the memory to enable the network device to perform the method in any one of the first aspect or the possible implementations of the first aspect. Details are not described herein again.

According to an eighth aspect, this application provides a network device. The network device includes: a processor, a communication interface, and a memory. The communication interface may be a transceiver. The memory may be configured to store program code, and the processor is configured to invoke the program code in the memory to enable the network device to perform the method in any one of the second aspect or the possible implementations of the second aspect. Details are not described herein again.

According to a ninth aspect, this application provides a network device. The network device includes: a processor, a communication interface, and a memory. The communication interface may be a transceiver. The memory may be configured to store program code, and the processor is configured to invoke the program code in the memory to enable the network device to perform the method in any one of the third aspect or the possible implementations of the third aspect. Details are not described herein again.

According to a tenth aspect, this application provides a network device. The network device includes: a main control board and an interface board. The main control board includes: a first processor and a first memory. The interface board includes: a second processor, a second memory, and an interface card. The main control board and the interface board are coupled.

The first memory may be configured to store program code, and the first processor is configured to invoke the program code in the first memory to perform the following operations: generating a first packet, where the first packet includes a segment list corresponding to a forwarding path of the first packet, the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length.

The second memory may be configured to store program code, and the second processor is configured to invoke the program code in the second memory, to trigger the interface card to perform the following operations: sending the first packet based on the segment list.

In a possible implementation, an inter-process communication (IPC) protocol channel is established between the main control board and the interface board. The main control board and the interface board communicate with each other through the IPC channel.

According to an eleventh aspect, this application provides a network device. The network device includes: a main control board and an interface board. The main control board includes: a first processor and a first memory. The interface board includes: a second processor, a second memory, and an interface card. The main control board and the interface board are coupled.

The first memory may be configured to store program code, and the first processor is configured to invoke the program code in the first memory to perform the following operations: determining that content of a destination address field in a packet header of the first packet matches a local segment identifier; In response to determining that the content of the destination address field matches the local segment identifier, determining to-be-copied content in the segment list based on an indication of the local segment identifier, and copying the to-be-copied content to the destination address field, to generate a second packet.

The second memory may be configured to store program code, and the second processor is configured to invoke the program code in the second memory, to trigger the interface card to perform the following operations: receiving a first packet, where the first packet includes a segment list corresponding to a forwarding path of the first packet, the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length; and sending a second packet.

In a possible implementation, an inter-process communication (IPC) protocol channel is established between the main control board and the interface board. The main control board and the interface board communicate with each other through the IPC channel.

According to a twelfth aspect, this application provides a network device. The network device includes: a main control board and an interface board. The main control board includes: a first processor and a first memory. The interface board includes: a second processor, a second memory, and an interface card. The main control board and the interface board are coupled.

The first memory may be configured to store program code, and the first processor is configured to invoke the program code in the first memory to perform the following operations: determining a forwarding path of a packet; and generating a segment list corresponding to the forwarding path, where the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length.

The second memory may be configured to store program code, and the second processor is configured to invoke the program code in the second memory, to trigger the interface card to perform operations.

In a possible implementation, an inter-process communication (IPC) protocol channel is established between the main control board and the interface board. The main control board and the interface board communicate with each other through the IPC channel.

According to a thirteenth aspect, this application provides a network system. The network system includes the network devices provided in the fourth aspect, the fifth aspect, and the sixth aspect, or the network system includes the network devices provided in the seventh aspect, the eighth aspect, and the ninth aspect, or the network system includes the network devices provided in the tenth aspect, the eleventh aspect, and the twelfth aspect.

According to a fourteenth aspect, this application provides a computer-readable storage medium. The computer-readable storage medium stores instructions. When the instructions are run on a computer, the computer is enabled to perform the methods according to the foregoing aspects.

According to a fifteenth aspect, a computer program is provided. The computer program includes computer instructions, and the computer instructions are stored in a computer-readable storage medium. A processor of a network device reads the computer instructions from the computer-readable storage medium, and the processor executes the computer instructions, to enable the network device to perform the methods provided in the foregoing aspects.

According to a sixteenth aspect, this application provides a chip, including a memory and a processor. The memory is configured to store a computer program, and the processor is configured to invoke the computer program from the memory and run the computer program, to perform the methods in the foregoing aspects.

Optionally, the chip includes only the processor. The processor is configured to read and execute the computer program stored in the memory. When the computer program is executed, the processor performs the methods in the aspects.

It should be understood that for beneficial effects achieved by technical solutions in the fourth aspect to the sixteenth aspect and the corresponding possible implementations in embodiments of this application, refer to the foregoing technical effects in the first aspect to the third aspect and the corresponding possible implementations. Details are not described herein again.

BRIEF DESCRIPTION OF THE DRAWINGS

To describe technical solutions of this application more clearly, the following briefly describes the accompanying drawings used in embodiments. It is clearly that the accompanying drawings in the following description merely show some embodiments of this application, and a person of ordinary skill in the art can derive other technical solutions and accompanying drawings of this application from these accompanying drawings without creative efforts.

FIG. 1 is a schematic diagram of a segment identifier according to an embodiment of the present invention;

DETAILED DESCRIPTION OF ILLUSTRATIVE EMBODIMENTS

Figure 2:
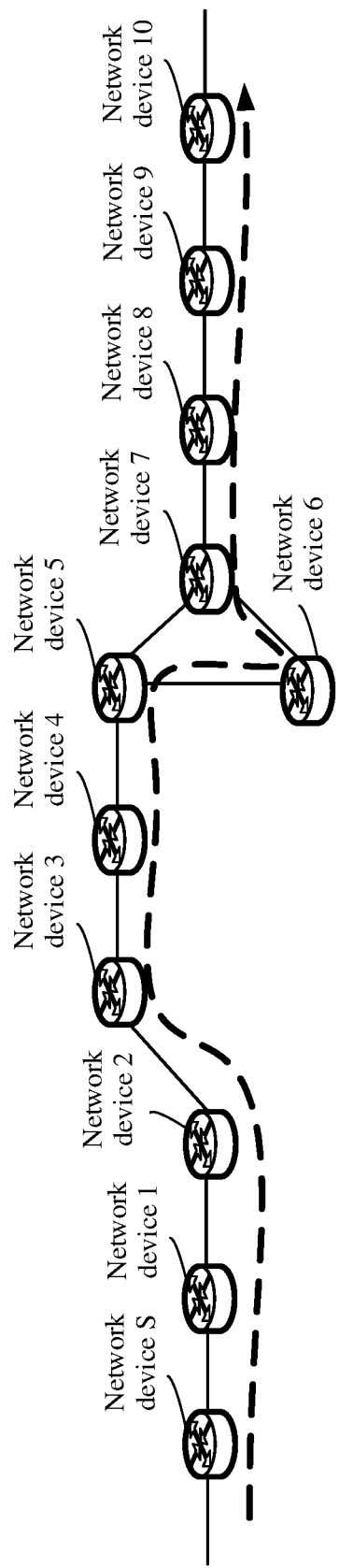
FIG. 2 is a schematic diagram of a network scenario according to an embodiment of the present invention.

The following describes embodiments of this application with reference to the accompanying drawings.

On an SRv6 network, a packet processing process may be divided into several segments, and each segment is a specific processing behavior performed by a specific network device. The several segments are separately executed by network devices on a packet forwarding path, to form the entire packet processing process.

Each segment has a corresponding segment identifier, namely, an SID. The SID uses a format of an IPv6 address whose length is 128 bits. That is, a length of each SID is 128 bits. FIG. 1 shows a format of an SID on an SRv6 network. As shown in FIG. 1, each SID may include a locator field and a function field.

Content of the locator field may also be referred to as a locator for short, is an identifier allocated to a network node or a link of a network node in a network topology, and is used to identify the network node or the link in the network topology. In addition, based on that the locator in the SID is used to identify the network node or the link, the SID may be classified into two types: a node segment identifier (node SID) and an adjacent segment identifier (adjacent SID).

The locator in the SID indicates a network device that executes a segment corresponding to the SID. For the node segment identifier, the network device that executes the segment corresponding to the SID is the network node identified by the SID. For the adjacent segment identifier, the network device that executes the segment corresponding to the SID is a network node to which the link identified by the SID belongs.

In this embodiment of this application, the network node and the network device have a same meaning, and each are a switch, a router, a virtual routing device, a virtual forwarding device, or another forwarding device. The network node releases, according to a network protocol, routing information corresponding to the locator to a network, so that another network node in the network forwards a data packet to the network node.

A length of the locator is variable, and the length of the locator is related to a network scale. For example, when the network scale is larger, the network topology includes more network nodes. In this case, to identify more network nodes, the length of the locator is longer. Conversely, when the network scale is smaller, the length of the locator is also shorter.

Content of the function field may also be referred to as a function for short, indicates an instruction or an instruction set for processing a packet, and is equivalent to operation code of a computer instruction. When the instruction or the instruction set represented by the function is executed on the network node, the network node is enabled to execute a corresponding forwarding behavior, for example, forward a data packet to a specified link, or search a specified table for forwarding.

Optionally, some SIDs may further include an argument field and/or a padding field behind the function field.

Content of the argument field may also be referred to as argument for short, and is an argument used when the instruction or the instruction set represented by the function is executed. For example, the argument is flow information, service information, or another related information.

When a sum of lengths of the locator, the function, and the optional argument in the SID is less than 128 bits, the padding field needs to be set at an end of the SID.

It can be learned that the SID indicates a corresponding segment. Specifically, the SID can indicate a network device that executes the segment, and the SID can indicate a packet processing behavior corresponding to the segment. Optionally, the SID can further indicate an argument used when the packet processing behavior is executed.

When several SIDs corresponding to the several segments are sequentially arranged to form an SID list, the SID list may indicate the packet processing process. An arrangement sequence of the several SIDs in the SID list is an execution sequence of the several segments in the packet processing process. An SRH including the SID list is encapsulated in a packet, so that a process of processing the packet by an SR network can be carried in the packet and transferred to the network devices on the packet forwarding path, and the network devices on the packet forwarding path sequentially execute packet processing behaviors related to the network devices.

Refer to an application scenario shown in FIG. 2. The application scenario includes an SRv6 network, and the SRv6 network includes a network device S and network devices 1 to 10. Each network device has a corresponding locator, namely, an identifier allocated to the network device in a network topology, used to identify the network device in the network topology. For example, an identifier of the network device 1 is a locator 1. Similarly, identifiers of the network devices 2 to 10 are a locator 2 to a locator 10 respectively.

A dashed line in FIG. 2 shows a packet forwarding path. A head node of the forwarding path is the network device S, and then sequentially passes through the network devices 1 to 10. The head node on the forwarding path may also be an ingress node of the SRv6 network, and is also referred to as an ingress device or an ingress network device. For example, a packet processing process corresponding to the forwarding path includes a total of 10 segments, which are respectively packet processing behaviors performed by the network devices 1 to 10. A function corresponding to the packet processing behavior on the network device 1 is a function 1. Similarly, functions corresponding to the packet processing behaviors on the network devices 2 to 10 are respectively a function 2 to a function 10. For the network device 1, the locator 1 and the function 1 form an SID 1. To be specific, the SID 1 indicates a segment executed by the network device 1 in the packet processing process. Similarly, an SID 2 to an SID 10 respectively indicate segments executed by the network devices 2 to 10. The SID 1 to the SID 10 are sequentially arranged to form an SID list corresponding to the packet processing process. An arrangement sequence of the 10 SIDs in the SID list is an execution sequence of the corresponding 10 segments in the packet processing process. That is, the arrangement sequence is from the SID 1 to the SID 10.

Figure 3:
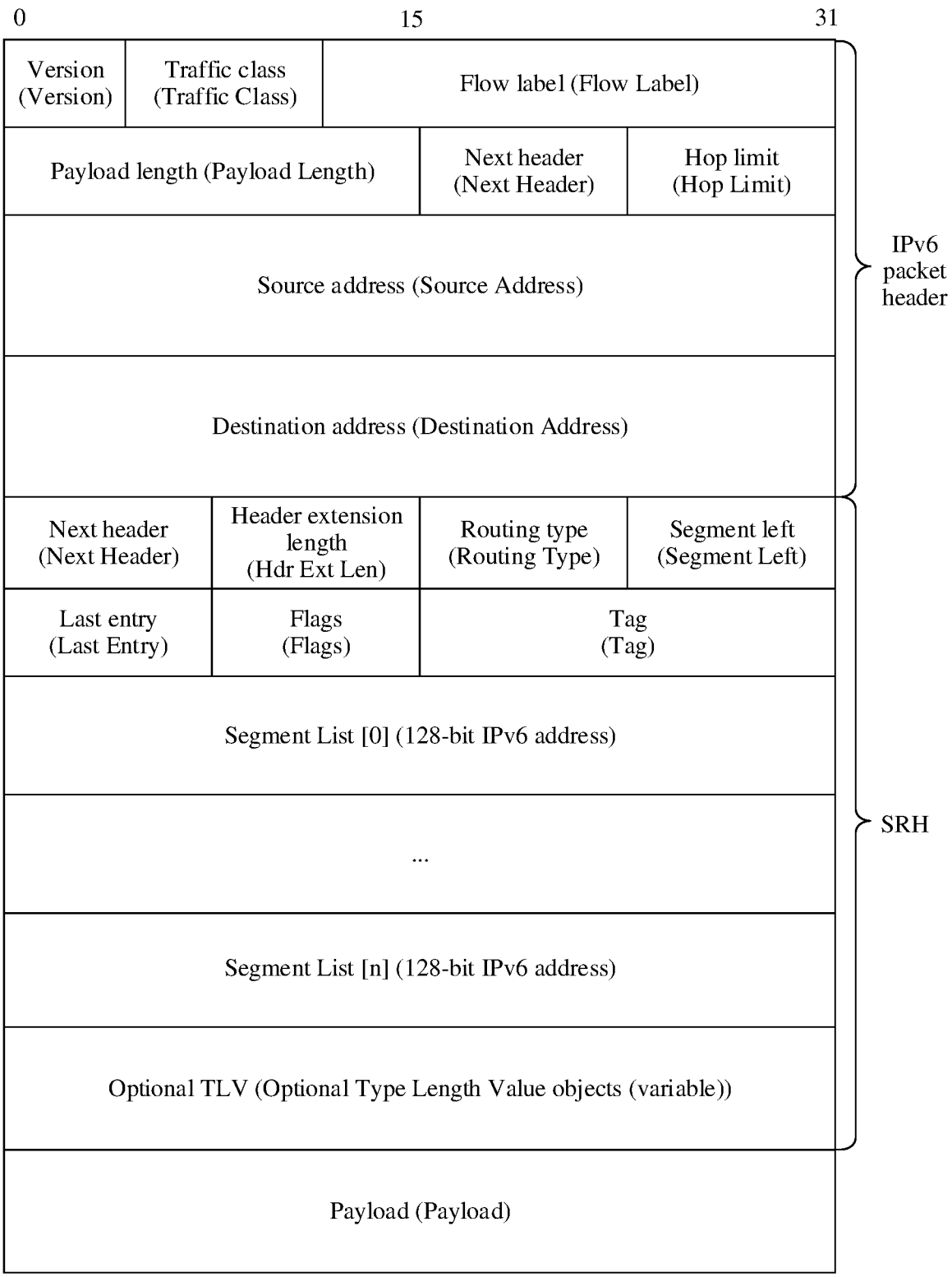
FIG. 3 is a schematic diagram of a packet according to an embodiment of the present invention.

FIG. 3 shows a packet encapsulated with an SID list on an SRv6 network. As shown in FIG. 2, a packet header of the packet includes an IPv6 packet header and an SRH. The IPv6 packet header includes: a version field, a traffic class field, a flow label field, a payload length field, a next header field, a hop limit field, a source address field, and a destination address (DA) field. For a meaning of each field, refer to an explanation in a request for comments (RFC) 8200. The SRH includes: a next header field, a header extension length (Hdr Ext Len) field, a routing type field, a segment left field, a last entry field, a flags field, a tag field, and an SID list. For a meaning of each field, refer to an explanation in an RFC 8754. The SL field is also referred to as an SL pointer. In a packet forwarding process, the SL pointer sequentially points to elements in the SID list. To be specific, with different SL values, a segment [SL] is used to represent each element in the SID list.

The SID list includes a plurality of sequentially arranged elements: a segment list [0] to a segment list [n], each element is one SID, and a length of each element is 128 bits. In addition, SIDs in the SID list may be arranged from the rear to the front. The segment list [0] corresponds to a last executed segment, the segment list [2] corresponds to a penultimate executed segment, and so on. With reference to the application scenario shown in FIG. 2, the SID list includes 10 SIDs, the segment list [n] is an SID 1, and the segment list [0] is an SID 10.

On the SRv6 network, the SRH including the SID list may be encapsulated into a packet by a head node on a forwarding path, and subsequent network devices on a packet forwarding path may process the packet based on the SID list. Specifically, the head node encapsulates, inside an IPv6 packet header of a received IPv6 data packet, the SRH including the SID list, to form an SRv6 data packet. In addition, the head node on the forwarding path may further set a value of a DA field in the IPv6 packet header of the packet to an SID corresponding to a first executed segment in the SID list. In addition, the head node may further set a value of the SL field to N−1, where N is a quantity of SIDs included in the SID list. That is, the segment [SL] is the first SID in the SID list, and corresponds to the first executed segment. Then, the head node on the forwarding path sends the packet along the forwarding path. With reference to the application scenario shown in FIG. 2, the network device S encapsulates the SID list in a packet, and the network devices 1 to 10 process the packet based on the SID list in the packet. The network device S copies the SID 1 corresponding to the first executed segment to the DA field of the IPv6 packet header. The network device S sets the value of the SL field to 9. The network device S searches a local forwarding table based on content of the DA field, namely, the SID 1, and sends the packet to the network device 1 based on a table search result.

On the SRv6 network, for a specific packet, the network devices on the forwarding path may be classified into a transit node and an endpoint node. For the transit node, the SID in the DA field in the IPv6 packet header of the packet is not a local SID. That is, the SID in the DA field is not locally configured to indicate a segment. For the endpoint node, the SID in the DA field in the IPv6 packet header of the packet is a local SID. That is, the SID in the DA field is locally configured to indicate a segment.

Therefore, when receiving the packet, the network device determines whether the SID in the DA field is the local SID. When determining that the SID in the DA field is not the local SID, the network device is the transit node on the packet forwarding path, and the transit node does not need to parse content in the SRH, but only needs to search a local IPv6 routing table based on content of the DA field to forward the packet. In addition, the transit node may alternatively be a network device that does not support an SRv6. When determining that the SID in the DA field is the local SID, the network device is the endpoint node on the packet forwarding path, and the endpoint node searches a forwarding information base (FIB) based on the SID in the DA field, matches a locally instantiated SRv6 SID, and executes a packet processing behavior corresponding to the locally instantiated SRv6 SID. In addition, the endpoint node subtracts 1 from the value of the SL field in the SRH of the packet, and copies the segment list [SL] to the DA field in the IPv6 packet header, in other words, updates the content of the DA field. In addition, the packet continues to be forwarded based on the updated DA field.

With reference to the application scenario shown in FIG. 2, the network device 1 receives the packet, determines that the SID 1 in the DA field is the local SID, executes a packet processing behavior corresponding to the SID 1, subtracts 1 from the value of the SL field, where the value of the SL field is 8, copies a segment list [8], namely, an SID 2, to the DA field, and sends the packet to the network device 2 based on the SID 2.

Then, execution steps of the network device 2 to the network device 10 are similar to those of the network device 1, and a complete packet processing process is formed. It can be learned that the SID on the SRv6 network has a routable attribute, and is used in the SID list to simplify inter-domain path creation and quickly establish an end-to-end path on the network. In addition, the function in the SID support programmability, and can flexibly meet requirements of various services and network functions to adapt to requirements of service and network development. However, as described above, the SID whose length is 128 bits also causes problems of low bandwidth utilization of the network link and high packet processing difficulty.

An embodiment of this application provides a packet forwarding method. In the method, a compressed segment identifier (compressed SID, C-SID) whose length is less than 128 bits is used. This decreases a length of an SID list while an SRH is compatible, so that network efficiency is improved and packet processing difficulty is reduced.

Figure 4:
FIG. 4 is a schematic diagram of a location field of a segment identifier according to an embodiment of the present invention.

A locator field in the SID may further include two parts: a prefix and a node identifier (node ID), as shown in FIG. 4. The prefix is usually allocated by a network operator to a subnet in which a network device is located, and is used to identify an entire subnet. The subnet may also be referred to as a network segment. All SIDs in the subnet have a same prefix. It may be considered that all the SIDs in the entire subnet form an SID block. In this case, the prefix is also used to identify the SID block. Therefore, the prefix may also be referred to as a block. The node ID is used to distinguish between nodes in the subnet. SIDs of different nodes in the subnet have different node IDs.

In a packet forwarding path, a plurality of adjacent network devices are located in a same subnet. Therefore, all SIDs that correspond to the plurality of network devices and that are in the SID list carry a same prefix. This causes repetition and redundancy. A length of the SID list can decrease by optimizing this part of redundant content.

Figure 5:
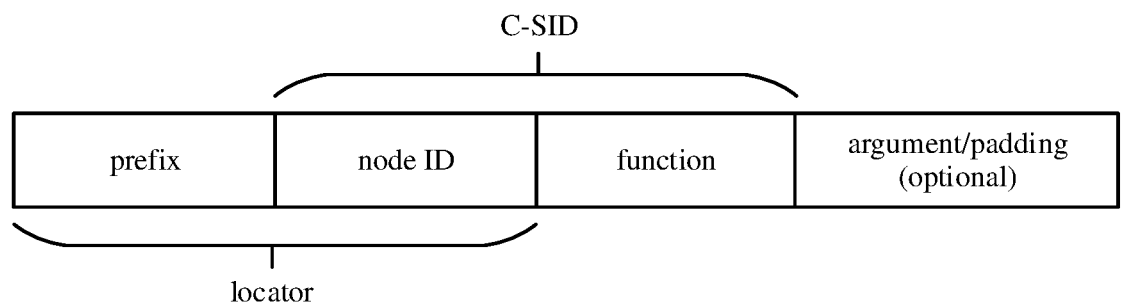
FIG. 5 is a schematic diagram of a compressed segment identifier according to an embodiment of the present invention.

An embodiment of this application provides a format of a C-SID, as shown in FIG. 5. A prefix of a locator field in the SID and an argument field and/or a padding field that may exist are omitted, and a node ID and a function field of the locator field form the C-SID. Therefore, the C-SID includes the node ID and the function field, and a length of the C-SID may be less than 128 bits. The SID list may include only the C-SID, so that a length of an SID list decreases.

The omitted prefix in each SID has same content. Therefore, only one prefix having the same content may be carried in a packet, and network devices on a forwarding path may restore different SIDs by separately using the prefix having the same content and different C-SIDs. For example, a head node on a packet forwarding path may place the prefix in a DA field of an IPv6 packet header of the packet, an endpoint node on the packet forwarding path separately updates different C-SIDs to behind content of the prefix in the DA field, and a later updated C-SID overwrites an earlier updated C-SID. Therefore, different C-SIDs can be combined with the prefix, to restore corresponding SIDs. In other words, although the SID list includes only the C-SID, a corresponding SID is still presented in the DA field. Therefore, when the network device on the forwarding path performs packet processing based on the content of the DA field in the packet, the content of the DA field is still the SID. The foregoing processing is compatible with a standard SRv6 packet processing mechanism.

Information carried in the omitted argument field may be transferred in another manner, for example, is carried in a TLV field of an SRH in a packet, or is statically configured at the network device.

Usually, in a same subnet, all SIDs have a same prefix, and node IDs of all the SIDs have a same length. Optionally, function fields of all the SIDs have a same length. Therefore, optionally, in the same subnet, all C-SIDs have a same length.

Optionally, the length of the C-SID may implement 8-bit alignment. In other words, the length of the C-SID is an integer multiple of 8 bits. Preferably, the length of the C-SID may be 32 bits or 16 bits.

To achieve a good compression effect, an SRv6 SID that is easy to be compressed can be planned during network planning. For example, in the SRv6 SID that is easy to be compressed, a shorter function field or a shorter node ID may be used. Preferably, in the SRv6 SID that is easy to be compressed, a prefix is 64 bits, a node ID is 16 bits, and a function field is 16 bits. Therefore, a corresponding C-SID is 32 bits. Preferably, in the SRv6 SID that is easy to be compressed, a prefix is 64 bits, a node ID is 8 bits, a function field is 8 bits, and a remaining part is a padding field. Therefore, a corresponding C-SID is 16 bits.

When a packet processing process includes 10 segments, if an SID whose length is 128 bits is used, a total length of 10 SIDs is 160 bytes. When a C-SID is used, for example, if a length of the C-SID is 32 bits, a total length of 10 C-SIDs is 40 bytes. An evident compression effect is achieved.

To obtain an SID list including the C-SIDs, an SID list including SIDs may be first obtained, the SIDs in the SID list including the segment identifiers are compressed, and the SIDs in the SID list are replaced with the corresponding C-SIDs to obtain the SID list including the C-SIDs. Alternatively, SIDs may be first compressed to obtain corresponding C-SIDs, and an SID list including the C-SIDs is then obtained based on the C-SIDs.

When the C-SIDs are orchestrated in an SID list of an SRH, the C-SIDs need to be orchestrated in a 128-bit alignment manner to be compatible with a standard SRH mechanism and accurately locate the C-SIDs. Specifically, every element whose length is 128 bits in the SID list may be defined as a container, and each container accommodates an integer quantity of C-SIDs. Optionally, the quantity of C-SIDs accommodated in the container may be an integer part of $128/L_{C\text{-}SID}$, and $L_{C\text{-}SID}$ is a length of the C-SID. For example, if the length of the C-SID is 32 bits, each container can accommodate four C-SIDs at most.

Optionally, after the container accommodates the integer quantity of C-SIDs, remaining space less than a length of one C-SID is padding content (padding). For example, when the length of the C-SID is 48 bits, each container can accommodate two C-SIDs at most, and remaining 24 bits are padding.

Optionally, when the quantity of C-SIDs is not plenty, remaining space in the container is padding. For example, when the container includes only three C-SIDs whose length is 32 bits, remaining 32 bits are padding.

When the SID list includes a plurality of C-SIDs, these C-SIDs are sequentially arranged in at least one container based on a sequence in the SID list.

In addition, the C-SIDs and the SIDs may be further orchestrated in the SID list in a mixed manner. For example, when only some network devices on the forwarding path support a C-SID function, SIDs corresponding to some network devices that do not support the C-SID function still use a format of 128 bits. For another example, when the forwarding path relates to a virtual private network (VPN), corresponding VPN SIDs still use the format of 128 bits. In this case, the SIDs can be accommodated in one container.

An SRH that includes both an SID with 128 bits and a C-SID less than 128 bits may be referred to as a generalized SRH (G-SRH), and a corresponding SRv6 technology that supports the G-SRH may be referred to as a generalized SRv6 (G-SRv6) technology. In addition to the SID with 128 bits and the C-SID less than 128 bits, an SID list of the G-SRH may further include other types of identifiers, for example, an MPIS label and an internet protocol 4 (Internet Protocol Version 4, IPv4) address. All identifiers included in the SID list of the G-SRH, for example, an SID, a C-SID, an MPIS label, and an IPv4 address, may be collectively referred to as G-SIDs. For more descriptions of the G-SRH and the G-SRv6, refer to the draft-lc-6man-generalized-srh-00 entitled "Generalized Segment Routing Header" and dated February 2020, the draft-cl-spring-generalized-srv6-np-01 entitled "Generalized SRv6 Network Programming" and dated March 2020, and the draft-cl-spring-generalized-srv6-for-cmpr-01 entitled "Generalized SRv6 Network Programming for SRv6 Compression" and dated May 2020, which are incorporated herein by citation in their entireties as if they were stated in full.

Figure 6:
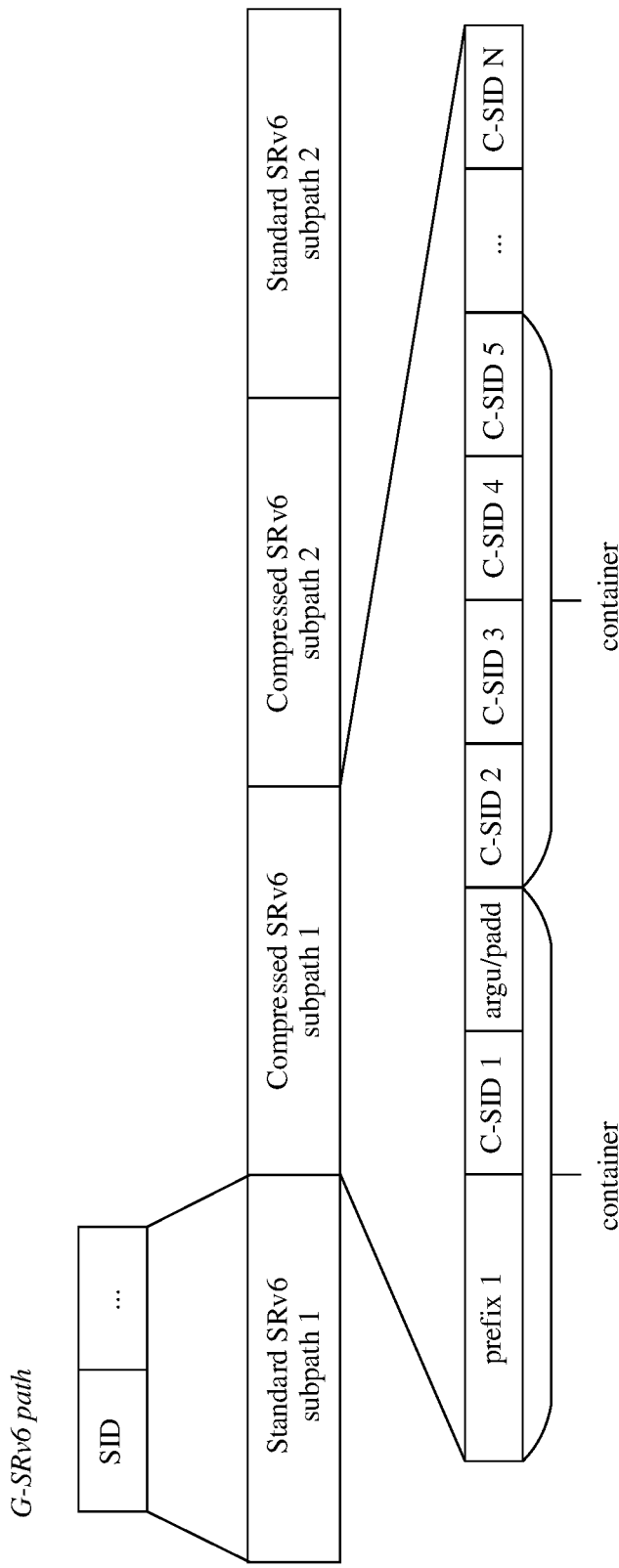
FIG. 6 is a schematic diagram of a segment list according to an embodiment of the present invention.

The packet forwarding path corresponding to the SID list in which the C-SIDs and the SIDs are orchestrated in the mixed manner may be referred to as a G-SRv6 path, and the G-SRv6 path may include an SRv6 subpath and an SRv6 compressed subpath. FIG. 6 shows a schematic structure of an SID list corresponding to the G-SRv6 path. The G-SRv6 path includes two SRv6 subpaths and two SRv6 compressed subpaths, which are respectively an SRv6 subpath 1 and an SRv6 subpath 2, and an SRv6 compressed subpath 1 and an SRv6 compressed subpath 2. Correspondingly, the SID list corresponding to the G-SRv6 path (referred to as the G-SRv6 path for short in the figure) shown in FIG. 6 also includes parts (referred to as the SRv6 subpath 1 and the SRv6 subpath 2 for short in the figure) respectively corresponding to the two SRv6 subpaths and parts (referred to as the SRv6 compressed subpath 1 and the SRv6 compressed subpath 2 for short in the figure) respectively corresponding to the two SRv6 compressed subpaths.

In the SID list, the part corresponding to the SRv6 subpath 1 has a structure similar to that of the part corresponding to the SRv6 compressed subpath 1, and each may include at least one SID. The part corresponding to the SRv6 compressed subpath 1 has a structure similar to that of the part corresponding to the SRv6 compressed subpath 2, and each may include at least one C-SID.

The part corresponding to the SRv6 compressed subpath 1 is used as an example. The part includes at least one container. Optionally, the first SID in this part may be stored in the SID list in a form of a complete SID, or may be stored in the SID list in a form of a C-SID. As shown in FIG. 6, the first SID in this part may be stored in the SID list in a form of a complete SID. In other words, the first container may include an SID with 128 bits, so that a packet processing process is simplified. A process of processing the first container is described below in detail. Starting from the second container, each container includes sequentially arranged C-SIDs. For example, as shown in FIG. 6, the SID included in the first container may be divided into three parts: a prefix 1, a C-SID 1, and an optional argument field or padding field. The second container includes a total of four C-SIDs: a C-SID 2 to a C-SID 5. The following containers can be deduced by analogy.

Optionally, the SID list in which the C-SIDs and the SIDs are orchestrated in the mixed manner may include a plurality of SRv6 compressed subpaths. Optionally, the plurality of SRv6 compressed subpaths are located in different subnets. In other words, SIDs corresponding to nodes in the plurality of SRv6 compressed subpaths have different prefixes. As shown in FIG. 6, the G-SRv6 path further includes the SRv6 compressed subpath 2. In the SID list, the part corresponding to the SRv6 compressed subpath 1 has a structure similar to that of the part corresponding to the SRv6 compressed subpath 2. However, in the part corresponding to the SRv6 compressed subpath 2, a prefix part included in the SID included in the first container is a prefix 2, which is different from the prefix 1. In other words, different SRv6 compressed subpaths are distinguished from each other depending on whether the SIDs include a same prefix, in other words, whether the C-SIDs correspond to a same prefix. Therefore, nodes in a same SRv6 compressed subpath fall within a same subnet.

Figure 7:
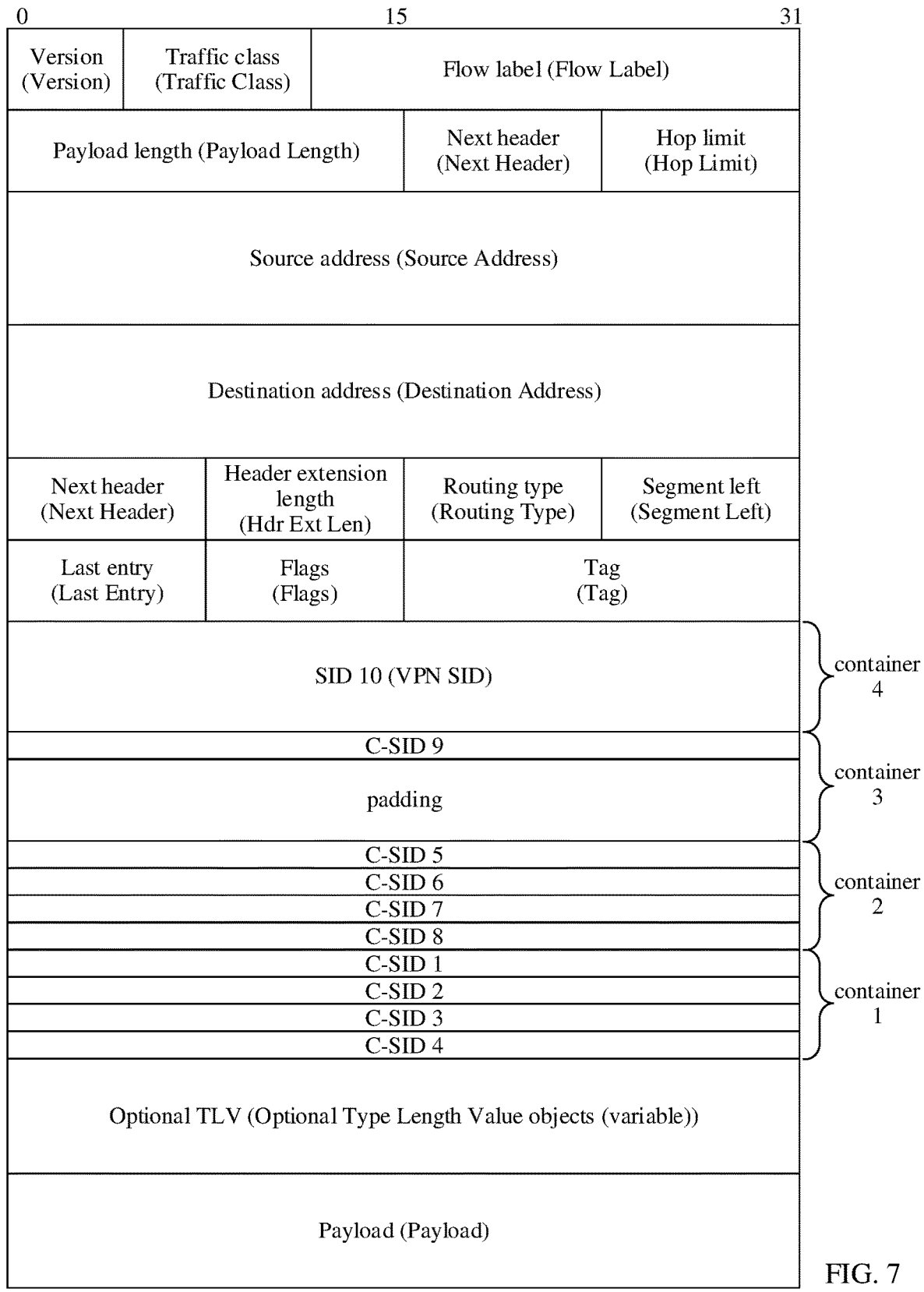
FIG. 7 is a schematic diagram of a packet according to an embodiment of the present invention.

With reference to the application scenario shown in FIG. 2, the forwarding path sequentially passes through the network device 1 to the network device 10. The segments executed by the network device 1 to the network device 9 may be respectively represented by a C-SID 1 to a C-SID 9, and a length of each C-SID is 32 bits. The segment executed by the network device 10 is represented by a VPN SID whose length is 128 bits. A format of a packet including an SID list corresponding to the forwarding path is shown in FIG. 7. The SID list includes four containers. The first container includes the C-SID 1 to the C-SID 4, the second container includes the C-SID 5 to the C-SID 8, the third container includes the C-SID 9, a remaining part is padding, and the fourth container includes an SID 10. A total length of the SID list is 64 bytes. Compared with an SID list that includes 10 SIDs and has a length of 160 bytes, the SID list has a length that is greatly shortened, so that network efficiency is improved.

As described above, an SRH includes an SL field. When the SRH is encapsulated in the packet, a head node of the forwarding path sets a value of the SL field to N−1, where N is a quantity of SIDs included in the SID list. In a packet forwarding process, the network device corresponding to each SID in the SID list of the SRH, namely, an endpoint node on the forwarding path, sequentially subtracts 1 from the value of the SL field in the SRH of the packet, in other words, updates the value of the SL field, and copies the segment list [SL] to a DA field in an IPv6 header of the packet, in other words, updates content of the DA field. Therefore, content of the SL field may also be referred to as an SL pointer, and sequentially points to each element in the SID list. The network device on the forwarding path can locate each element in the SID list by using the SL pointer, to find a next to-be-processed SID, and update the DA field.

When a G-SRH including the C-SID is used, because the length of the C-SID is shorter, each element in the SID list, namely, each container, may accommodate a plurality of C-SIDs. Alternatively, it may be considered that the element in the SID list may be further divided into a plurality of subelements. Therefore, for the original SL pointer, the SL pointer sequentially points to each element in the SID list. However, if each element further includes the plurality of subelements, each subelement in the element cannot be precisely located by only using the SL pointer. If these subelements include C-SIDs, each C-SID in the subelements cannot be accurately located.

In this case, to accurately locate all the G-SIDs in the SID list, the existing SL pointer needs to be extended. Specifically, two manners of a one-dimensional pointer and a two-dimensional pointer may be used.

In the manner of the two-dimensional pointer, in addition to the existing SL pointer, a new pointer may be added to the packet. The new pointer may be referred to as an SI, or may be referred to as a compressed segment identifier left (C-SID left, CL) pointer. In this case, the first dimensional pointer, namely, the SL pointer, still indicates a specific element in the SID list, while the second dimensional pointer, namely, the SI, further indicates a specific G-SID inside an element. The C-SIDs in the element may be arranged from the front to the rear. For example, when an element includes m C-SIDs, a value of the SI corresponding to a first executed C-SID is m−1, a value of the SI corresponding to a C-SID that is last executed is 0, and so on. If the value of the SI pointer is decreased by 1, the SI is offset to a next C-SID. Therefore, by using a combination of the SL pointer and the SI, not only all the elements in the SID list can be precisely located, but also all the subelements in the SID list can be precisely located. A segment list [SL][SI] may be used to represent all the G-SIDs in the SID list. The packet shown in FIG. 7 is used as an example. A segment list [3][3] may be used to represent the C-SID 1, and a segment list [2][3] may be used to represent the C-SID 5.

For a manner of updating the two-dimensional pointer, when the SI is offset inside the element, in a process of updating the pointer, the SI may be decreased by 1 provided that the SL pointer remains unchanged. In other words, the SL pointer still points to a same element, and the SI points to a next subelement in the element. When the SI currently points to a last subelement of the element, in other words, the SI needs to move to a next element, in the process of updating the pointer, the SL pointer may be decreased by 1, and the SI is set to m−1. In other words, the SL pointer points to the next element, and the SI points to the first subelement of the next element.

The newly added second dimensional pointer, namely, the SI, may be located in the SRH of the packet, or may be located in the DA field. For example, the SI may be located in lowest two bits in the DA field, or lowest three bits in the DA field. For example, lowest bytes in the DA field may alternatively be used to place the SI. This facilitates hardware implementation and expansion of a future solution.

In the manner of the one-dimensional pointer, an offset step of the existing SL pointer may be adjusted to form a new pointer. The new pointer may be referred to as a generalized segment identifier index (generalized SID index, SI), or may still be referred to as the SL pointer. The one-dimensional pointer, namely, the SI, indicates a specific G-SID in the SID list. If the offset step of the existing SL pointer is a length of an element in the SID list, namely, 128 bits, the SL pointer points, after each offset, to a next element in the SID list. If an offset step of the SI is a length of a subelement in the SID list, for example, 32 bits or 16 bits, the SI points, after each offset, to a next subelement in the SID list. Therefore, all the elements and all the subelements in the SID list may be precisely located by using different values of the SI, and the segment list [SI] may be used to represent all the G-SIDs in the SID list. The packet shown in FIG. 7 is used as an example. A segment list [15] may be used to represent the C-SID 1, and a segment list [11] may be used to represent the C-SID 5. It should be noted that, because the offset step of the SI decreases, when the SI needs to point to the next element in the SID list, for example, two SIDs in the SID list are adjacent, to point to the next SID, the SI needs to be offset by a plurality of steps, so that the SI is offset by a length of one element.

The new one-dimensional pointer, namely, the SI, may be located in the SRH of the packet, or may be located in the DA field. For example, the SI is still located in the SL field. For another example, the SI may be located in lowest two bits in the DA field, or lowest three bits in the DA field. For example, lowest bytes in the DA field may alternatively be used to place the SI. This facilitates hardware implementation and expansion of a future solution.

For convenience, the extended one-dimensional pointer and the extended two-dimensional pointer may be collectively referred to as extended pointers.

On a conventional SRv6 network, the SID list includes only SIDs. In a packet forwarding process, the network device subtracts 1 from the value of the SL field in the SRH of the packet, and copies the segment list [SL] to the DA field in the IPv6 header, in other words, updates the content of the DA field. When the SID list further includes the C-SIDs, to be compatible with the packet forwarding process on the SRv6 network, a manner in which the network device updates the DA field changes.

Optionally, when the SID list further includes the C-SIDs, continue of compression (continue of compression, COC) information may be carried in the C-SIDs or the SIDs, to indicate whether the C-SIDs in the SID list continue to be arranged. The network device learns of, based on the continue of compression information carried in the C-SIDs or the SIDs, a special manner of updating the DA field.

Optionally, the continue of compression information may be included in the SIDs or the C-SIDs. Optionally, the continue of compression information may be carried in one or more bits in the SIDs or the C-SIDs. For example, the continue of compression information may be carried in one bit between a node ID and a function in the SID or the C-SID. Preferably, the continue of compression information may be carried in a function field in the SID or the C-SID, and corresponds to a specific behavior.

Optionally, the specific behavior carrying the continue of compression information may be a feature (flavor) in an SRv6 technology. The flavor is variants (variants) of common behaviors in the SRv6 technology. These common behaviors may be, for example, End, End.X, and End.T. For more descriptions of the flavor, refer to the draft-ietf-spring-srv6-network-programming-15 entitled "SRv6 Network Programming" and dated March 2020, which is incorporated herein by citation in its entirety as if it were stated in full.

The flavor carrying the continue of compression information may be referred to as a COC flavor. Content of the COC flavor may be updating content of a specific length in the SID list to the DA field. The specific length is a length of the C-SID. For example, the specific length may be 32 bits or 16 bits. In addition, the content of the specific length overwrites only content of a same length behind the prefix in the DA field. To be specific, after the network device copies the next to-be-processed C-SID to behind the prefix in the DA field, the next SID is restored by using the next to-be-processed C-SID and the prefix. A subsequent processing manner is the same as a packet processing manner of a standard SRv6 network.

Specifically, when the SID in the DA field includes the COC flavor, in the manner of the two-dimensional pointer, the network device updates the value of the SI and/or the SL pointer, and copies a segment list [SL][SI] of a specific length to the DA field of the IPv6 header. In the manner of the one-dimensional pointer, the network device updates the value of the SI, and copies a segment list [SI] of a specific length to the DA field of the IPv6 header. When the SID in the DA field does not include the COC flavor, the standard SRv6 processing manner is still used. To be specific, the segment list [SL] with 128 bits is copied to the DA field of the IPv6 header.

With reference to the application scenario shown in FIG. 2 and the format of the packet shown in FIG. 7, the C-SID 1 to the C-SID 8 each include the COC flavor, and the corresponding network device 1 to the network device 8 respectively copy the C-SID 2 with 32 bits to the C-SID 9 with 32 bits to the DA field of the IPv6 header. However, the C-SID 9 does not include the COC flavor, and the corresponding network device 9 copies the SID 10 with 128 bits to the DA field of the IPv6 header.

For example, pseudocode corresponding to the COC flavors included in the C-SID 1 to the C-SID 8 is shown as follows:

```
if IPv6 DA hits a COC Flavor SID      //The SID in the DA field includes the COC flavor
    if SI==o:                         // The SI currently points to the last subelement in the element
        SL--;                         //The SL pointer points to the next element
        SI = 3                        //The SI points to the first subelement of the next element
    Else                              //The SI is offset inside the element
        SI--                          //The SI points to the next subelement of the element
                                      DA[CP..CP+31] = segment list [SL][SI]        //The
                                      segment list [SL][SI] is copied to 32 bits behind the
                                      prefix in the DA field
        Forward the packet based on new DA                //The packet is processed
                                                          based on the updated DA field
    Else              // The SID in the DA field does not include the COC flavor
        SRv6 processing        //The processing manner on the standard SRv6 network
```

With reference to the foregoing descriptions, the prefix in the SID is used to identify a subnet in which the network device or the link is located, and all SIDs in the subnet have a same prefix. When the forwarding path passes through different subnets, the SIDs in the SID list corresponding to the forwarding path may have different prefixes. If the compressed C-SIDs may be used in the SID list, one of omitted prefixes may be stored only at a beginning of the SRv6 compressed subpath. For example, as shown in FIG. 6, the first SID in the SRv6 compressed subpath 1 is in the form of the complete SID, including the prefix 1. Similarly, the first SID in the SRv6 compressed subpath 2 is in the form of the complete SID, for example, including the prefix 2. In addition, because all the SIDs in the SRv6 subpath 1 and the SRv6 subpath 2 are in the form of the complete SID, the first SIDs in the SRv6 subpath 1 and the SRv6 subpath 2 are also definitely in the form of the complete SID. It can be learned that in some network scenarios, the first SID on each subpath of the forwarding path is in the form of the complete SID. In other words, the first SID on each subpath includes a prefix. Therefore, whether the SRv6 compressed subpath ends may be determined by using content of the prefix.

Optionally, when the SID list further includes the C-SIDs, the network device may determine, by parsing partial content of a next element, whether the C-SIDs in the SID list continue to be arranged, and further learn of a special manner of updating the DA field.

Optionally, the partial content of the next element may include at least a part of a prefix. Optionally, the partial content of the next element is a beginning part of the next element, and a length of the partial content of the next element is a length of a common part of prefixes in all subpaths. With reference to the application scenario shown in FIG. 6, for example, the prefix of the SRv6 compressed subpath 1 is the prefix 1, the prefix of the SRv6 compressed subpath 2 is the prefix 2, and prefixes of the SRv6 subpath 1 and the SRv6 subpath 2 are respectively a prefix 3 and a prefix 4. Each length of the prefix 1 to the prefix 4 is 32 bits, and the prefix 1 to the prefix 4 each have same first 20 bits. In this case, the partial content of the next element is first 20 bits of the next element.

Optionally, when a current identifier is the last subelement in the element, the network device parses partial content of the next element. If the partial content of the next element is not the common part of the prefixes in all the subpaths, it is determined that the C-SIDs in the SID list continue to be arranged, in other words, a current SRv6 compressed subpath does not end, and a next to-be-processed C-SID is copied to behind the prefix in the DA field. If the partial content of the next element is the common part of the prefixes in all the subpaths, it is determined that the C-SIDs in the SID list do not continue to be arranged, in other words, a current SRv6 compressed subpath ends, and a next element with 128 bits is copied to the DA field of the IPv6 header. With reference to the application scenario shown in FIG. 6, on a network device corresponding to a C-SID 5 in the SRv6 compressed subpath 1, because the C-SID 5 is a last subelement in an element, the network device parses first 20 bits of a next element, namely, first 20 bits in a next container, for example, first 20 bits in a C-SID 6. If the first 20 bits in the C-SID 6 are different from a common part of prefixes in the subpaths, it is determined that C-SIDs in an SID list continue to be arranged, in other words, the current SRv6 compressed subpath 1 does not end, and the C-SID 6 is copied to behind the prefix in a DA field. On a network device corresponding to a last C-SID in the SRv6 compressed subpath 1, namely, a C-SID N, because the C-SID N is a last subelement in an element, the network device parses first 20 bits of a next element, namely, first 20 bits in the first container in the SRv6 compressed subpath 2. If the first container includes a prefix, in other words, the first 20 bits in the first container are the same as a common part of prefixes in the subpaths, it is determined that C-SIDs in an SID list do not continue to be arranged, in other words, the current SRv6 compressed subpath 1 ends, and a next element with 128 bits is copied to a DA field in an IPv6 header.

In the foregoing descriptions, all the C-SIDs in the same SRv6 compressed subpath have the same length. However, in an actual network application scenario, if C-SIDs with different lengths are orchestrated in the same SRv6 compressed subpath in a mixed manner, a length of an SID list can be further shortened, so that network efficiency is improved.

An embodiment of this application provides a packet forwarding method. A network device on a packet forwarding path is used in the method. In this method, C-SIDs with different lengths are orchestrated in a same SRv6 compressed subpath in a mixed manner. After receiving a packet, the network device reads content of a DA field in an IPv6 packet header of the packet, where the content of the DA field includes a current identifier corresponding to the network device. Based on this, the network device determines a length of the current identifier, adjusts a pointer location based on the length of the current identifier, and further determines to-be-copied content in an SID list. For different network devices, lengths of current identifiers in DA fields may be different. In this case, pointer offset distances may also be different. In other words, the C-SIDs with different lengths in the SID list can flexibly correspond to different pointer offset distances. In this way, when C-SIDs of different lengths are orchestrated in the same SRv6 compressed subpath, a packet forwarding and processing process on the existing SRv6 network is compatible, so that network efficiency is improved.

Figure 8:
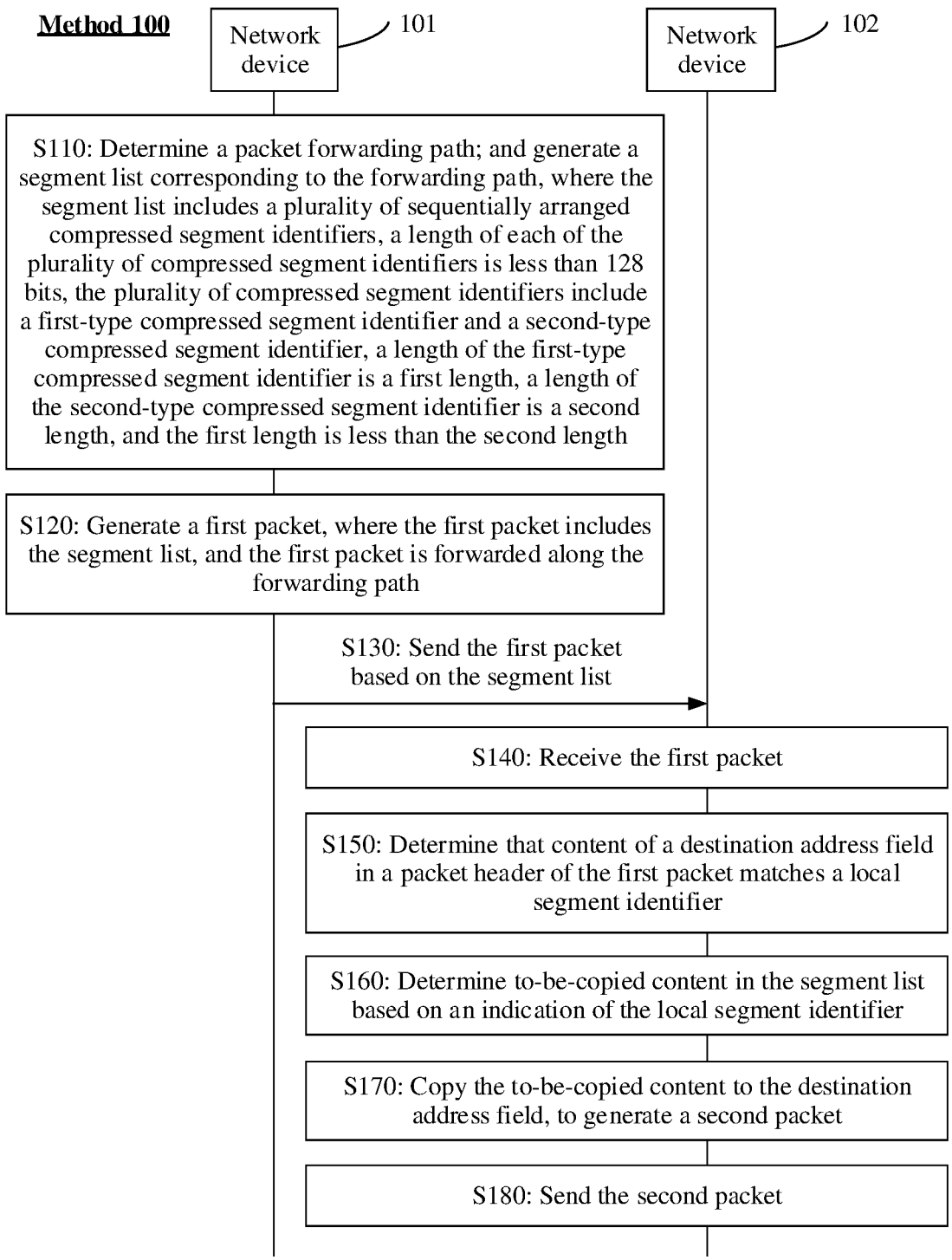
FIG. 8 is a schematic flowchart of a packet forwarding method according to an embodiment of the present invention.

FIG. 8 is a flowchart of a method 100. A network device 101 and a network device 102 are used in the method 100. The network device 101 is a head node on a packet forwarding path. For example, when the packet forwarding path is shown by the dashed line in FIG. 2, the network device 101 may be the network device S in the application scenario shown in FIG. 2, and the network device 102 is another network device other than the head node on the packet forwarding path. For example, the network device 102 may be one of the network device 1 to the network device 9 in the application scenario shown in FIG. 2.

The method 100 includes the following steps:

S110: The network device 101 determines a packet forwarding path; and generates a segment list corresponding to the forwarding path, where the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length.

With reference to the application scenario shown in FIG. 2, the network device 101 may be the network device S in FIG. 2. Optionally, the network device S may be an ingress device of an SRv6 network. The network device 101 obtains the segment list corresponding to the forwarding path. As shown in FIG. 2, the forwarding path includes a plurality of network devices. Specifically, the forwarding path sequentially passes through the network device 1 to the network device 10.

The packet forwarding path may be generated by a controller, or may be generated by the network device S. When the packet forwarding path is generated by the controller, the segment list corresponding to the packet forwarding path may also be generated by the controller. In this case, the controller sends the generated segment list to the network device S. Specifically, the controller sends a control packet to the network device S, where the control packet includes the segment list. The network device S receives the control packet from the controller, to obtain the segment list. When the packet forwarding path is generated by the network device S, the segment list corresponding to the packet forwarding path may also be generated by the network device S. In this case, the network device S determines the packet forwarding path, and generates the segment list corresponding to the forwarding path.

As described above, the segment list includes a plurality of sequentially arranged compressed segment identifiers. The plurality of compressed segment identifiers may include an SID whose length is 128 bits, or may include a C-SID whose length is less than 128 bits, or may include an MPIS label and/or an IPv4 address.

As described above, the length of the C-SID may be set during network planning, which may also be referred to as a manner of entire-network planning. In addition, the length of the C-SID is related to a network scale. For example, when a network topology includes more network nodes, to identify more network nodes, the length of the C-SID is longer. On the contrary, when the network topology includes fewer network nodes, the length of the C-SID is shorter. When more behaviors are used for processing packets in a network, the length of the C-SID is longer. On the contrary, when fewer behaviors are used for processing the packets on the network, the length of the C-SID is shorter. For example, the network topology includes 100 nodes, and the network includes 10 types of behaviors. In this case, to distinguish between different behaviors of different nodes, a quantity of C-SIDs cannot be less than 1000, and the length of the C-SID cannot be less than 10 bits. If it is considered that the length of the C-SID needs to implement 8-bit alignment, the length of the C-SID cannot be less than 16 bits. It can be learned that the length of the C-SID cannot be shortened unlimitedly. When all C-SIDs in a subnet have a same length, the same length has a compressed limit value. If the length of the C-SID is less than the compressed limit value, a network node or a behavior corresponding to the C-SID cannot be distinguished, causing a network error.

In this embodiment of this application, the segment list may include C-SIDs with different lengths, for example, the first-type C-SID and the second-type C-SID. The length of the first-type C-SID is the first length, the length of the second-type C-SID is the second length, and the length of the first-type C-SID is less than the length of the second-type C-SID. A prefix part corresponding to the first-type C-SID is the same as a prefix part corresponding to the second-type C-SID. In other words, the first-type C-SID and the second-type C-SID are located in a same SRv6 compressed subpath segment. In other words, in this embodiment of this application, the C-SIDs in the network are classified, each type of the C-SID is separately planned during network planning, and different types of C-SIDs are planned with different lengths. The first-type C-SID is only for some packet processing behaviors in the network. In comparison with distinguishing between all packet processing behaviors in the network, the length of the C-SID necessary for distinguishing between some packet processing behaviors is shorter. Therefore, the first-type C-SID may be planned to have a shorter length, in other words, the length of some C-SIDs is further shortened. For the second-type C-SID, the length of the second-type C-SID may still be consistent with that in the entire-network planning, in other words, a length of some remaining C-SIDs does not need to increase. Therefore, when the first-type C-SID and the second-type C-SID are orchestrated in the SID list in a mixed manner, the length of the SID list can be further shortened.

For example, in the C-SIDs with different lengths, the first-type C-SID with a shorter length may correspond to a behavior that appears more frequently in the network, and the second-type C-SID with a longer length may correspond to a behavior that appears less frequently in the network. Compared with a quantity of all behaviors in the network, a quantity of behaviors that appear more frequently is smaller. When planning is separately performed for the behaviors that appear more frequently, a quantity of first-type C-SIDs necessary for distinguishing between the behaviors that appear more frequently is smaller. In this case, the length of the first-type C-SID can be further shortened. When planning is performed for the remaining behaviors that appear less frequently, the length of the corresponding second-type C-SID may be consistent with that in the entire-network planning. For example, the network topology includes 100 nodes, and the network includes 10 types of behaviors, where a behavior 1 appears more frequently. If planning is separately performed for the behavior 1, to distinguish between the behaviors 1 of the 100 nodes, the quantity of first-type C-SIDs cannot be less than 100. In this case, the length of the first-type C-SID may be at least 7 bits. If it is considered that the length of the C-SID needs to implement 8-bit alignment, the length of the first-type C-SID cannot be less than 8 bits. In other words, in comparison with the entire-network planning, the length of the first-type C-SID decreases by 8 bits. However, for the second-type C-SID, to distinguish between nine types of behaviors of the remaining 100 nodes, the quantity of second-type C-SIDs cannot be less than 90. In this case, the length of the second-type C-SID may still be consistent with that in the entire-network planning. In other words, the length of the second-type C-SID is still 16 bits, and the length of the second-type C-SID does not need to increase. Therefore, when the first-type C-SID and the second-type C-SID are orchestrated in the SID list in a mixed manner, the length of the SID list can be further shortened, and when the quantity of first-type C-SIDs included in the SID list is larger, the technical effect is more evident.

The application scenario shown in FIG. 2 is used as an example for description. On the forwarding path shown by the dashed line in FIG. 2, the network devices 1 to 4 and the network devices 8 and 9 execute the behavior 1 that appears more frequently, and the network devices 5 to 7 respectively execute a behavior 2, a behavior 3, and a behavior 4 that appear less frequently. Therefore, the SID list corresponding to the forwarding path may include first-type C-SIDs corresponding to the network devices 1 to 4 and the network devices 8 and 9, and second-type C-SIDs corresponding to the network devices 5 to 7.

For example, in the C-SIDs with different lengths, the first-type C-SIDs with a shorter length may correspond to a behavior of an End type and some behaviors of an End.X type in the network, and the second-type C-SIDs with a longer length may correspond to other behaviors of an End.X type in the network. Specifically, the first-type C-SID includes a global node C-SID and a local link C-SID. The global node C-SID corresponds to a processing behavior executed by a specific network device in the network, and the local link C-SID corresponds to a processing behavior executed by a current network device through a specific link on the current network device. The second-type C-SID is a global link C-SID. The global link C-SID corresponds to a processing behavior executed by a specific network device in the network through a specific link on the specific network device. To distinguish between the specific links on the specific network device, a larger quantity of global link C-SIDs need to be planned. However, a quantity of global node C-SIDs necessary for distinguishing between the specific network devices is smaller, or a quantity of local link C-SIDs necessary for distinguishing between the specific links on the current network device is smaller.

For example, the network topology includes 100 nodes, and each node includes four links. That is, the network topology includes 400 links. If entire-network planning is performed for all nodes and all links, to distinguish between all the nodes and all the links, a quantity of C-SIDs cannot be less than 500, and a length of the C-SID cannot be less than 9 bits. If it is considered that the length of the C-SID needs to implement 8-bit alignment, the length of the C-SID cannot be less than 16 bits. However, if first-type C-SIDs, including global node C-SIDs, are planned for all the nodes, and second-type C-SIDs, including global link C-SIDs, are planned for all the links, to distinguish between the 100 nodes, a quantity of first-type C-SIDs cannot be less than 100. Even if it is considered to distinguish between the four local links, a quantity of first-type C-SIDs cannot be less than 104. In this case, the length of the first-type C-SID may be at least 7 bits. If it is considered that the length of the C-SID needs to implement 8-bit alignment, the length of the first-type C-SID cannot be less than 8 bits. In other words, in comparison with the entire-network planning, the length of the first-type C-SID decreases by 8 bits. However, for the second-type C-SIDs, to distinguish between 500 links, a quantity of second-type C-SIDs cannot be less than 500. In this case, the length of the second-type C-SID may still be consistent with that in the entire-network planning. In other words, the length of the second-type C-SID is still 16 bits, and the length of the second-type C-SID does not need to increase. Therefore, when the first-type C-SID and the second-type C-SID are orchestrated in the SID list in a mixed manner, the length of the SID list can be further shortened, and when the quantity of first-type C-SIDs included in the SID list is larger, the technical effect is more evident.

The application scenario shown in FIG. 2 is used as an example for description. For the network devices 5 to 7, each network device has two links respectively connected to other two network devices. To be specific, the network device 5 has two links respectively connected to the network device 6 and the network device 7. The network device 6 and the network device 7 are similar. To specify the forwarding path shown by the dashed line in FIG. 2, a specific link needs to be specified at the network devices 5 to 7. Specifically, the SID list corresponding to the forwarding path may include global nodes C-SIDs corresponding to the network devices 1 to 4 and the network devices 8 and 9, and global links C-SIDs corresponding to the network devices 5 to 7.

Optionally, the global link C-SID includes the global node C-SID and the local link C-SID. The application scenario shown in FIG. 2 is used as an example for description. A prefix in the subnet is A1, a length is 64 bits, global nodes C-SIDs corresponding to the network devices 1 to 9 are respectively B1 to B9, a length is 16 bits, a common local link C-SID corresponding to the network devices 1 to 9 is C1, a behavior corresponding to the local link C-SID is sending a packet to a next-hop neighbor through an outbound interface 1, a common local link C-SID further corresponding to the network devices 5 to 7 is C2, a behavior corresponding to the local link C-SID is sending a packet to a next-hop neighbor through an outbound interface 2, and lengths of C1 and C2 are both 16 bits. In this case, the network device 5 corresponds to two global link C-SIDs. The first global link C-SID is B5:C1, and the second global link C-SID is B5:C2. The network device 6 and the network device 7 are similar.

When the SID list is [B9, B8, B7, B6, B5, B4, B3, B2, B1], the SID list specifies a forwarding path that sequentially passes through the network devices 1 to 9, and the forwarding path is a loose path. When the SID list is [B9, B8, B7:C1, B6:C1, B5:C1, B4, B3, B2, B1], the SID list specifies the forwarding path shown by the dashed line in FIG. 2. The forwarding path includes a strict forwarding path from the network device 5 to the network device 6 through a link corresponding to an outbound interface 1, then from the network device 6 to the network device 7 through the link corresponding to the outbound interface 1, and from the network device 7 to the network device 8 through the link corresponding to the outbound interface 1.

Optionally, the first-type C-SID and the second-type C-SID may be included in a same element in the SID list. In other words, the segment list includes an element whose length is 128 bits, and the element includes the first-type C-SID and the second-type C-SID.

Figure 9:
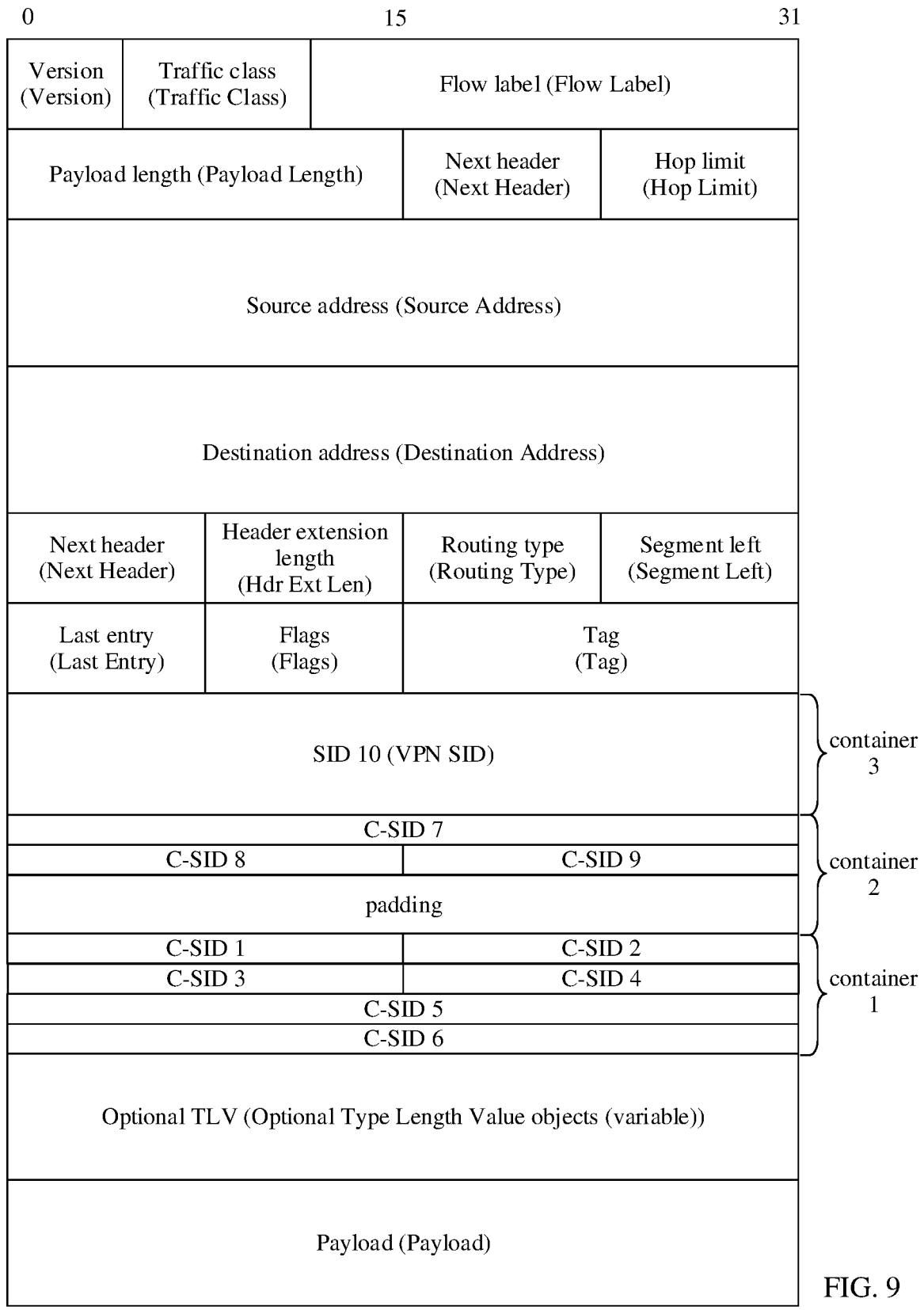
FIG. 9 is a schematic diagram of a packet according to an embodiment of the present invention.

With reference to the application scenario shown in FIG. 2, an SID list including C-SIDs with different lengths is shown in FIG. 9. Segments executed by the network devices 1 to 4, the network device 8, and the network device 9 may be represented by C-SIDs whose lengths are 16 bits, namely, a C-SID 1 to a C-SID 4, a C-SID 8, and a C-SID 9. Segments executed by the network devices 5 to 7 may be represented by C-SIDs whose lengths are 32 bits, namely, a C-SID 5 to a C-SID 7. A segment executed by the network device 10 may be represented by an SID whose length is 128 bits, namely, an SID 10. An arrangement sequence of the C-SIDs and/or the SID list is still based on an execution sequence of the corresponding segments in a packet processing process. In other words, the arrangement sequence is from the C-SID 1 to the C-SID 9, and then to the SID 10.

The SID list includes three containers. The first container includes six C-SIDs, namely, a C-SID 1 to a C-SID 6, where lengths of the C-SID 1 to the C-SID 4 are 16 bits, and lengths of the C-SID 5 and the C-SID 6 are 32 bits. The second container includes three C-SIDs, namely, a C-SID 7 to a C-SID 9, where a length of the C-SID 7 is 32 bits, lengths of the C-SID 8 and the C-SID 9 are 16 bits, and last 64 bits of the container 2 are padding. The third container includes one SID, namely, an SID 10. In comparison with the SID list shown in FIG. 7, a total length of the SID list shown in FIG. 9 decreases by 128 bits. It can be learned that when the SID list includes the C-SIDs with different lengths, lengths of some C-SIDs may be further shortened, and therefore the length of the entire SID list is further shortened, so that network efficiency is improved. When a quantity of C-SIDs in the SID list is large, the technical effect is more evident.

Optionally, a length of the second-type C-SID is an integer multiple of a length of the first-type C-SID. For example, the length of the first-type C-SID is 16 bits, and the length of the second-type C-SID is 32 bits.

Optionally, both the length of the first-type C-SID and the length of the second-type C-SID are integer multiples of a unit length. In other words, there is a greatest common divisor between a length value of the first-type C-SID and a length value of the second-type C-SID, and the greatest common divisor is a value of the unit length.

Optionally, the length of the SID is also an integer multiple of the unit length. In other words, 128 bits are the integer multiple of the unit length.

Optionally, the unit length is ($N^{th}$ power of 2) bits, where N is an integer greater than or equal to 3 and less than 7.

For example, the unit length is 8 bits, the length of the first-type C-SID is 16 bits, and the length of the second-type C-SID is 32 bits.

Optionally, the length of the first-type C-SID is the unit length. In other words, the length of the C-SID with a shorter length is used as the unit length.

For another example, the unit length is 16 bits, the length of the first-type C-SID is 16 bits, and the length of the second-type C-SID is 32 bits.

Optionally, when the SID list includes the C-SIDs with different lengths, the C-SIDs with different lengths may include C-SIDs with two or more lengths. Optionally, the SID list further includes a third-type C-SID, a length of the third-type C-SID is greater than the length of the first-type C-SID, and the length of the third-type C-SID is less than the length of the second-type C-SID. In other words, the length of the third-type C-SID is between the length of the first-type C-SID and the length of the second-type C-SID, the first-type C-SID is a C-SID with a shortest length, the second-type C-SID is a C-SID with a longest length.

Optionally, the length of the third-type C-SID is an integer multiple of a unit length. In other words, there is a greatest common divisor among the length value of the first-type C-SID, the length value of the second-type C-SID, and a length value of the third-type C-SID, and the greatest common divisor is a value of the unit length. For example, the unit length is 16 bits, the length of the first-type C-SID is 16 bits, the length of the third-type C-SID is 32 bits, and the length of the second-type C-SID is 64 bits.

Similar to the foregoing descriptions, the third-type C-SID may correspond to, for example, a behavior that appears less most frequently in the network. Therefore, more detailed classification planning is performed on the C-SIDs based on different appearance frequencies, so that the length of the SID list is shortened, and network efficiency is improved.

When the SID list further includes a fourth-type C-SID or more types of C-SIDs, a rule and a planning manner of a length value of the C-SID are similar to those in the foregoing descriptions. Details are not described herein again.

S120: The network device 101 generates a first packet, where the first packet includes the segment list, and the first packet is forwarded along the forwarding path.

As a head node of the packet forwarding path, the network device 101 encapsulates the SID list into a received data packet, to indicate a forwarding path of the data packet. For example, the network device 101 encapsulates, inside an IPv6 packet header of a received IPv6 data packet, an SRH including the SID list, to form an SRv6 data packet. In other words, the first packet is an SRv6 data packet. According to a packet forwarding mechanism of an SRv6 network, the network device 101 obtains the segment list corresponding to the forwarding path of the first packet, and encapsulates the segment list into the first packet, so that a process of processing the first packet can be carried in the packet, and is transferred to each network device on the forwarding path of the first packet. Each network device on the forwarding path sequentially executes a packet processing behavior related to the network device.

Optionally, when encapsulating the SRv6 data packet, the network device 101 may further set a pointer in the SRv6 data packet to help accurately locate each location in the SID list.

As described above, when the SID list includes the C-SIDs with different lengths, the foregoing extended pointer may still be used to accurately locate all the G-SIDs in the SID list. The extended pointer specifically includes two manners: a one-dimensional pointer or a two-dimensional pointer. It is easy to understand that in this case, the G-SID includes the C-SIDs with different lengths. In the two-dimensional pointer, the first dimensional pointer, namely, an SL pointer, still indicates a specific element in the SID list, while the second dimensional pointer, namely, an SI, further indicates a specific G-SID inside an element. In the one-dimensional pointer, the one-dimensional pointer, namely, the SI, indicates a specific G-SID in the SID list.

The extended pointer is set by the network device 101 in the second packet, and the network device 101 sets an initial value of the one-dimensional pointer or the two-dimensional pointer in the second packet. Optionally, in the two-dimensional pointer, an initial value of the SL pointer is set to N−1, and an initial value of the SI is set to M, where N is a quantity of containers included in the SID list, and M is a quantity of unit lengths included in each container. In other words, the unit length is an offset step of the SI. Optionally, in the one-dimensional pointer, an initial value of the SI is set to N, where N is a quantity of unit lengths included in the SID list. In other words, the unit length is an offset step of the SI. As described above, the unit length is preferably the length of the first-type C-SID. The two-dimensional pointer is used as an example. With reference to the application scenario shown in FIG. 2 and a packet structure shown in FIG. 9, the unit length is the length of the first-type C-SID, namely, 16 bits. The network device S sets the initial value of the SL pointer to 2, and sets the initial value of the SI to 8. A segment [2][8] represents a C-SID 1, and corresponds to a first executed segment in a packet forwarding process.

Other details of the extended pointer are similar to those in the foregoing descriptions. Details are not described herein again. A manner of updating the extended pointer is described in detail in subsequent steps.

Optionally, when encapsulating the SRv6 data packet, the network device 101 may further place, in a DA field in the IPv6 packet header of the SRv6 data packet, a prefix corresponding to the C-SID in the SID list. Optionally, when encapsulating the SRv6 data packet, the network device 101 may further place the first G-SID in the SID list behind the prefix in the DA field. With reference to the application scenario shown in FIG. 2 and the packet structure shown in FIG. 9, the network device S places the prefix at a beginning of the DA field, and places the C-SID 1 behind the prefix in the DA field, so that an SID 1 is restored by using content (prefix+C-SID 1) in the DA field.

Optionally, the network device 101 may further place a plurality of G-SIDs including the first G-SID in the DA field, and the plurality of G-SIDs are sequentially arranged behind the prefix. For example, the C-SID 2 is arranged behind the C-SID 1. Therefore, the SID 1 restored by using (prefix+C-SID 1) is not affected.

It should be noted that, after placing the first G-SID in the SID list in the DA field, the network device 101 does not update a value of the extended pointer. In other words, after the network device 101 places the first G-SID in the SID list in the DA field, the value of the extended pointer is still the initial value. That is, for the second packet, a G-SID in the SID list to which the extended pointer points is the G-SID included in the DA field. The two-dimensional pointer is used as an example. With reference to the application scenario shown in FIG. 2 and the packet structure shown in FIG. 9, the network device S places the C-SID 1 in the DA field of the second packet, the value of the SL pointer in the second packet is still an initial value 2, the value of the SI is still an initial value 8, and a segment [SL][SI] still represents the C-SID 1.

As described above, when the SID list includes the C-SIDs with different lengths, a related C-SID or SID may still include the continue of compression information, and the network device learns of, based on the continue of compression information in the C-SID or SID, a special manner of updating the DA field. Optionally, the first-type C-SID and the second-type C-SID may both include the continue of compression information. Optionally, the continue of compression information may be included in the SIDs or the C-SIDs. Preferably, the continue of compression information may be carried in a function field in the SID or the C-SID, and corresponds to a specific behavior. A flavor carrying the continue of compression information may be referred to as a COC flavor. Pseudocode corresponding to the COC flavor is described in detail in subsequent steps.

With reference to the SID list shown in FIG. 9, each of the C-SID 1 to the C-SID 8 includes the COC flavor, but the C-SID 9 does not include the COC flavor. A corresponding manner of updating the DA field is described in detail in subsequent steps.

S130: The network device 101 sends the first packet along the forwarding path.

When sending the first packet, the network device 101 determines a next-hop network device of the packet according to a longest match rule and based on content of a DA field in an IPv6 packet header of the first packet. As described above, with reference to the application scenario shown in FIG. 2 and the packet structure shown in FIG. 9, as a head node of the forwarding path, the network device S has placed the prefix and the C-SID 1 in the SID list in the DA field of the first packet, and restores the SID 1 by using the content (prefix+C-SID 1) in the DA field of the first packet. The network device S searches a local forwarding entry based on the SID 1, determines that the next-hop network device is the network device 1, and sends the first packet to the network device 1. An endpoint node on the packet forwarding path sequentially receives the packet, updates the content of the DA field based on the SID list, and then forwards the packet based on the content of the DA field, so that the packet is sent along the forwarding path corresponding to the SID list.

S140: The network device 102 receives the first packet.

The network device 102 is an endpoint node other than the head node on the packet forwarding path, and the network device 102 may be one of the network devices 1 to 9 in the application scenario shown in FIG. 2. The network device 102 receives a packet sent by a previous-hop network device in the forwarding path. When the network device 102 is the network device 1 shown in FIG. 2, the first packet received by the network device 1 is the packet sent by the network device S, namely, the SRv6 data packet obtained after the network device S encapsulates the SID list. When the network device 102 is one of the network devices 2 to 9 shown in FIG. 2, a first packet received by the one of the network devices 2 to 9 is an SRv6 data packet updated by a previous-hop network device.

S150: The network device 102 determines that a value of a destination address field in a packet header of the first packet matches a local segment identifier.

The local segment identifier is a locally instantiated SRv6 SID in an FIB stored in the network device 102.

As the endpoint node on the forwarding path, after receiving the first packet, the network device 102 searches the SID in the DA field in the IPv6 packet header of the first packet for the FIB. If the SID in the DA field matches the locally instantiated SRv6 SID, for example, the SID in the DA field is the same as the locally instantiated SRv6 SID, a packet processing behavior corresponding to the locally instantiated SRv6 SID is executed.

S160: The network device 102 determines to-be-copied content in the SID list based on an indication of the local segment identifier.

Optionally, step S160 may be included in the packet processing behavior corresponding to the locally instantiated SRv6 SID, and step S160 may alternatively be a behavior separately performed by the network device 102 in addition to the packet processing behavior corresponding to the locally instantiated SRv6 SID.

Optionally, step S160 includes two steps: S1601 and S1602.

S1601: The network device 102 determines a location of the to-be-copied content in the SID list based on a length indicated by the local segment identifier.

S1602: The network device 102 determines the to-be-copied content based on the location of the to-be-copied content in the SID list.

After matching the local segment identifier based on the content of the DA field of the first packet, the network device 102 can learn of the length indicated by the local segment identifier. The length indicated by the local segment identifier may be a length of a G-SID in an SID list corresponding to the local segment identifier. For convenience, the G-SID in the SID list corresponding to the local segment identifier may be referred to as a local G-SID, and the length of the G-SID in the SID list corresponding to the local segment identifier may be referred to as a length of the local G-SID. That is, the length indicated by the local segment identifier is the length of the local G-SID. With reference to the foregoing descriptions, the local G-SID may be the first-type C-SID or the second-type C-SID.

That is, when the local segment identifier corresponds to the C-SID in the SID list, in other words, the local G-SID is the C-SID, the length indicated by the local segment identifier is the length of the C-SID. With reference to the application scenario shown in FIG. 2 and the packet structure shown in FIG. 9, for the network device 1, the length indicated by the local segment identifier is 16 bits, and for the network device 5, the length indicated by the local segment identifier is 32 bits. Similarly, when the local G-SID is an SID, the length indicated by the local segment identifier is a length of the SID, namely, 128 bits.

The to-be-copied content is content that is to be updated by the network device 102 to the DA field of the first packet. With reference to a packet processing mechanism of the SRv6 network, the to-be-copied content includes a to-be-copied identifier, and the to-be-copied identifier is a G-SID that is in the SID list and that corresponds to the next-hop network device of the network device 102 on the forwarding path, or a G-SID corresponding to a link of the next-hop network device. Therefore, after updating the to-be-copied content to the DA field of the first packet to generate the second packet, the network device 102 can, based on the content in the DA field, continue to forward the second packet.

As described above, in the first packet, the G-SID in the SID list to which the extended pointer points is the G-SID included in the DA field, namely, the local G-SID. For the network device 102, the to-be-copied content includes the to-be-copied identifier, and the to-be-copied identifier is a G-SID that is in the SID list and that corresponds to the next-hop network device of the network device 102 on the forwarding path, or a G-SID corresponding to a link of the next-hop network device. In other words, the to-be-copied identifier is a next G-SID of the local G-SID of the network device 102 in the SID list. Therefore, the network device 102 needs to adjust the value of the extended pointer, so that the extended pointer points to the to-be-copied content, in other words, points to the to-be-copied identifier, to determine a location of the to-be-copied content in the SID list.

When all C-SIDs in a same SRv6 compressed subpath have a same length, the network device offsets a pointer location by the same length, so that the pointer points to a next C-SID in the SID list. However, in this embodiment of this application, the C-SIDs with different lengths are orchestrated in the same SRv6 compressed subpath in the mixed manner. Therefore, at different network devices, offset lengths of the pointer location may be different.

In this embodiment of this application, that the network device 102 determines a location of the to-be-copied content in the SID list based on a length indicated by the local segment identifier specifically includes: The network device 102 offsets a location of the extended pointer based on the length indicated by the local segment identifier, where an offset length of the extended pointer is equal to the length indicated by the local segment identifier, in other words, the offset length of the extended pointer offsets is equal to the length of the local G-SID. Therefore, in the SID list, the location of the extended pointer is updated from pointing to the G-SID corresponding to the local segment identifier to pointing to the next G-SID of the G-SID corresponding to the local segment identifier. That is, the extended pointer points to the to-be-copied content.

To implement that the offset length of the extended pointer is equal to the length indicated by the local segment identifier, when the extended pointer is the one-dimensional pointer or the two-dimensional pointer respectively, processes of adjusting the value of the extended pointer are different.

When the extended pointer is the two-dimensional pointer, the process of adjusting the extended pointer includes: The network device 102 determines a value of the SI based on the length indicated by the local segment identifier, so that the value of the SI indicates a location of the to-be-copied content in an element whose length is 128 bits. Specifically, the network device 102 reads an original value of the SI from the packet header of the first packet, and subtracts an update value from the original value of the SI, to obtain the value of the SI. It can be learned that a length corresponding to the update value is an offset length of the SI. In other words, the length corresponding to the update value is the length of the local G-SID.

For different network devices, the local G-SID may be the first-type C-SID or the second-type C-SID. In other words, the local G-SID may have a different length. Therefore, the update values may be different for different network devices. Optionally, the update value may be a value obtained by dividing the length of the local G-SID by the unit length. That is, the length corresponding to the update value is an integer multiple of the unit length. In other words, the offset length of the SI is an integer multiple of the unit length. For example, when the unit length is 16 bits, if the length indicated by the local segment identifier is 16 bits, the update value is 1; and if the length indicated by the segment identifier is 32 bits, the update value is 2. Preferably, the unit length is the length of the first-type C-SID.

Further, the network device 102 determines, based on the value of the SI, the location of the to-be-copied content in the element whose length is 128 bits, and determines the location of the element in the SID list based on the value of the SL pointer. It should be noted that in this process, the value of the SL pointer may need to be adjusted. In addition, after the value of the SL pointer is adjusted, the value of the SI may need to be set to the initial value. For example, when the local G-SID is a last G-SID in the element, in other words, the next G-SID of the local G-SID in the SID list is located in a next element, the value of the SL pointer needs to be adjusted, so that the SL pointer points to the next element, and the value of the SI is set to the initial value. Therefore, the SI points to the first G-SID in the next element. Alternatively, when the SI points to a padding part in the current element after being offset, for example, the value of the SI is 1, and remaining 16 bits in the element are all 0, or the value of the SI is 2, and remaining 32 bits in the element are all 0, the value of the SL pointer needs to be adjusted, so that the SL pointer points to the next element.

When the extended pointer is the one-dimensional pointer, the process of adjusting the extended pointer includes: The network device 102 determines a value of the SI based on the length indicated by the local segment identifier, so that the value of the SI indicates a location of the to-be-copied content in the SID list. The network device 102 determines the location of the to-be-copied content in the SID list based on the value of the SI. Specifically, the network device 102 reads an original value of the SI from the packet header of the first packet, and subtracts an update value from the original value of the SI, to obtain the value of the SI. The update value of the SI is similar to that in the foregoing descriptions. Details are not described herein again.

Optionally, the network device 102 writes the value of the extended pointer into the first packet. In other words, an updated packet header of the first packet, namely, a packet header of the second packet described subsequently, includes the value of the extended pointer.

S170: The network device 102 copies the to-be-copied content to the destination address field, to generate a second packet. The second packet is a packet including the updated DA field.

When all the C-SIDs in the same SRv6 compressed subpath have a same length, each time the network device updates the DA field in the packet, the to-be-copied content has a same length, and the length of the to-be-copied content is the same as the length of all the C-SID. However, in this embodiment of this application, the C-SIDs with different lengths are orchestrated in the same SRv6 compressed subpath in the mixed manner. Therefore, the length of the to-be-copied content cannot be the same as the length of all the C-SIDs.

In this embodiment of this application, the length of the to-be-copied content is the same as the length of the second-type C-SID, or the length of the to-be-copied content is 128 bits. The second-type C-SID is a C-SID with a longest length. Specifically, when the local G-SID carries the COC information, the next G-SID in the SID list is still the C-SID, in other words, the to-be-copied identifier is still the C-SID, and the length of the to-be-copied content is the same as the length of the second-type C-SID. When the local G-SID does not carry the COC information, in other words, the to-be-copied identifier is the SID, the length of the to-be-copied content is 128 bits. For example, the length of the first-type C-SID is 16 bits, the length of the second-type C-SID is 32 bits, and the length of the to-be-copied content is 32 bits. Therefore, regardless of whether the to-be-copied identifier is the first-type C-SID or the second-type C-SID, the length of the to-be-copied content is greater than or equal to the length of the to-be-copied identifier, so that it is ensured that the next G-SID is completely updated to the DA field of the first packet. It can be learned that the to-be-copied content includes the to-be-copied identifier, and the length of the to-be-copied content is greater than or equal to the length of the to-be-copied identifier.

Optionally, the length of the to-be-copied content may be configured in the network device 102, or the length of the to-be-copied content may be carried in the first packet, and is read by the network device 102 from the first packet.

Optionally, the length of the to-be-copied content may be determined based on the local segment identifier. Specifically, when the local G-SID carries the COC information, the to-be-copied identifier is still the C-SID, and the network device 102 places the to-be-copied content behind the prefix in the DA field to overwrite the original local G-SID, so that the SID corresponding to the to-be-copied identifier is restored by using the to-be-copied identifier and the prefix. When the local G-SID does not carry the COC information, in other words, the to-be-copied identifier is the SID, the network device 102 places the to-be-copied content in the DA field, to overwrite 128 bits including the prefix, so that the DA field includes only the to-be-copied content.

Optionally, the length of the to-be-copied content may alternatively be determined by parsing partial content of the next element in the segment list. Specifically, when the current identifier is a last subelement in the element, the network device 102 parses the partial content of the next element, in other words, parses the to-be-copied content. If the partial content of the next element is not a common part of prefixes in all subpaths, it is determined that the C-SIDs in the SID list continue to be arranged, in other words, the current SRv6 compressed subpath does not end, and the to-be-copied identifier is still the C-SID. The network device 102 places the to-be-copied content behind the prefix in the DA field, to overwrite an original local G-SID, so that the SID corresponding to the to-be-copied identifier is restored by using the to-be-copied identifier and the prefix. If the partial content of the next element is a common part of prefixes in all subpaths, it is determined that the C-SIDs in the SID list do not continue to be arranged, in other words, the current SRv6 compressed subpath ends, and the to-be-copied identifier is the SID. The network device 102 places the to-be-copied content in the DA field, to overwrite 128 bits including the prefix, so that the DA field includes only the to-be-copied content.

An example is used for description with reference to the application scenario shown in FIG. 2 and the packet structure shown in FIG. 9. The length of the first-type C-SID is 16 bits, the length of the second-type C-SID is 32 bits, the unit length is the length of the first-type C-SID, namely, 16 bits, and a to-be-copied length is the length of the second-type C-SID, namely, 32 bits.

Figure 10:
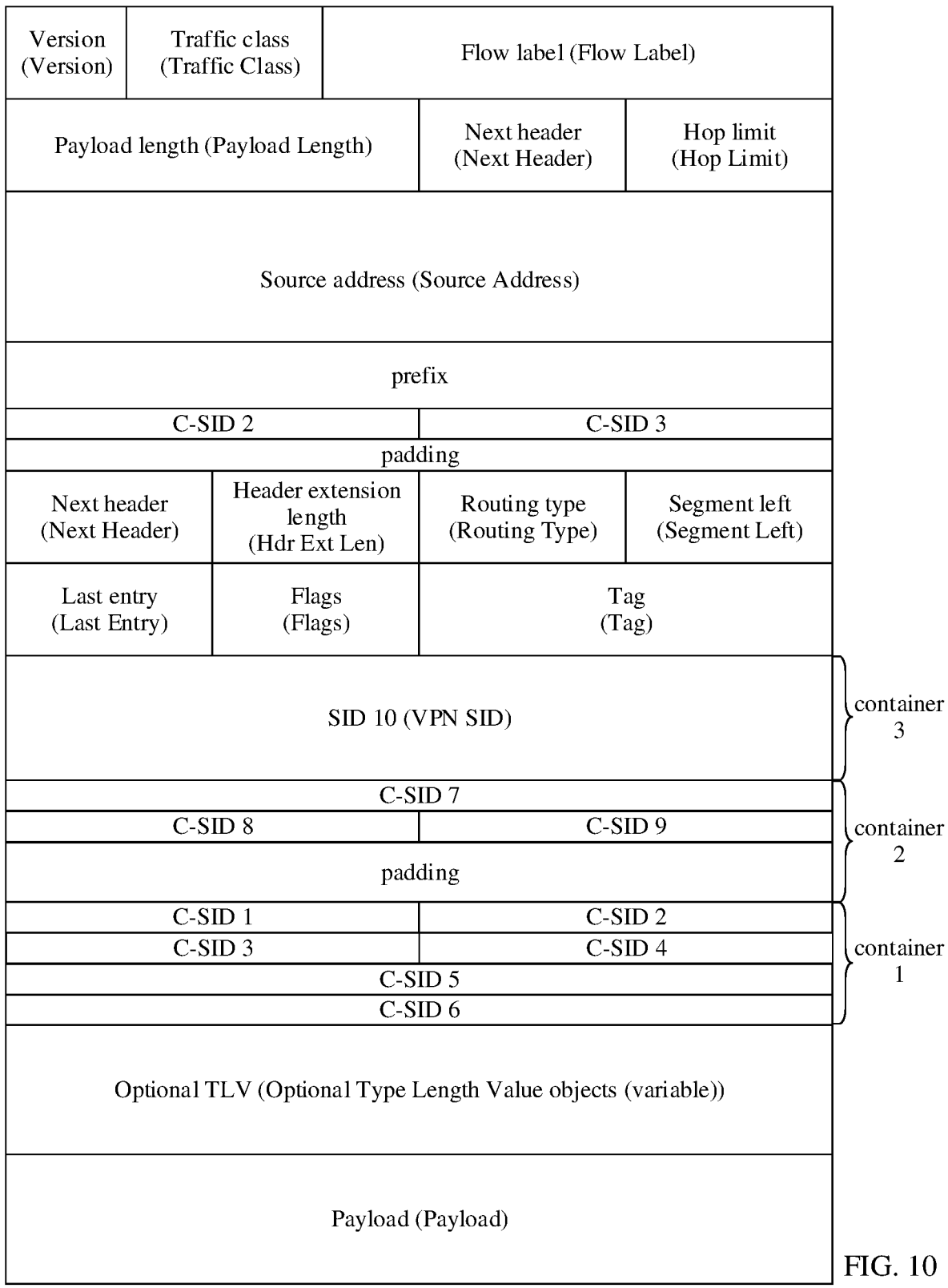
FIG. 10 is a schematic diagram of a packet according to an embodiment of the present invention.

When the network device 102 is the network device 1, the network device 1 receives a packet. A value of an SL pointer in the packet is 2, a value of an SI is 8, a DA field includes a C-SID 1, and the C-SID 1 is a first-type C-SID. That is, a length indicated by a local segment identifier is 16 bits, an update value of the SI is 1, and the value of the SI is 7. In this case, a segment [SL][SI] points to a C-SID 2, and the network device 1 uses 32 bits starting from this as to-be-copied content. To be specific, the to-be-copied content includes the C-SID 2 and a C-SID 3. The network device 1 copies the C-SID 2 and the C-SID 3 to a second field of the packet. An updated packet is shown in FIG. 10. A length of a prefix may be 64 bits.

Figure 11:
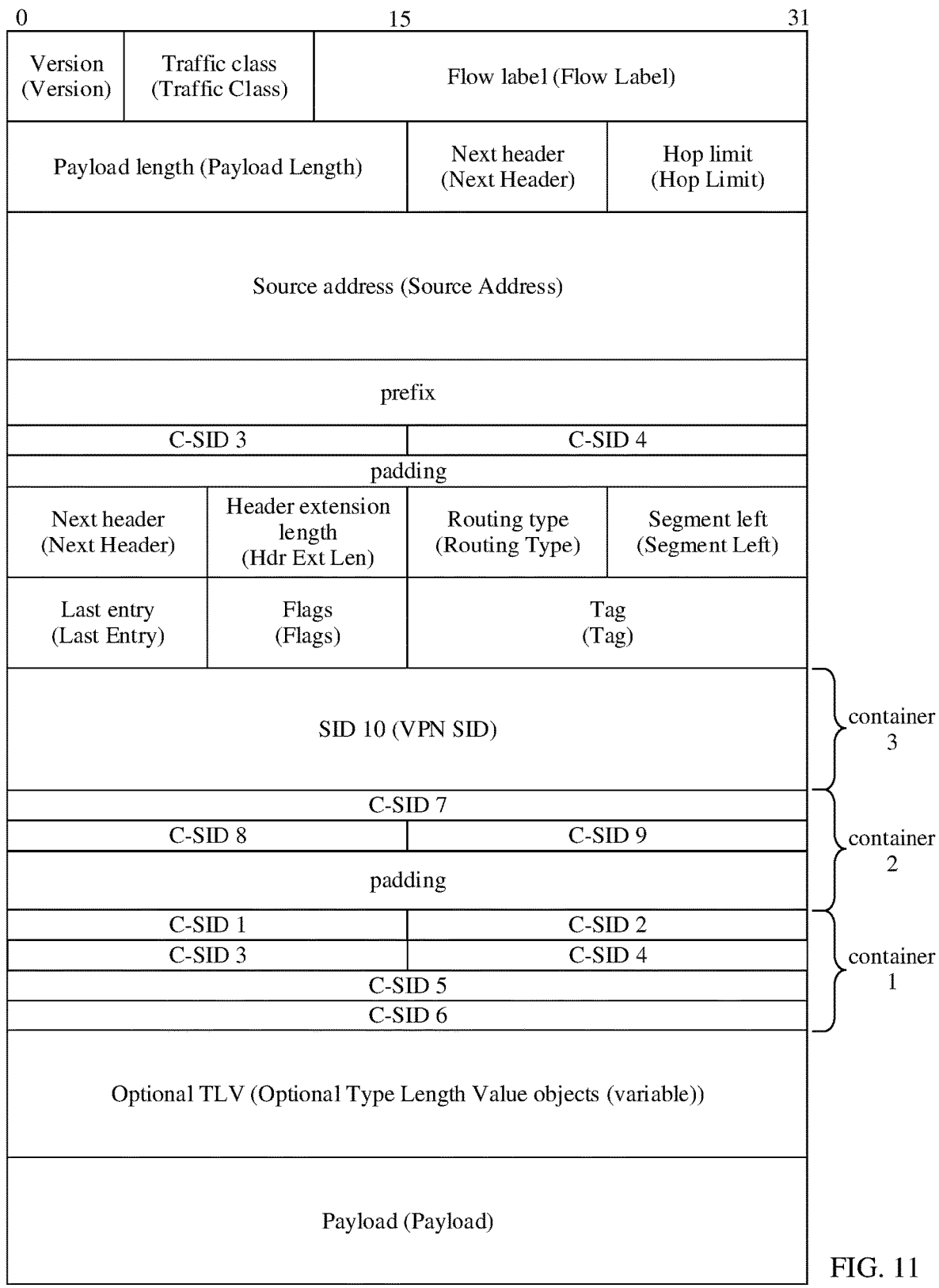
FIG. 11 is a schematic diagram of a packet according to an embodiment of the present invention.

When the network device 102 is the network device 2, the network device 2 receives a packet. A value of an SL pointer in the packet is 2, a value of an SI is 7, a DA field includes a C-SID 2, and the C-SID 2 is a first-type C-SID. That is, a length indicated by a local segment identifier is 16 bits, an update value of the SI is 1, and the value of the SI is 6. In this case, a segment [SL][SI] points to a C-SID 3, and the network device 2 uses 32 bits starting from this as to-be-copied content. To be specific, the to-be-copied content includes the C-SID 3 and a C-SID 4. The network device 2 copies the C-SID 3 and the C-SID 4 to a second field of the packet. An updated packet is shown in FIG. 11.

Figure 12:
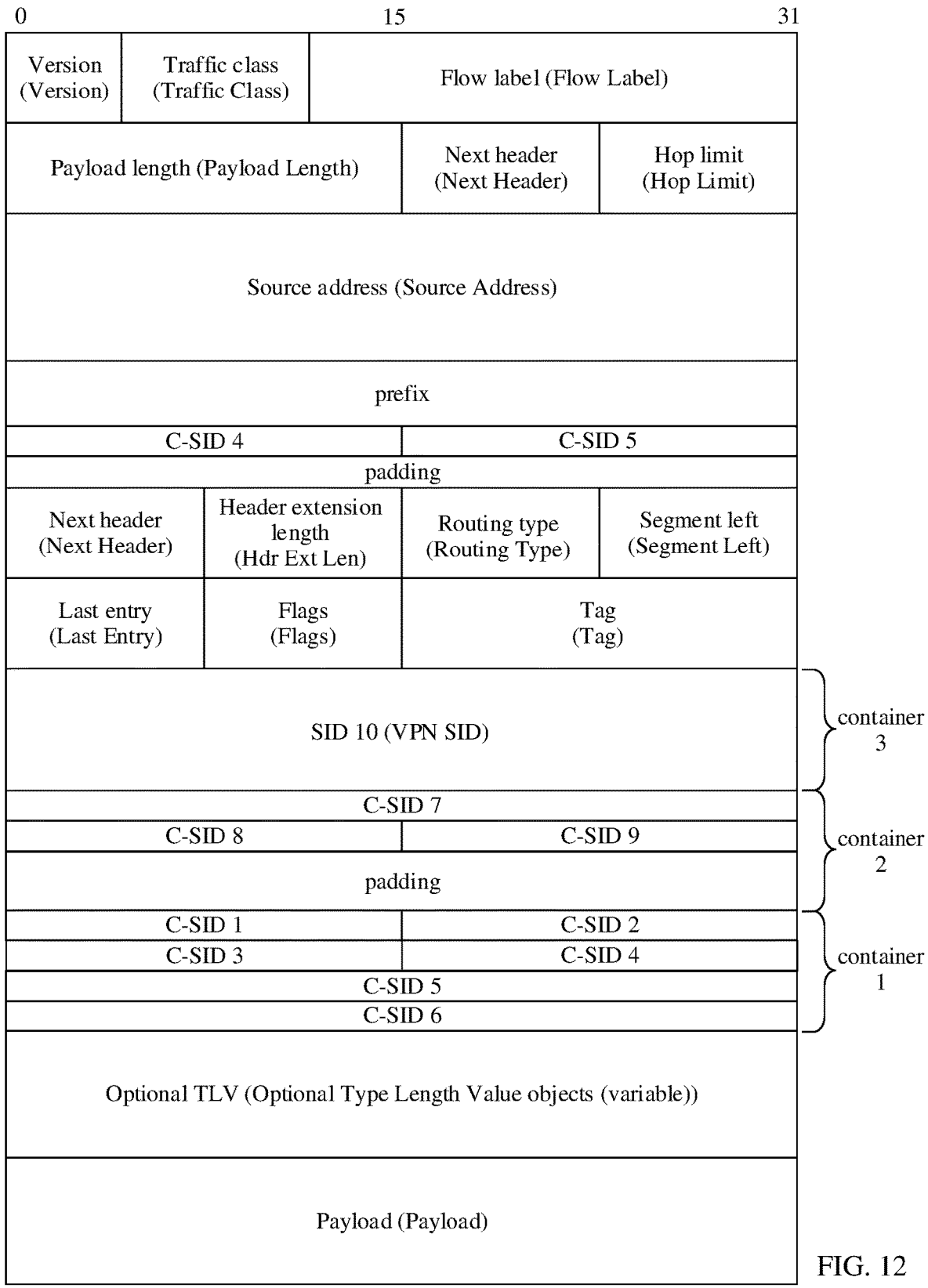
FIG. 12 is a schematic diagram of a packet according to an embodiment of the present invention.

When the network device 102 is the network device 3, the network device 3 receives a packet. A value of an SL pointer in the packet is 2, a value of an SI is 6, a DA field includes a C-SID 3, and the C-SID 3 is a first-type C-SID. That is, a length indicated by a local segment identifier is 16 bits, an update value of the SI is 1, and the value of the SI is 5. In this case, a segment [SL][SI] points to a C-SID 4, and the network device 3 uses 32 bits starting from this as to-be-copied content. To be specific, the to-be-copied content includes first 16 bits of the C-SID 4 and a C-SID 5. The network device 3 copies the first 16 bits of the C-SID 4 and the C-SID 5 to a second field of the packet. An updated packet is shown in FIG. 12.

Figure 13:
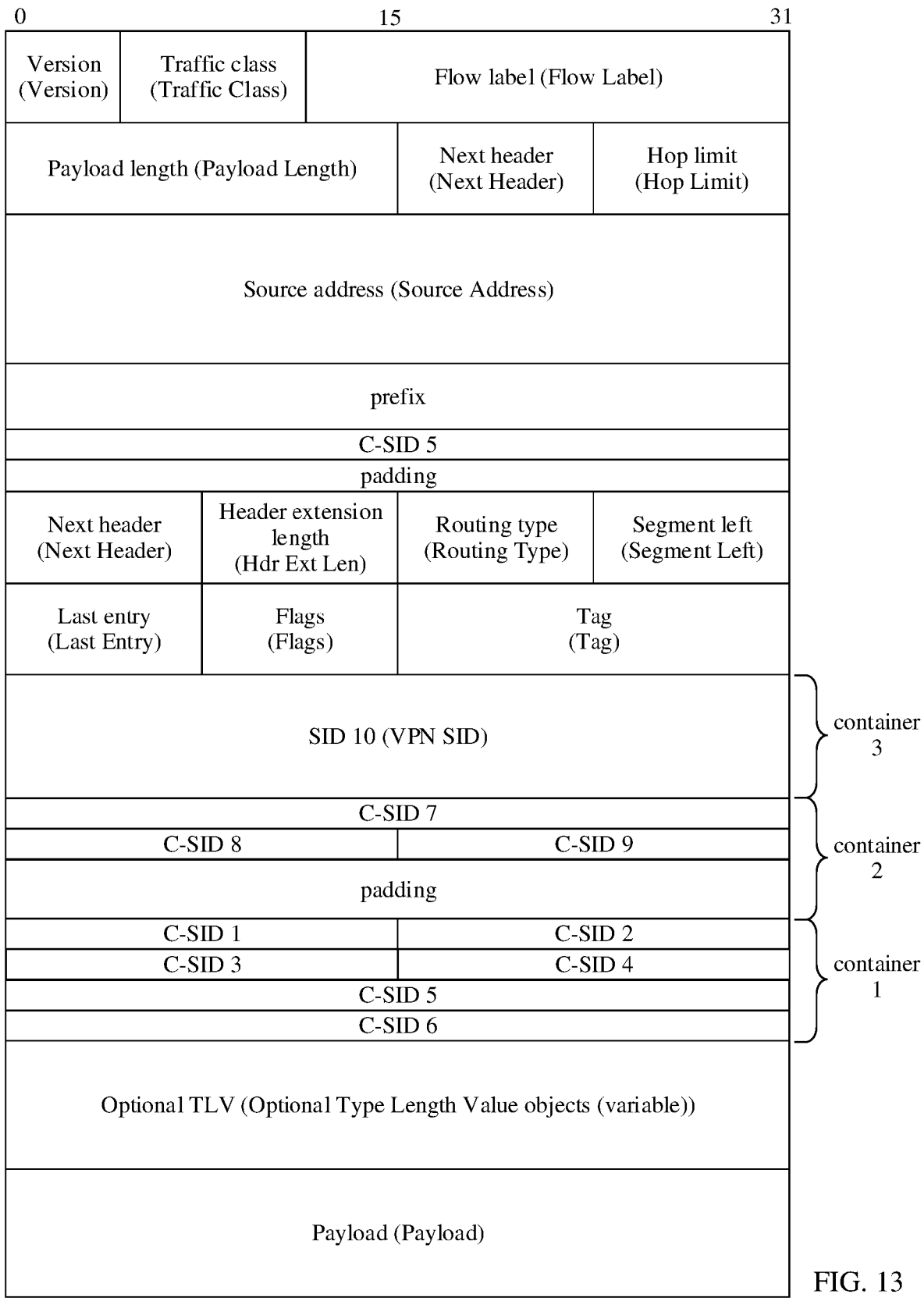
FIG. 13 is a schematic diagram of a packet according to an embodiment of the present invention.

When the network device 102 is the network device 4, the network device 4 receives a packet. A value of an SL pointer in the packet is 2, a value of an SI is 5, a DA field includes a C-SID 4, and the C-SID 4 is a first-type C-SID. That is, a length indicated by a local segment identifier is 16 bits, an update value of the SI is 1, and the value of the SI is 4. In this case, a segment [SL][SI] points to a C-SID 5, and the network device 4 uses 32 bits starting from this as to-be-copied content. To be specific, the to-be-copied content includes the C-SID 5. The network device 4 copies the C-SID 5 to a second field of the packet. An updated packet is shown in FIG. 13.

Figure 14:
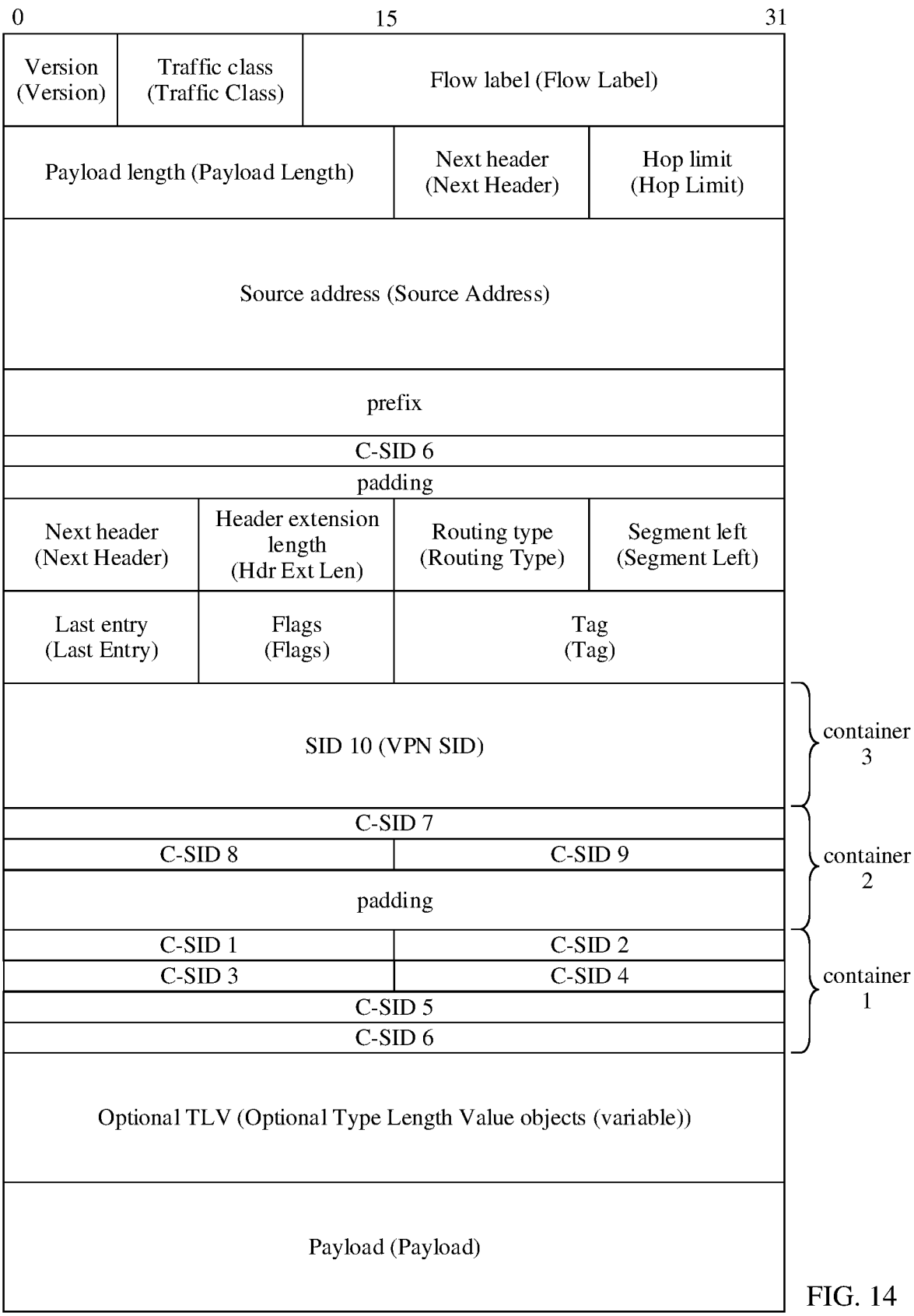
FIG. 14 is a schematic diagram of a packet according to an embodiment of the present invention.

When the network device 102 is the network device 5, the network device 5 receives a packet. A value of an SL pointer in the packet is 2, a value of the SI is 4, a DA field includes a C-SID 5, and the C-SID 5 is a second-type C-SID. That is, a length indicated by the local segment identifier is 32 bits. The update value of the SI is 2, and the value of the SI is 2. In this case, a segment [SL][SI] points to the C-SID 6, the network device 5 uses 32 bits starting from this as the to-be-copied content, that is, the to-be-copied content includes the C-SID 6, and the network device 5 copies the C-SID 6 to a second field of the packet. An updated packet is shown in FIG. 14.

Figure 15:
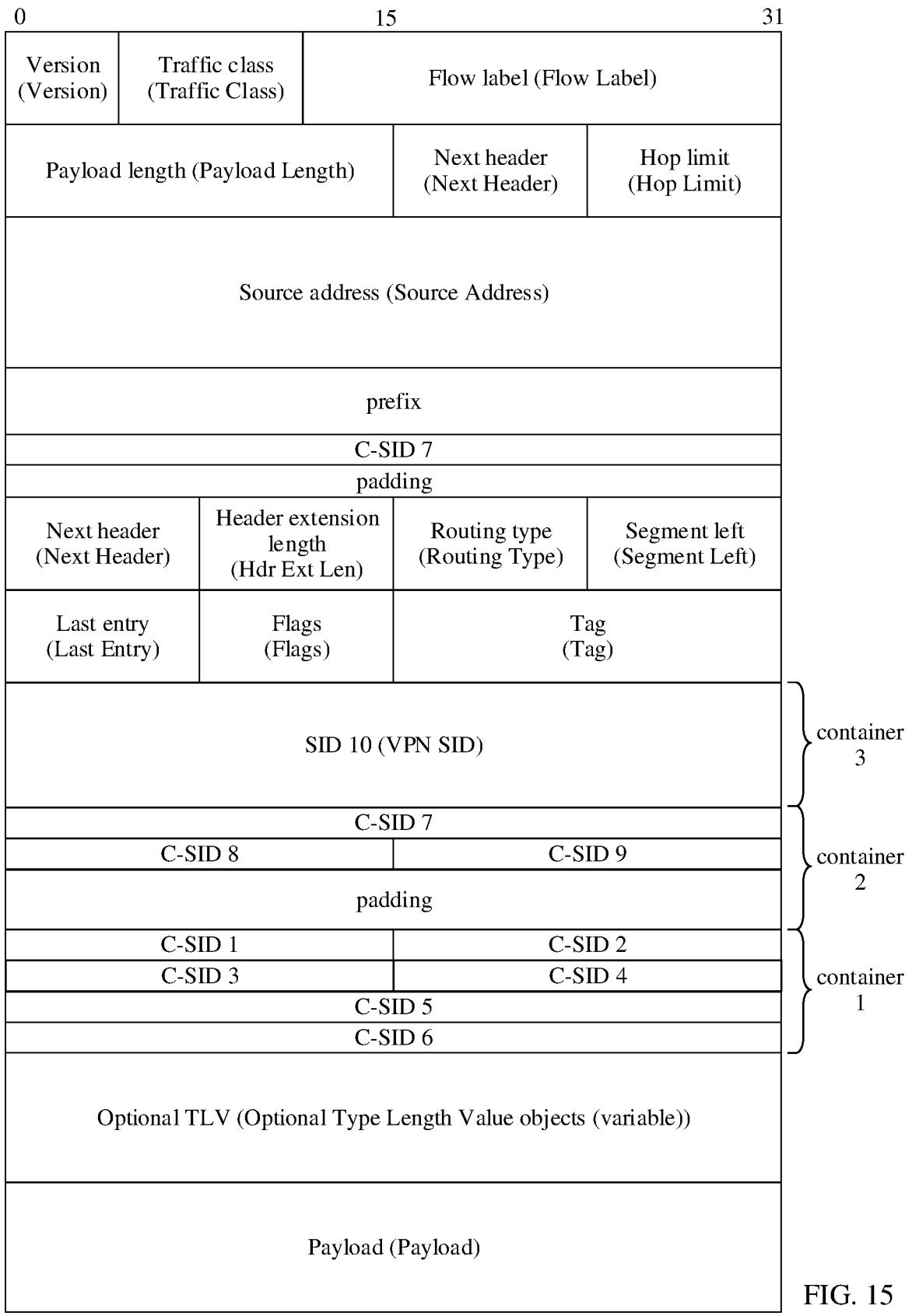
FIG. 15 is a schematic diagram of a packet according to an embodiment of the present invention.

When the network device 102 is the network device 6, the network device 6 receives a packet. A value of an SL pointer in the packet is 2, a value of an SI is 2, a DA field includes a C-SID 6, and the C-SID 6 is a second-type C-SID. That is, a length indicated by a local segment identifier is 32 bits, an update value of the SI is 2, and the value of the SI is 0. That is, the C-SID is a last G-SID in a container 1. The network device 6 subtracts 1 from the value of the SL pointer, that is, the value of the SL is 1, and the SI is set to an initial value 8. In this case, a segment [SL][SI] points to a C-SID 7 in a container 2, the network device 6 uses 32 bits starting from this as to-be-copied content. To be specific, the to-be-copied content includes the C-SID 7. The network device 6 copies the C-SID 7 to a second field of the packet. An updated packet is shown in FIG. 15.

Figure 16:
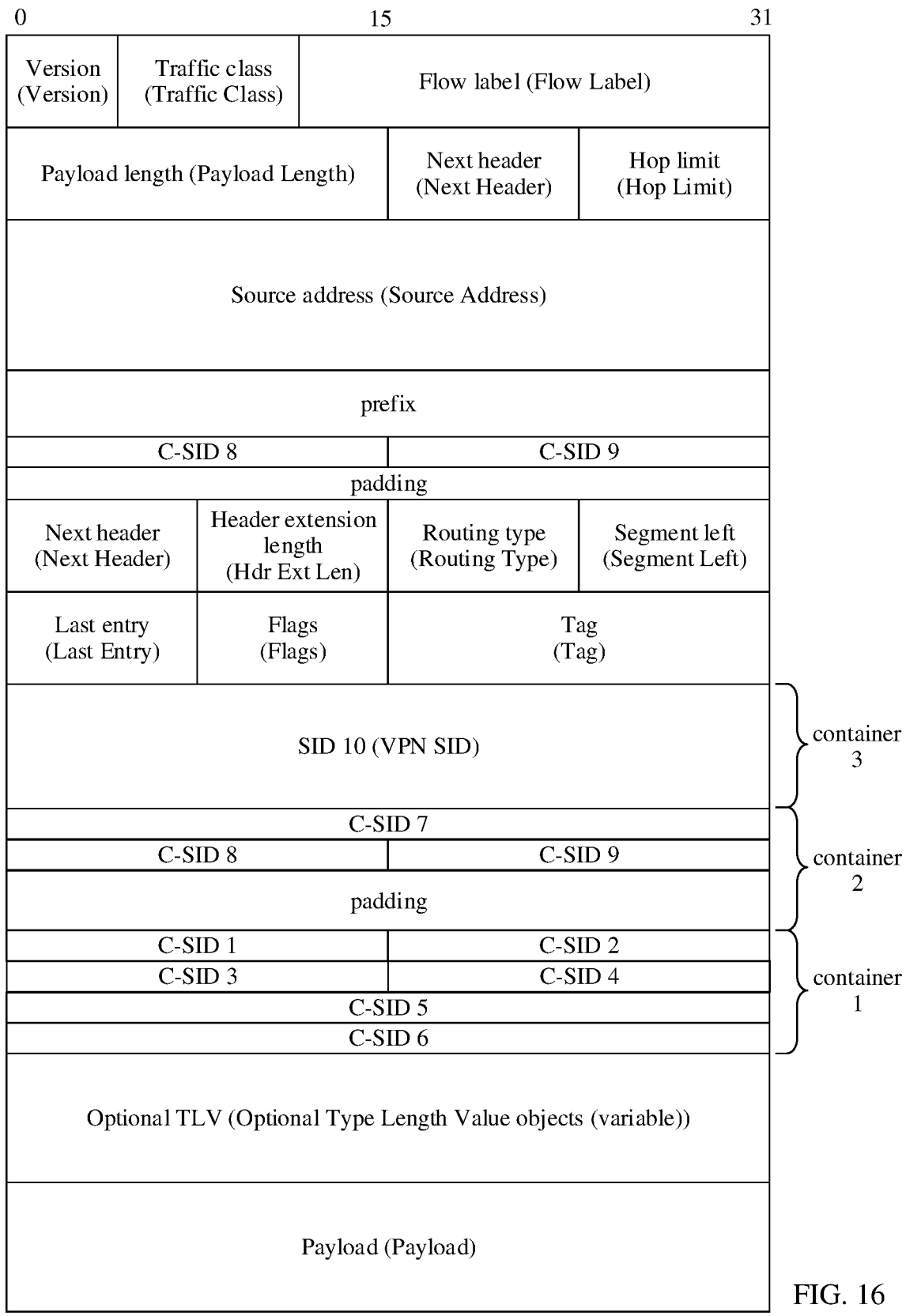
FIG. 16 is a schematic diagram of a packet according to an embodiment of the present invention.

When the network device 102 is the network device 7, the network device 7 receives a packet. A value of an SL pointer in the packet is 1, a value of an SI is 8, a DA field includes a C-SID 7, and the C-SID 7 is a second-type C-SID. That is, a length indicated by a local segment identifier is 32 bits, an update value of the SI is 2, and the value of the SI is 6. In this case, a segment [SL][SI] points to a C-SID 8, and the network device 7 uses 32 bits starting from this as to-be-copied content. To be specific, the to-be-copied content includes the C-SID 8 and a C-SID 9. The network device 7 copies the C-SID 8 and the C-SID 9 to a second field of the packet. An updated packet is shown in FIG. 16.

Figure 17:
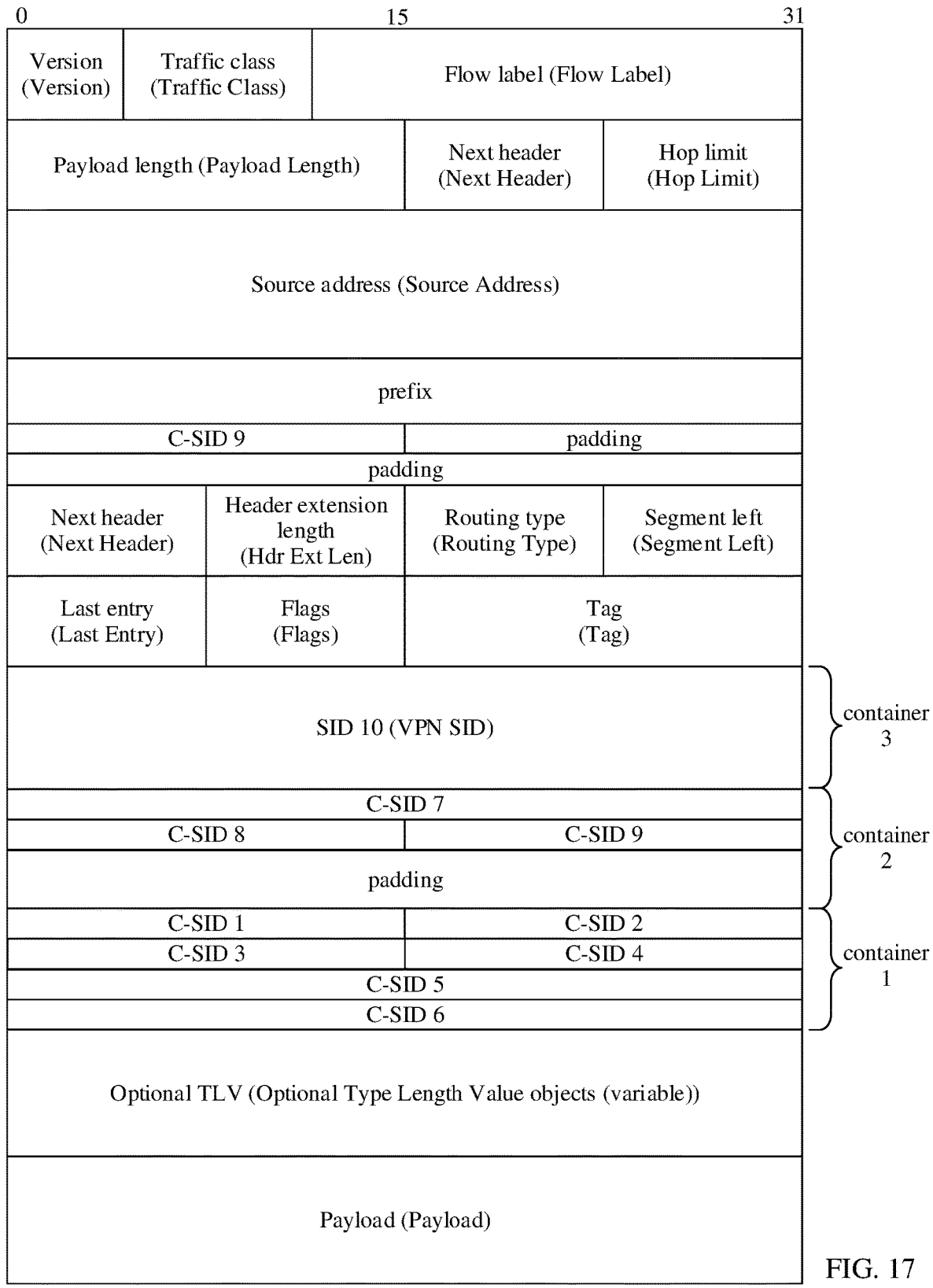
FIG. 17 is a schematic diagram of a packet according to an embodiment of the present invention.

When the network device 102 is the network device 8, the network device 8 receives a packet. A value of an SL pointer in the packet is 1, a value of an SI is 6, a DA field includes a C-SID 8, and the C-SID 8 is a first-type C-SID. That is, a length indicated by a local segment identifier is 16 bits, an update value of the SI is 1, and the value of the SI is 5. In this case, a segment [SL][SI] points to a C-SID 9, and the network device 8 uses 32 bits starting from this as to-be-copied content. To be specific, the to-be-copied content includes the C-SID 9 and padding with 16 bits. The network device 8 copies the C-SID 9 and the padding with 16 bits to a second field of the packet. An updated packet is shown in FIG. 17.

Figure 18:
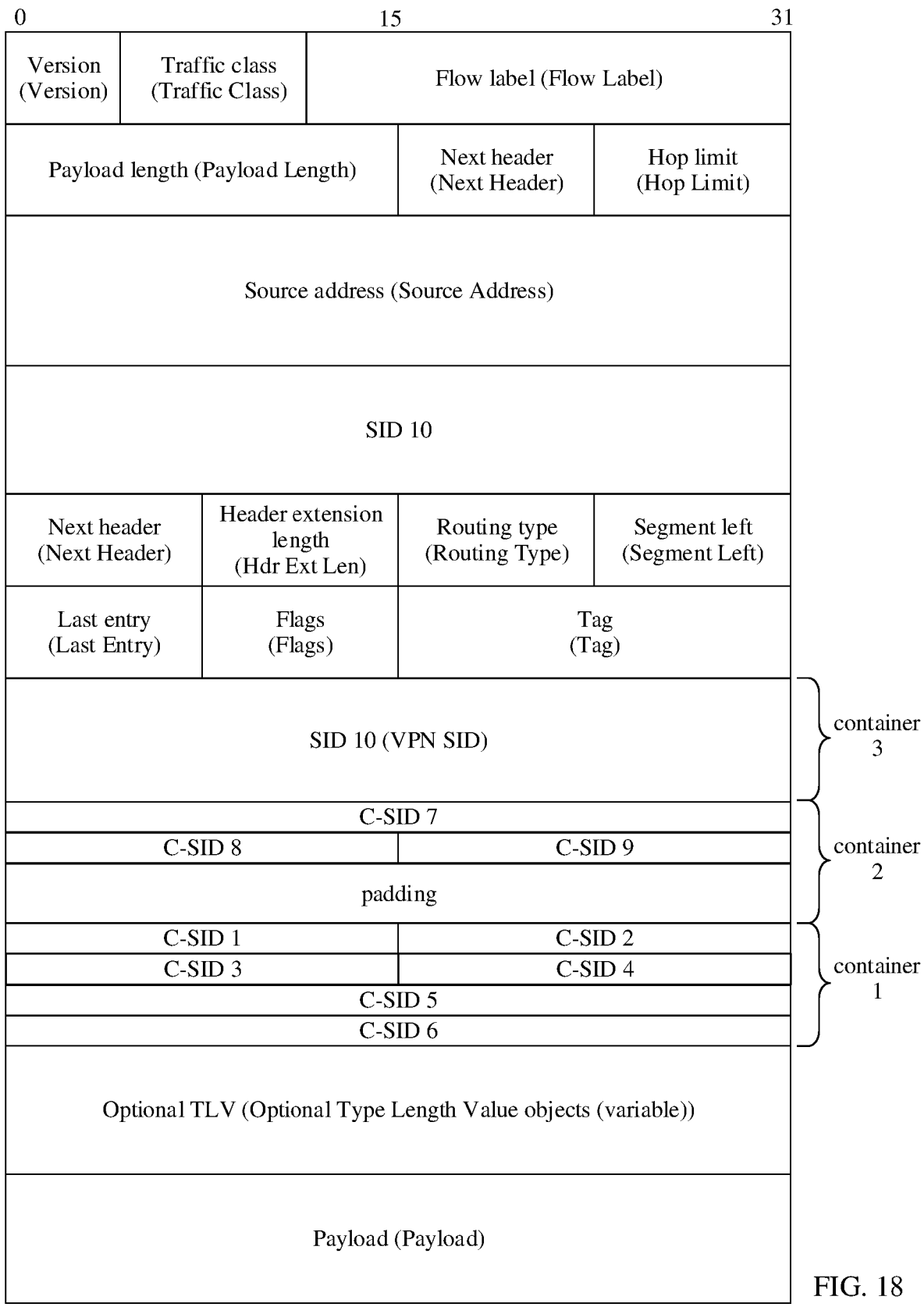
FIG. 18 is a schematic diagram of a packet according to an embodiment of the present invention.

When the network device 102 is the network device 9, the network device 9 receives a packet. A value of an SL pointer in the packet is 1, a value of an SI is 5, a DA field includes a C-SID 9, and the C-SID 9 is a first-type C-SID. That is, a length indicated by a local segment identifier is 16 bits, an update value of the SI is 1, and the value of the SI is 4. In this case, a segment [SL][SI] points to a padding part, and the network device 9 subtracts 1 from the value of the SL pointer, that is, the value of the SL is 0. In addition, because the C-SID 9 does not carry the COC information, the network device 9 copies an SID 10 whose length is 128 bits to a second field of the packet. An updated packet is shown in FIG. 18.

For example, when a two-dimensional pointer is used, the unit length is 16 bits, the first-type C-SID is 16 bits, and the second-type C-SID is 32 bits. Pseudocode corresponding to the local segment identifier in the network device 102 is shown as follows. In this embodiment of this application, for both a process of adjusting the two-dimensional pointer and a process of updating the DA field that are performed by the network device 102, refer to the pseudocode. This application includes but is not limited to the packet structure shown in FIG. 9. Details are not described herein again.

forwarding path. After receiving a packet, the head node on the forwarding path determines a forwarding path of the packet from several forwarding paths stored in the device, and determines a segment list corresponding to the forwarding path. The segment list is added to the packet, to guide forwarding of the packet.

Figure 19A:
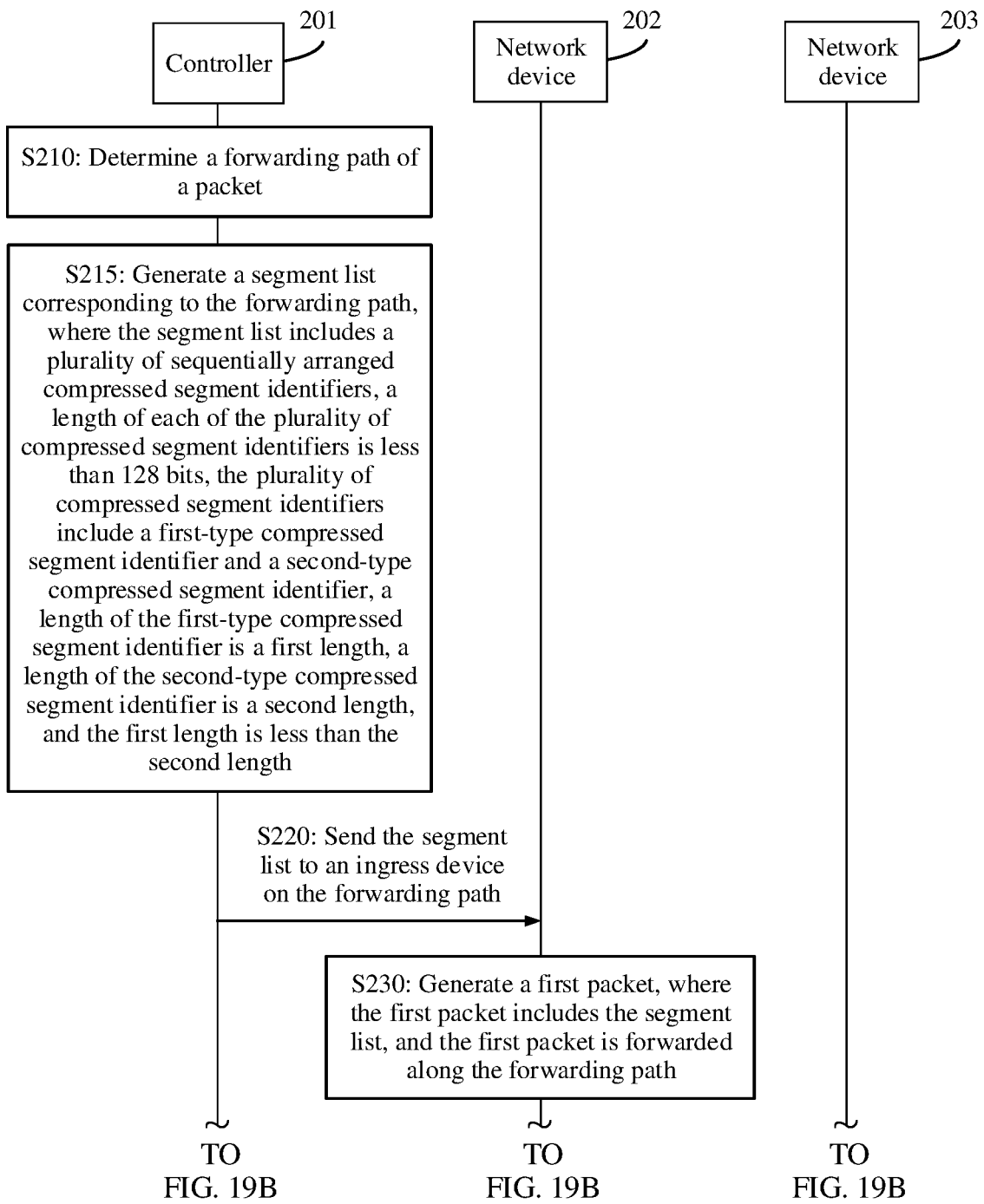
FIG. 19A and FIG. 19B are a schematic flowchart of a packet forwarding method according to an embodiment of the present invention.
Figure 19B:
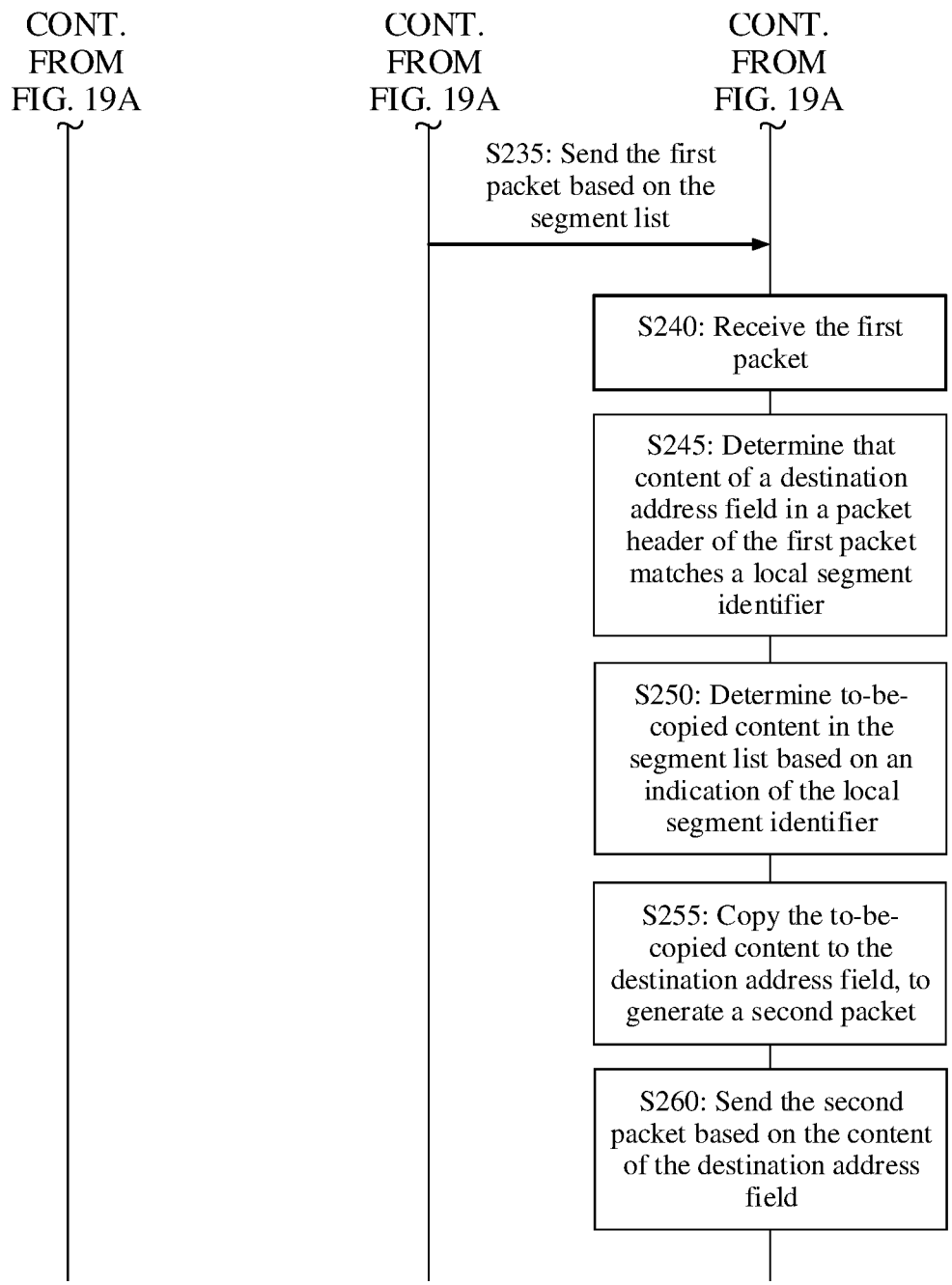

An embodiment of the present invention provides a packet forwarding method. FIG. 19A and FIG. 19B are a method flowchart of a method 200. A controller 201, a network device 202, and a network device 203 are used in the method. The controller 201 may be a controller on a network, and is configured to calculate a forwarding path of a packet and generate a segment list indicating the forwarding path. For example, the controller may be the controller in the application scenario shown in FIG. 2, but the controller is not shown in FIG. 2. The network device 201 is a head node on a packet forwarding path. For example, when the packet forwarding path is shown by the dashed line in FIG. 2, the network device 201 may be the network device S in the application scenario shown in FIG. 2, and the network device 202 is another network device other than the head node on the packet forwarding path. For example, the network device 202 may be one of the network device 1 to

```
if IPv6 DA hits a local SID              //The SID in the DA field includes a COC flavor
   if SI != o                            //The SI does not point to a last unit length in the element
     if local SID.Clen == 16             //The length indicated by the local segment identifier is 16 bits
       SI --;             //The SI points to a next unit length in the element
     else if local SID.Clen == 32                        //The length indicated by the local segment identifier is 32 bits
       SI = SI-2;         //The SI points to a unit length after the next unit length in the element
     if SI==o || (SI==1 && segment list[SL][SI..SI+16]==o) || (SI>1 && segment list
       [SL][SI .. SI+32] == 0)           // The SI currently points to the last unit length
       or padding in the element
   SL--;                   //The SL pointer points to the next element
     if local SID.COC = TRUE             //The local segment identifier carries COC
        information, in other words, a next G-SID in the SID list is still a C-SID
       SI = 8             //The SI is restored to an initial value
          DA[CP..CP+31] = segment list[SL][ SI] //32 bits to which a segment
          list [SL][SI] points are copied to 32 bits behind a prefix in the DA field
     else                                //The local segment identifier does not carry COC
       information, in other words, a next G-SID in the SID list is an SID
          DA = segment list [SL]         //A segment list [SL] is copied to the DA field
   else                    // The SI currently does not point to the last unit length or padding in the element
       DA[CP..CP+31] = segment list [SL][SI]             //32 bits to which a segment
list [SL][SI] points are copied to 32 bits behind a prefix in the DA field
```

S180: The network device 102 sends the second packet.

Optionally, the network device 102 determines a next-hop network device of the packet according to a longest match rule and based on the content of the DA field of the second packet. As described above, with reference to the application scenario shown in FIG. 2 and a packet structure shown in FIG. 10, when the network device 102 is the network device 1, the SID 2 is restored by using prefix+C-SID 2 in the DA field of the second packet, and the network device 1 searches a local forwarding entry based on the SID 2, determines that a next-hop network device is the network device 2, and sends the second packet to the network device 2. When the network device 102 is one of the network devices 2 to 9, a process in which the network device 102 sends the second packet based on the content of the destination address field is deduced by analogy. Details are not described herein again.

In an actual network, a forwarding path of a packet may be generated by a controller, or may be generated by a head node on the forwarding path. When the controller generates the forwarding path of the packet, the controller also generates a segment list indicating the forwarding path. The controller sends the segment list to the head node on the the network device 9 in the application scenario shown in FIG. 2. The method 200 includes steps:

S210: The controller 201 determines a forwarding path of a first packet.

The controller 201 may be connected to the network device S and the network devices 1 to 10 in FIG. 2. The controller may calculate the forwarding path of the packet based on a network topology.

S215: The controller 201 generates a segment list corresponding to the forwarding path, where the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length.

In the segment list, C-SIDs with different lengths are orchestrated in a same SRv6 compressed subpath in a mixed manner. For specific details of the segment list, refer to the description of step S110. Similar content is not described again.

S220: The controller 201 sends the segment list to an ingress device on the forwarding path.

The ingress device of the forwarding path is the network device 202. In other words, the controller 201 sends the segment list to the network device 202. Specifically, the controller 201 may send a control packet to the network device 202, where the control packet includes the segment list.

S230: The network device 202 generates a first packet, where the first packet includes the segment list, and the first packet is forwarded along the forwarding path.

The network device 202 may be an ingress device of an SRv6 network. After receiving a data packet, the network device 202 determines a forwarding path of the data packet from several forwarding paths stored in the device, and determines a segment list corresponding to the forwarding path. The segment list is added to the data packet to generate an SRv6 packet, namely, the first packet.

With reference to the application scenario shown in FIG. 2, for a specific process of step S230, refer to the description of the step S120. Similar content is not described again.

S235: The network device 202 sends the first packet based on the segment list.

With reference to the application scenario shown in FIG. 2, for a specific process of step S235, refer to the description of the step S130. Similar content is not described again.

S240: The network device 203 receives the first packet.

With reference to the application scenario shown in FIG. 2, for a specific process of step S240, refer to the description of the step S140. Similar content is not described again.

S245: The network device 203 determines that content of a destination address field in a packet header of the first packet matches a local segment identifier.

With reference to the application scenario shown in FIG. 2, for a specific process of step S245, refer to the description of the step S150. Similar content is not described again.

S250: The network device 203 determines to-be-copied content in the segment list based on an indication of the local segment identifier.

With reference to the application scenario shown in FIG. 2, for a specific process of step S250, refer to the description of the step S160. Similar content is not described again.

S255: The network device 203 copies the to-be-copied content to the destination address field, to generate a second packet.

With reference to the application scenario shown in FIG. 2, for a specific process of step S255, refer to the description of the step S170. Similar content is not described again.

S260: The network device 203 sends the second packet.

With reference to the application scenario shown in FIG. 4, for a specific process of step S260, refer to the description of the step S18o. Similar content is not described again.

The foregoing describes the method 100 and the method 200 in embodiments of this application. Corresponding to the methods, an embodiment of this application further provides a packet forwarding device.

Figure 20:
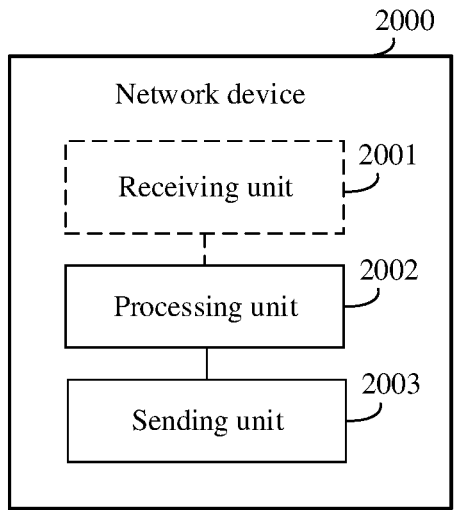
FIG. 20 is a schematic diagram of a network device according to an embodiment of the present invention.

FIG. 20 is a schematic diagram of a structure of a network device 2000 according to an embodiment of this application. The device has any function of the network device 101 in the method embodiment shown in FIG. 8 or the network device 202 shown in FIG. 19A and FIG. 19B. The network device 2000 may be a part of the network device 101 or the network device 202, or may be the network device 101 or the network device 202. It should be understood that the network device 2000 may include more additional components than the shown components or omit a part of the shown components. This is not limited in this embodiment of this application. As shown in FIG. 20, the network device 2000 includes:

a processing unit 2002, configured to generate a first packet, where the first packet includes a segment list corresponding to a forwarding path of the first packet, the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length, where the processing unit 2002 may perform step S120 shown in FIG. 8 or step S230 shown in FIG. 19A and FIG. 19B; and a sending unit 2003, configured to send the first packet based on the segment list, where the sending unit 2003 may perform step S130 shown in FIG. 8 or step S235 shown in FIG. 19A and FIG. 19B.

Optionally, the network device 2000 further includes: a receiving unit 2001, configured to receive the segment list from a controller in a network.

It should be understood that, when the network device 2000 forwards the packet, division of the foregoing functional modules/units is merely used as an example for description. During actual application, the foregoing functions may be allocated to different functional modules/units for implementation based on a requirement. That is, an internal structure of the network device 2000 is divided into different functional modules, to implement all or some of the functions described above. In addition, the network device 2000 provided in the foregoing embodiment belongs to a same concept as the method 100 shown in FIG. 8 or the method 200 shown in FIG. 19A and FIG. 19B. For a specific implementation process thereof, refer to steps in the method 100 and the method 200. Details are not described herein again.

In some embodiments, the units in the network device 2000 are integrated into one processing unit. For example, units in the network device 2000 are integrated on a same chip. The chip includes a processing circuit, and an input interface and an output interface that are internally connected to and communicate with the processing circuit. The processing unit 2002 is implemented by using the processing circuit in the chip. The receiving unit 2001 is implemented by using the input interface in the chip. The sending unit 2003 is implemented by using the output interface in the chip. For example, the chip is implemented by using one or more field-programmable gate arrays (FPGAs), a programmable logic device (PLD), a controller, a state machine, gate logic, a discrete hardware component, any other suitable circuit, or any combination of circuits that can perform various functions described in this application.

In some other embodiments, each unit in the network device 2000 exists alone physically. In some other embodiments, some units of the network device 2000 exist alone physically, and the other units are integrated into one unit. For example, in some embodiments, the receiving unit 2001 and the sending unit 2003 are a same unit. In some other embodiments, the receiving unit 2001 and the sending unit 2003 are different units. In some embodiments, integration of different units is implemented in a form of hardware, in other words, different units correspond to same hardware. For another example, integration of different units is implemented in a form of a software unit.

When the network device 2000 is implemented by using the hardware, for example, the processing unit 2002 in the network device 2000 is implemented by using, for example, a processor 2301 in a device 2300. The receiving unit 2001 and the sending unit 2003 in the network device 2000 are implemented by using, for example, a communication interface 2303 in the device 2300. For another example, the processing unit 2002 in the network device 2000 is implemented by using, for example, at least one of a central processing unit 2411, a central processing unit 2431, or a network processor 2432 in a device 2400. The receiving unit 2001 and the sending unit 2003 in the network device 2000 are implemented by using, for example, at least one of a physical interface card 2432 or a physical interface card 2432 in the device 2400.

When the network device 2000 is implemented by using software, each unit in the network device 2000 is, for example, software generated after a processor in the device 2300 or the device 2400 reads program code stored in a memory. For example, the network device 2000 is a virtualized device. The virtualized device includes but is not limited to at least one of a virtual machine, a container, and a pod. In some embodiments, the network device 2000 is deployed on a hardware device (for example, a physical server) in a form of the virtual machine. For example, the network device 2000 is implemented based on a general-purpose physical server in combination with a network functions virtualization (NFV) technology. When a manner of the virtual machine is used for implementation, the network device 2000 is, for example, a virtual host, a virtual router, or a virtual switch. By reading this application, a person skilled in the art may virtualize the network device 2000 on a general-purpose physical server in combination with the NFV technology. In some other embodiments, the network device 2000 is deployed on a hardware device in a form of the container (for example, a docker container). For example, a procedure in which the network device 2000 performs the foregoing method embodiment is encapsulated in an image file, and the hardware device creates the network device 2000 by running the image file. In some other embodiments, the network device 2000 is deployed on a hardware device in a form of the pod. The pod includes a plurality of containers, and each container is configured to implement one or more units in the network device 2000.

Figure 21:
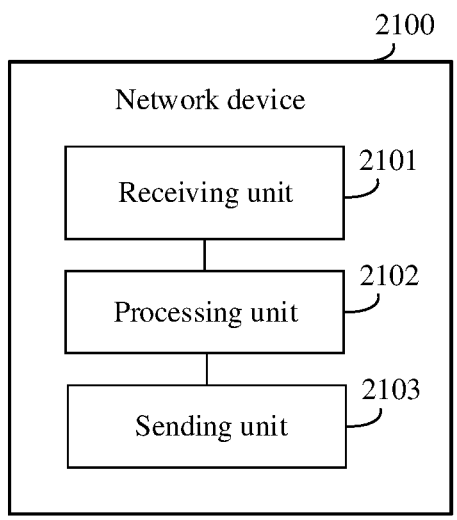
FIG. 21 is a schematic diagram of a network device according to an embodiment of the present invention.

FIG. 21 is a schematic diagram of a structure of a network device 2100 according to an embodiment of this application. The device has any function of the network device 102 in the method embodiment shown in FIG. 8 or the network device 203 shown in FIG. 19A and FIG. 19B. The network device 2100 may be a part of the network device 102 or the network device 203, or may be the network device 102 or the network device 203. It should be understood that the network device 2100 may include more additional components than the shown components or omit a part of the shown components. This is not limited in this embodiment of this application. As shown in FIG. 2100, the network device 2100 includes:

a receiving unit 2101, configured to receive a first packet, where the first packet includes a segment list corresponding to a forwarding path of the first packet, the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length, where the receiving unit 2101 may perform step S14*o* shown in FIG. 8 or step S24*o* shown in FIG. 19A and FIG. 19B;

a processing unit 2102, configured to: determine that content of a destination address field in a packet header of the first packet matches a local segment identifier, determine to-be-copied content in the segment list based on an indication of the local segment identifier, and copy the to-be-copied content to the destination address field, to generate a second packet, where the processing unit 2102 may perform steps S150, S160, and S170 shown in FIG. 8 or steps S245, S250, and S255 shown in FIG. 19A and FIG. 19B; and a sending unit 2103, configured to send the second packet, where the sending unit 2103 may perform step S180 shown in FIG. 8 or step S260 shown in FIG. 19A and FIG. 19B.

It should be understood that, when the network device 2100 forwards the packet, division of the foregoing functional modules/units is merely used as an example for description. During actual application, the foregoing functions may be allocated to different functional modules/units for implementation based on a requirement. That is, an internal structure of the network device 2100 is divided into different functional modules, to implement all or some of the functions described above. In addition, the network device 2100 provided in the foregoing embodiment belongs to a same concept as the method 100 shown in FIG. 8 or the method 200 shown in FIG. 19A and FIG. 19B. For a specific implementation process thereof, refer to steps in the method 100 and the method 200. Details are not described herein again.

In some embodiments, the units in the network device 2100 are integrated into one processing unit. For example, units in the network device 2100 are integrated on a same chip. The chip includes a processing circuit, and an input interface and an output interface that are internally connected to and communicate with the processing circuit. The processing unit 2102 is implemented by using the processing circuit in the chip. The receiving unit 2101 is implemented by using the input interface in the chip. The sending unit 2103 is implemented by using the output interface in the chip. For example, the chip is implemented by using one or more field-programmable gate arrays (FPGAs), a programmable logic device (PLD), a controller, a state machine, gate logic, a discrete hardware component, any other suitable circuit, or any combination of circuits that can perform various functions described in this application.

In some other embodiments, each unit in the network device 2100 exists alone physically. In some other embodiments, some units of the network device 2100 exist alone physically, and the other units are integrated into one unit. For example, in some embodiments, the receiving unit 2101 and the sending unit 2103 are a same unit. In some other embodiments, the receiving unit 2101 and the sending unit 2103 are different units. In some embodiments, integration of different units is implemented in a form of hardware, in other words, different units correspond to same hardware. For another example, integration of different units is implemented in a form of a software unit.

When the network device 2100 is implemented by using the hardware, for example, the processing unit 2102 in the network device 2100 is implemented by using, for example, a processor 2301 in a device 2300. The receiving unit 2101 and the sending unit 2103 in the network device 2100 are implemented by using, for example, a communication interface 2303 in the device 2300. For another example, the processing unit 2102 in the network device 2100 is implemented by using, for example, at least one of a central processing unit 2411, a central processing unit 2431, or a network processor 2432 in a device 2400. The receiving unit 2101 and the sending unit 2103 in the network device 2100 are implemented by using, for example, at least one of a physical interface card 2432 or a physical interface card 2432 in the device 2400.

When the network device 2100 is implemented by using software, each unit in the network device 2100 is, for example, software generated after a processor in the device 2300 or the device 2400 reads program code stored in a memory. For example, the network device 2100 is a virtualized device. The virtualized device includes but is not limited to at least one of a virtual machine, a container, and a pod. In some embodiments, the network device 2100 is deployed on a hardware device (for example, a physical server) in a form of the virtual machine. For example, the network device 2100 is implemented based on a general-purpose physical server in combination with a network functions virtualization (NFV) technology. When a manner of the virtual machine is used for implementation, the network device 2100 is, for example, a virtual host, a virtual router, or a virtual switch. By reading this application, a person skilled in the art may virtualize the network device 2100 on a general-purpose physical server in combination with the NFV technology. In some other embodiments, the network device 2100 is deployed on a hardware device in a form of the container (for example, a docker container). For example, a procedure in which the network device 2100 performs the foregoing method embodiment is encapsulated in an image file, and the hardware device creates the network device 2100 by running the image file. In some other embodiments, the network device 2100 is deployed on a hardware device in a form of the pod. The pod includes a plurality of containers, and each container is configured to implement one or more units in the network device 2100.

Figure 22:
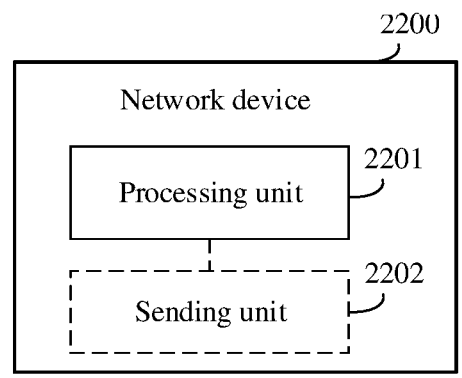
FIG. 22 is a schematic diagram of a network device according to an embodiment of the present invention.

FIG. 22 is a schematic diagram of a structure of a network device 2200 according to an embodiment of this application. The device has any function of the network device 101 in the method embodiment shown in FIG. 8 or the controller 201 shown in FIG. 19A and FIG. 19B. The network device 2200 may be a part of the network device 101 or the controller 201, or may be the network device 101 or the controller 201. It should be understood that the network device 2200 may include more additional components than the shown components or omit a part of the shown components. This is not limited in this embodiment of this application. As shown in FIG. 21, the network device 2200 includes: a processing unit 2201, configured to: determine a packet forwarding path; and generate a segment list corresponding to the forwarding path, where the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length. The receiving unit 2201 may perform step S110 shown in FIG. 8 or steps S210 and S215 shown in FIG. 19A and FIG. 19B.

Optionally, the network device 2200 further includes: a sending unit 2202, configured to send the segment list to an ingress device on the forwarding path. The sending unit 2202 may perform step S220 shown in FIG. 19A and FIG. 19B.

It should be understood that, when the network device 2200 generates the segment list, division of the foregoing functional modules/units is merely used as an example for description. During actual application, the foregoing functions may be allocated to different functional modules/units for implementation based on a requirement. That is, an internal structure of the network device 2200 is divided into different functional modules, to implement all or some of the functions described above. In addition, the network device 2200 provided in the foregoing embodiment belongs to a same concept as the method 100 shown in FIG. 8 or the method 200 shown in FIG. 19A and FIG. 19B. For a specific implementation process thereof, refer to steps in the method 100 or the method 200. Details are not described herein again.

In some embodiments, the units in the network device 2200 are integrated into one processing unit. For example, units in the network device 2200 are integrated on a same chip. The chip includes a processing circuit, and an input interface and an output interface that are internally connected to and communicate with the processing circuit. The processing unit 2201 is implemented by using the processing circuit in the chip. The sending unit 2202 is implemented by using the output interface in the chip. For example, the chip is implemented by using one or more field-programmable gate arrays (FPGA), a programmable logic device (PLD), a controller, a state machine, gate logic, a discrete hardware component, any other suitable circuit, or any combination of circuits that can perform various functions described in this application.

In some other embodiments, each unit in the network device 2200 exists alone physically. In some other embodiments, some units of the network device 2200 exist alone physically, and the other units are integrated into one unit. For example, in some embodiments, the processing unit 2201 and the sending unit 2202 are a same unit. In some other embodiments, the processing unit 2201 and the sending unit 2202 are different units. In some embodiments, integration of different units is implemented in a form of hardware, in other words, different units correspond to same hardware. For another example, integration of different units is implemented in a form of a software unit.

When the network device 2200 is implemented by using the hardware, for example, the processing unit 2201 in the network device 2200 is implemented by using, for example, a processor 2301 in a device 2300. The sending unit 2202 in the network device 2200 is implemented by using, for example, a communication interface 2303 in the device 2300.

When the network device 2200 is implemented by using software, each unit in the network device 2200 is, for example, software generated after a processor in a device 2300 reads program code stored in a memory. For example, the network device 2200 is a virtualized device. The virtualized device includes but is not limited to at least one of a virtual machine, a container, and a pod. In some embodiments, the network device 2200 is deployed on a hardware device (for example, a physical server) in a form of the virtual machine. For example, the network device 2200 is implemented based on a general-purpose physical server in combination with a network functions virtualization (NFV) technology. When a manner of the virtual machine is used for implementation, the network device 2200 is, for example, a virtual host, a virtual router, or a virtual switch.

By reading this application, a person skilled in the art may virtualize the network device 2200 on a general-purpose physical server in combination with the NFV technology. In some other embodiments, the network device 2200 is deployed on a hardware device in a form of the container (for example, a docker container). For example, a procedure in which the network device 2200 performs the foregoing method embodiment is encapsulated in an image file, and the hardware device creates the network device 2200 by running the image file. In some other embodiments, the network device 2200 is deployed on a hardware device in a form of the pod. The pod includes a plurality of containers, and each container is configured to implement one or more units in the network device 2200.

The following describes a hardware structure of a device 2300.

Figure 23:
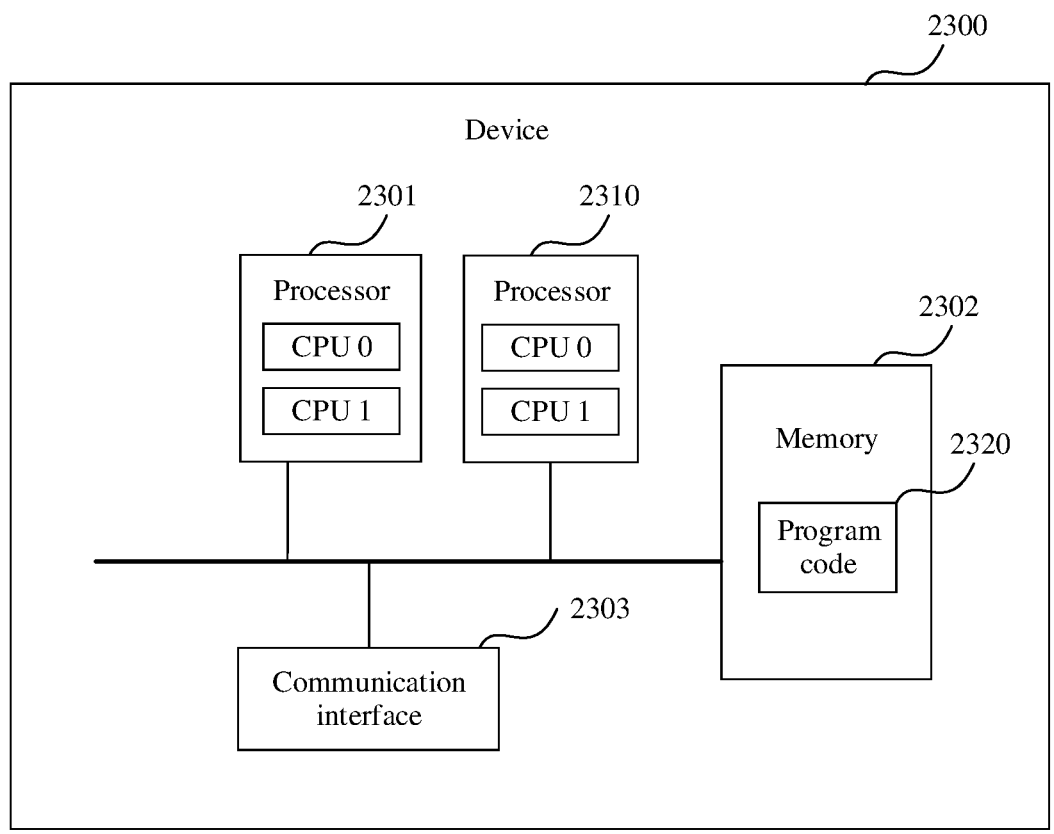
FIG. 23 is a schematic diagram of a network device according to an embodiment of the present invention.

FIG. 23 is a schematic diagram of a structure of the device 2300 according to an example embodiment of this application. Optionally, the device 2300 is configured as a network device or a controller. In other words, the network device 101 and the network device 102 in the method 100 shown in FIG. 8 and the controller 201, the network device 202, and the network device 203 in the method 200 shown in FIG. 19A and FIG. 19B may all be optionally implemented by using the device 2300. The device 2300 is, for example, the network device. For example, the device 2300 is a switch or a router. Alternatively, the device 2300 is, for example, a computing device. For example, the device 2300 is a host, a server, or a personal computer. The device 2300 may be implemented by a general bus architecture.

As shown in FIG. 23, the device 2300 includes at least one processor 2301, a memory 2302, and at least one communication interface 2303.

The processor 2302 is, for example, a general-purpose central processing unit (CPU), a digital signal processor (DSP), a network processor (NP), a graphics processing unit (GPU), a neural network processing unit (NPU), a data processing unit (DPU), a microprocessor, or one or more integrated circuits configured to implement the solutions of this application. For example, the processor 2302 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable logic gate array (field-programmable gate array, FPGA), a generic array logic (GAL), or any combination thereof. The processor may implement or execute various logical blocks, modules, and circuits described with reference to content disclosed in embodiments of the present invention. The processor may be a combination of processors implementing a computing function, for example, a combination of one or more microprocessors, or a combination of the DSP and a microprocessor.

Optionally, the device 2300 further includes a bus. The bus is configured to transfer information between components of the device 2300. The bus may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 23, but this does not mean that there is only one bus or only one type of bus.

The memory 2302 is, for example, a read-only memory (ROM) or another type of static storage device that can store static information and instructions, or a random access memory (RAM) or another type of dynamic storage device that can store information and instructions, or an electrically erasable programmable read-only memory (Memory, EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. For example, the memory 2302 exists independently, and is connected to the processor 2301 by using the bus. The memory 2302 may alternatively be integrated with the processor 2301.

The communication interface 2303 is any apparatus such as a transceiver, and is configured to communicate with another device or a communication network. The communication network may be the Ethernet, a radio access network (RAN), a wireless local area network (WLAN), or the like. The communication interface 2303 includes a wired communication interface, and may further include a wireless communication interface. Specifically, the communication interface 2303 may be an Ethernet interface, a fast Ethernet (FE) interface, a Gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 2303 may be configured to receive and send a control packet and a data packet.

During specific implementation, in an embodiment, the processor 2301 may include one or more CPUs, such as a CPU 0 and a CPU 1 shown in FIG. 23. Each of the processors may be a single-core processor (single-CPU), or may be a multi-core processor (multi-CPU). The processor herein may be one or more devices, circuits, and/or processing cores configured to process data (for example, computer program instructions).

During specific implementation, in an embodiment, the device 2300 may include a plurality of processors, such as a processor 2301 and a processor 2310 shown in FIG. 23. Each of the processors may be a single-core processor (single-CPU) or may be a multi-core processor (multi-CPU). The processor herein may be one or more devices, circuits, and/or processing cores configured to process data (for example, computer program instructions).

During specific implementation, in an embodiment, the device 2300 may further include an output device and an input device. The output device communicates with the processor 2301, and may display information in a plurality of manners. For example, the output device may be a liquid crystal display (LCD), a light emitting diode (LED) display device, a cathode ray tube (CRT) display device, a projector, or the like. The input device communicates with the processor 2301, and may receive an input of a user in a plurality of manners. For example, the input device may be a mouse, a keyboard, a touchscreen device, or a sensing device.

In some embodiments, the memory 2302 is configured to store program code 2320 for performing the solutions of this application, and the processor 2301 can execute the program code 2320 stored in the memory 2302. In other words, the device 2300 may implement, by using the processor 2301 and the program code 2320 in the memory 2302, the packet forwarding method provided in the method embodiment. The program code may include one or more software modules. Optionally, the processor 2301 may alternatively store program code or instructions for executing the solutions of this application.

In a specific embodiment, the processor of the device 2300 is configured to: generate a first packet, where the first packet includes a segment list corresponding to a forwarding path of the first packet, the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length; and send the first packet based on the segment list by using the communication interface. For a detailed processing process of the processor, refer to detailed descriptions of steps S120 and S130 in the embodiment shown in FIG. 8 and steps S230 and S235 in the embodiment shown in FIG. 19A and FIG. 19B. Details are not described herein again.

In a specific embodiment, the processor of the device 2300 is configured to: receive a first packet by using a communication interface, where the first packet includes a segment list corresponding to a forwarding path of the first packet, the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length; determine that content of a destination address field in a packet header of the first packet matches a local segment identifier, determine to-be-copied content in the segment list based on an indication of the local segment identifier, copy the to-be-copied content to the destination address field, to generate a second packet; and send the second packet by using the communication interface. For a detailed processing process of the processor, refer to detailed descriptions of steps S140, S150, S160, S170, and S180 in the embodiment shown in FIG. 8 and steps S240, S245, S250, S255, and S260 in the embodiment shown in FIG. 19A and FIG. 19B. Details are not described herein again.

In a specific embodiment, the processor of the device 2300 is configured to: determine a packet forwarding path; and generate a segment list corresponding to the forwarding path, where the segment list includes a plurality of sequentially arranged compressed segment identifiers, a length of each of the plurality of compressed segment identifiers is less than 128 bits, the plurality of compressed segment identifiers include a first-type compressed segment identifier and a second-type compressed segment identifier, a length of the first-type compressed segment identifier is a first length, a length of the second-type compressed segment identifier is a second length, and the first length is less than the second length. For a detailed processing process of the processor, refer to detailed descriptions of step S110 in the embodiment shown in FIG. 8 and steps S21o and S220 in the embodiment shown in FIG. 19A and FIG. 19B. Details are not described herein again.

Figure 24:
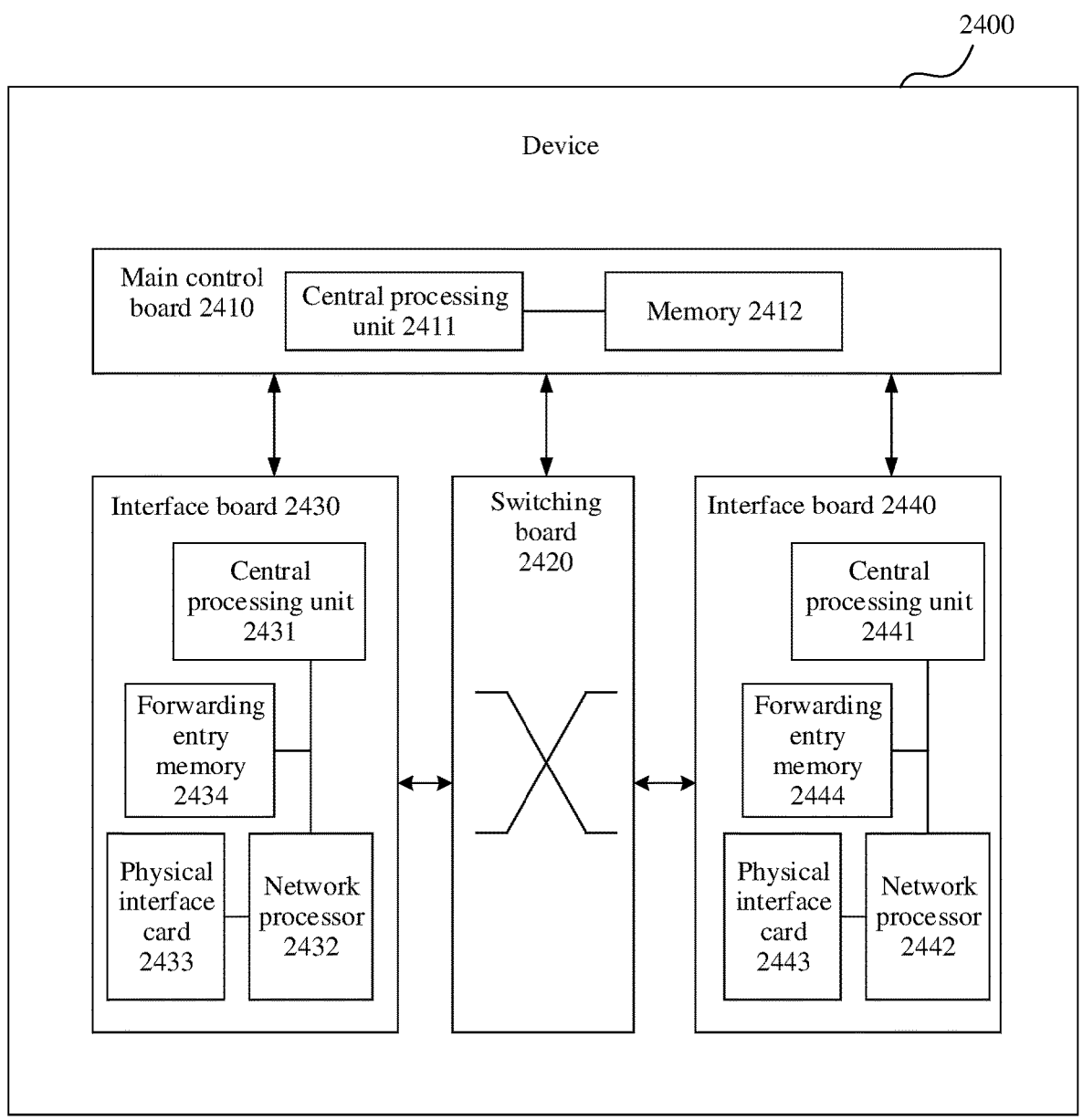
FIG. 24 is a schematic diagram of a network device according to an embodiment of the present invention.

FIG. 24 is a schematic diagram of a structure of a device 2400 according to an example embodiment of this application. Optionally, the device 2400 is configured as a network device. In other words, the network device 101 and the network device 102 in the method 100 shown in FIG. 8 and the network device 202 and the network device 203 in the method 200 shown in FIG. 19A and FIG. 19B are optionally implemented by using the device 2400. For example, the device 2400 is a switch, a router, or the like. As shown in FIG. 24, the device 2400 includes a main control board 2410 and an interface board 2430.

The main control board is also referred to as a main processing unit (MPU) or a route processing card (route processor card). The main control board 2410 is configured to control and manage components in the device 2400, including functions of route computation, device management, device maintenance, and protocol processing. The main control board 2400 includes a central processing unit 2411 and a memory 2412.

The interface board 2430 is also referred to as a line processing unit (LPU), a line card, or a service board. The interface board 2430 is configured to: provide various service interfaces, and forward a data packet. The service interface includes but is not limited to an Ethernet interface, a POS (Packet over SONET/SDH) interface, and the like. The Ethernet interface is, for example, flexible Ethernetclients (Flexible Ethernet Clients, FlexE Clients). The interface board 2430 includes: a central processing unit 2431, a network processor 2432, a forwarding entry memory 2434, and a physical interface card (PIC) 2433.

The central processing unit 2431 on the interface board 2430 is configured to control and manage the interface board 2430 and communicate with the central processing unit 2411 on the main control board 2410.

The network processor 2432 is configured to forward a packet. A form of the network processor 2432 may be a forwarding chip. The forwarding chip may be a network processor (NP). In some embodiments, the forwarding chip may be implemented by using an application-specific integrated circuit (ASIC) or a field programmable gate array (FPGA). Specifically, the network processor 2432 is configured to: forward a received packet based on a forwarding table stored in the forwarding entry memory 2434. If a destination address of the packet is an address of the device 2400, the network processor sends the packet to a CPU (for example, the central processing unit 2411) for processing. If the destination address of the packet is not the address of the device 2400, the network processor searches, based on the destination address, the forwarding table for a next hop and an outbound interface corresponding to the destination address, and forwards the packet to the outbound interface corresponding to the destination address. Processing of an uplink packet may include: processing of a packet ingress interface and forwarding table searching. Processing of a downlink packet may include: forwarding table searching, and the like. In some embodiments, the central processing unit may also perform a function of the forwarding chip, for example, implement software forwarding based on a general-purpose CPU, so that the interface board does not need the forwarding chip.

The physical interface card 2433 is configured to implement a physical layer interconnection function. Original traffic enters the interface board 2430 from the physical interface card, and a processed packet is sent from the physical interface card 2433. The physical interface card 2433 is also referred to as a subcard and may be installed on the interface board 2430, and is responsible for converting an optoelectronic signal into a packet, performing validity check on the packet, and then forwarding the packet to the network processor 2433 for processing. In some embodiments, the central processing unit may also perform a function of the network processor 2432, for example, implement software forwarding based on a general-purpose CPU. Therefore, the network processor 2432 is not necessary in the interface board 2430.

Optionally, the device 2400 includes a plurality of interface boards. For example, the device 2400 further includes an interface board 2440. The interface board 2440 includes: a central processing unit 2441, a network processor 2442, a forwarding entry memory 2444, and a physical interface card 2443. Functions and implementations of components in the interface board 2440 are the same as or similar to those in the interface board 2430. Details are not described herein again.

Optionally, the device 2400 further includes a switching board 2420. The switching board 2420 may also be referred to as a switch fabric unit (SFU). When the network device has a plurality of interface boards, the switching board 2420 is configured to complete data exchange between the interface boards. For example, the interface board 2430 and the interface board 2440 may communicate with each other by using the switching board 2420.

The main control board 2410 is coupled to the interface board 2430. For example, the main control board 2410, the interface board 2430 and the interface board 2440, and the switching board 242o are connected to a system backboard by using a system bus for interworking. In a possible implementation, an inter-process communication (IPC) protocol channel is established between the main control board 2410 and the interface board 2430, and the main control board 2410 and the interface board 2430 communicate with each other through the IPC channel.

Logically, the device 2400 includes a control plane and a forwarding plane. The control plane includes the main control board 2410 and the central processing unit 2411. The forwarding plane includes components that perform forwarding, such as the forwarding entry memory 2434, the physical interface card 2433, and the network processor 2432. The control plane performs functions such as routing, generating a forwarding table, processing signaling and a protocol packet, and configuring and maintaining a device status. The control plane delivers the generated forwarding table to the forwarding plane. On the forwarding plane, the network processor 2432 searches the forwarding table delivered by the control plane to forward a packet received by the physical interface card 2433. The forwarding table delivered by the control plane may be stored in the forwarding entry memory 2434. In some embodiments, the control plane and the forwarding plane may be totally separated, and are not on a same device.

It should be noted that, there may be one or more main control boards. When there are a plurality of main control boards, the main control boards may include a primary main control board and a secondary main control board. There may be one or more interface boards, and a network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of the network device in the distributed architecture is better than that of the device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained by combining the two central processing units. The device in this form (for example, a network device such as a low-end switch or router) has a weak data exchange and processing capability. A specific architecture that is to be used depends on a specific networking deployment scenario. This is not limited herein.

The device 2400 may further correspond to the network device 2000 shown in FIG. 20. In some embodiments, the receiving unit 2001 and the sending unit 2003 in the network device 2000 shown in FIG. 20 each are equivalent to the physical interface card 2433 in the device 2400. The processing unit 2002 in the network device 2000 is equivalent to the network processor 2432, the central processing unit 2431, or the central processing unit 2411.

The device 2400 may further correspond to the network device 2100 shown in FIG. 21. In some embodiments, the receiving unit 2101 and the sending unit 2103 in the network device 2100 shown in FIG. 21 each are equivalent to the physical interface card 2433 in the device 2400. The processing unit 2102 in the network device 2100 is equivalent to the network processor 2432, the central processing unit 2431, or the central processing unit 2411.

The device 2400 may further correspond to the network device 2200 shown in FIG. 22. In some embodiments, the sending unit 2202 in the network device 2200 shown in FIG. 22 is equivalent to the physical interface card 2433 in the device 2400. The processing unit 2201 in the network device 2200 is equivalent to the network processor 2432, the central processing unit 2431, or the central processing unit 2411.

It should be understood that, the device 2400 in this embodiment may correspond to the network device in the foregoing method embodiments, and the main control board 2410, the interface board 2430, and/or the interface board 244o in the device 2400 may implement functions of the network device in the foregoing method embodiments and/or various steps implemented by the network device in the foregoing method embodiments. For brevity, details are not described herein again.

Figure 25:
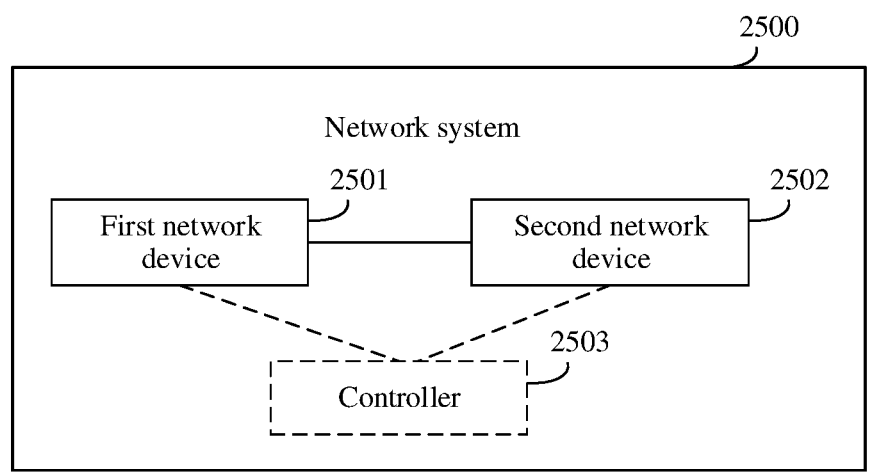
FIG. 25 is a schematic diagram of a network system according to an embodiment of the present invention.

Refer to FIG. 25. An embodiment of this application provides a system 2500. The system 2500 includes: a first network device 2501 and a second network device 2502. The first network device 2501 is the device 101 shown in FIG. 8 or the device 202 shown in FIG. 19A and FIG. 19B. The second network device 2502 is the device 102 shown in FIG. 8 or the device 203 shown in FIG. 19A and FIG. 19B. Optionally, the system 2500 further includes a controller 2503. The controller 2503 is the controller 201 shown in FIG. 9.

A person of ordinary skill in the art may be aware that, with reference to the method steps and the modules described in embodiments disclosed in this specification, implementation can be performed by using software, hardware, firmware, or a combination thereof. To clearly describe the interchangeability between the hardware and the software, the foregoing has usually described steps and composition of each embodiment based on functions. Whether the functions are performed by using hardware or software depends on particular applications and design constraint conditions of the technical solutions. A person of ordinary skill in the art may use different methods to implement the described functions for each particular application, but it should not be considered that the implementation goes beyond the scope of this application.

A person of ordinary skill in the art may understand that all or some of the steps of embodiments may be implemented by using hardware or a program instructing related hardware. The program may be stored in a computer-readable storage medium. The storage medium may include: a read-only memory, a magnetic disk, or an optical disc.

When software is used for implementation, all or some of the embodiments may be implemented in a form of a computer program product. The computer program product includes one or more computer program instructions. For example, the method in embodiments of this application may be described in a context of a machine-executable instruction. The machine-executable instruction is, for example, a program module executed in a device included in a real or virtual processor of a target. Usually, the program module includes a routine, a program, a library, an object, a class, a component, a data structure, and the like, and executes a specific task or implements a specific abstract data structure. In various embodiments, functions of the program modules may be combined or divided between the described program modules. The machine-executable instruction for the program module may be executed locally or within a distributed device. In the distributed device, the program modules may be located both locally and in a remote storage medium.

Computer program code used to implement the method in the embodiments of this application may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed completely on a computer, partially on a computer, as an independent software package, partially on a computer and partially on a remote computer, or completely on a remote computer or server.

In a context of embodiments of this application, the computer program code or related data may be carried by any appropriate carrier, so that a device, an apparatus, or a processor can perform various processing and operations described above. Examples of the carriers include a signal, a computer-readable medium, and the like.

Examples of the signal may include propagating signals in electrical, optical, radio, sound, or other forms, such as carrier waves and infrared signals.

The computer-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

It may be clearly understood by a person skilled in the art that, for the purpose of convenient and brief description, for a detailed working process of the foregoing system, device, and module, refer to a corresponding process in the foregoing method embodiment. Details are not described herein.

In the several embodiments provided in this application, it should be understood that the disclosed system, device, and method may be implemented in other manners. For example, the described device embodiment is merely an example. For example, the module division is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented by using some interfaces. Indirect couplings or communication connections between the devices or modules may be electrical connections, mechanical connections, or connections in other forms.

The modules described as separate components may or may not be physically separate, and components displayed as modules may or may not be physical modules, may be located in one location, or may be distributed on a plurality of network modules. Some or all of the modules may be selected based on an actual requirement to achieve the objectives of the solutions of embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of this application. The foregoing storage medium includes any medium that can store program code, such as a USB flash drive, a removable hard disk, a read-only memory (ROM), a random access memory (RAM), a magnetic disk, or an optical disc.

In this application, the terms such as "first" and "second" are used to distinguish between same or similar items that have basically same effects and functions. It should be understood that there is no logical or time sequence dependency between "first", "second", and "$n^{th}$", and a quantity and an execution sequence are not limited, either. It should also be understood that although terms such as first and second are used in the following description to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

In this application, the term "at least one" means one or more, and the term "a plurality of" means two or more. For example, a plurality of second packets mean two or more second packets. The terms "system" and "network" are often used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of the various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application usually indicates an "or" relationship between associated objects.

It should be further understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined based on only A, but B may alternatively be determined based on A and/or other information.

It should further be understood that "one embodiment", "an embodiment", or "a possible implementation" mentioned throughout this specification means that particular features, structures, or characteristics related to the embodiments or implementations are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments in any appropriate manner.

The foregoing descriptions are merely optional embodiments of this application, but are not intended to limit this application. Any modification, equivalent replacement, or improvement made without departing from the principle of this application should fall within the protection scope of this application.

What is claimed is:

1. A network device comprising:
   at least one processor;
   one or more non-transitory memories coupled to the at least one processor and storing programming instructions, wherein the at least one processor is configured to execute the programming instructions to cause the network device to:
   generate a packet, wherein the packet comprises a segment list in a plurality of containers, the segment list corresponding to a forwarding path of the packet, the segment list comprises a plurality of compressed segment identifiers that are sequentially arranged, a length of each of the plurality of compressed segment identifiers is less than 128 bits, the plurality of compressed segment identifiers comprise a first-type compressed segment identifier and a second-type compressed segment identifier, a length of the first-type compressed segment identifier is a first length, a length of the second-type compressed segment identifier is a second length, the first length is less than the second length, each of the plurality of containers has a same length, and a first container of the plurality of containers comprises the first-type compressed segment identifier having the first length and the second-type compressed segment identifier having the second length; and
   send the packet based on the segment list.

2. The network device according to claim 1, wherein the first length is X times a unit length, the second length is Y times the unit length, and both X and Y are positive integers.

3. The network device according to claim 2, wherein the unit length is ($N^{th}$ power of 2) bits, and N is an integer greater than or equal to 3 and less than 7.

4. The network device according to claim 1, wherein the first length is 16 bits, and the second length is 32 bits.

5. The network device according to claim 1, wherein the second-type compressed segment identifier comprises a global link compressed segment identifier, and the global link compressed segment identifier indicates a specific network device on the forwarding path of the packet to forward the packet through a specific link.

6. The network device according to claim 5, wherein the global link compressed segment identifier comprises a node part and a link part, the node part identifies a node, the link part identifies a link, a length of the node part is the same as the first length, and a length of the link part is the same as the first length.

7. The network device according to claim 1, wherein the segment list comprises an element having a length of 128 bits, and the element comprises the first-type compressed segment identifier and the second-type compressed segment identifier.

8. The network device according to claim 1, wherein
   a packet header of the packet comprises a first pointer and a second pointer, a value of the first pointer indicates a location of one of the plurality of compressed segment identifiers in the first container, the first container having a length of 128 bits, and a value of the second pointer indicates a location of the first container in the plurality of containers; or the packet header of the packet comprises a first pointer, and a value of the first pointer indicates a location of one of the plurality of compressed segment identifiers in the segment list.

9. A network device comprising:
at least one processor;
one or more non-transitory memories coupled to the at least one processor and storing programming instructions, wherein the at least one processor is configured to execute the programming instructions to cause the network device to:
receive a first packet, wherein the first packet comprises a segment list in a plurality of containers, the segment list corresponding to a forwarding path of the first packet, the segment list comprises a plurality of compressed segment identifiers that are sequentially arranged, a length of each of the plurality of compressed segment identifiers is less than 128 bits, the plurality of compressed segment identifiers comprise a first-type compressed segment identifier and a second-type compressed segment identifier, a length of the first-type compressed segment identifier is a first length, a length of the second-type compressed segment identifier is a second length, the first length is less than the second length, each of the plurality of containers has a same length, and a first container of the plurality of containers comprises the first-type compressed segment identifier having the first length and the second-type compressed segment identifier having the second length;
determine that content of a destination address field in a packet header of the first packet matches a local segment identifier;
in response to determining that the content of the destination address field matches the local segment identifier, determine to-be-copied content in the segment list based on an indication of the local segment identifier;
copy the to-be-copied content to the destination address field of the first packet, to generate a second packet; and
send the second packet.

10. The network device according to claim 9, wherein the at least one processor is further configured to execute the programming instructions to cause the network device to:
determine a location of the to-be-copied content in the segment list based on a length indicated by the local segment identifier; and
determine the to-be-copied content based on the location of the to-be-copied content in the segment list.

11. The network device according to claim 10, wherein the packet header of the first packet comprises a first pointer and a second pointer, and the at least one processor is further configured to execute the programming instructions to cause the network device to:
determine a value of the first pointer based on the length indicated by the local segment identifier;
determine, based on the value of the first pointer, a location of the to-be-copied content in the first container, the first container having a length of 128 bits; and
determine a location of the first container in the plurality of containers based on a value of the second pointer.

12. The network device according to claim 10, wherein the packet header of the first packet comprises a first pointer, and the at least one processor is further configured to execute the programming instructions to cause the network device to:
determine a value of the first pointer based on the length indicated by the local segment identifier; and
determine the location of the to-be-copied content in the segment list based on the value of the first pointer.

13. A network system comprising a first network device and a second network device,
wherein the first network device is configured to:
generate a first packet, wherein the first packet comprises a segment list in a plurality of containers, the segment list corresponding to a forwarding path of the first packet, the segment list comprises a plurality of compressed segment identifiers that are sequentially arranged, a length of each of the plurality of compressed segment identifiers is less than 128 bits, the plurality of compressed segment identifiers comprise a first-type compressed segment identifier and a second-type compressed segment identifier, a length of the first-type compressed segment identifier is a first length, a length of the second-type compressed segment identifier is a second length, the first length is less than the second length, each of the plurality of containers has a same length, and a first container of the plurality of containers comprises the first-type compressed segment identifier having the first length and the second-type compressed segment identifier having the second length; and
send the first packet based on the segment list to the second network device; and
wherein the second network device is configured to:
receive the first packet;
determine that content of a destination address field in a packet header of the first packet matches a local segment identifier;
in response to determining that the content of the destination address field matches the local segment identifier, determine to-be-copied content in the segment list based on an indication of the local segment identifier;
copy the to-be-copied content to the destination address field of the first packet, to generate a second packet; and
send the second packet.

14. The network system according to claim 13, wherein the first length is X times a unit length, the second length is Y times the unit length, and both X and Y are positive integers.

15. The network system according to claim 14, wherein the unit length is ($N^{th}$ power of 2) bits, and N is an integer greater than or equal to 3 and less than 7.

16. The network system according to claim 13, wherein the first length is 16 bits, and the second length is 32 bits.

17. The network system according to claim 13, wherein the second-type compressed segment identifier comprises a global link compressed segment identifier, and the global link compressed segment identifier indicates a specific network device on the forwarding path of the first packet to forward the first packet through a specific link.

18. The network system according to claim 13, wherein the segment list comprises an element having a length of 128 bits, and the element comprises the first-type compressed segment identifier and the second-type compressed segment identifier.

19. The network system according to claim 13, wherein the packet header of the first packet comprises a first pointer and a second pointer, a value of the first pointer indicates a location of one of the plurality of compressed segment identifiers in the first container, the first container having a length of 128 bits, and a value of the second pointer indicates a location of the first container in the plurality of containers; or the packet header of the first packet comprises a first pointer, and a value of the first pointer indicates a location of one of the plurality of compressed segment identifiers in the segment list.

20. The network system according to claim 13, wherein the second network device is further configured to:

determine a location of the to-be-copied content in the segment list based on a length indicated by the local segment identifier; and determine the to-be-copied content based on the location of the to-be-copied content in the segment list.

\* \* \* \* \*